Jan. 1, 1952 F. E. HAMILTON ET AL 2,580,768
DATA LOOK-UP APPARATUS FOR COMPUTING OR OTHER MACHINES
Filed Aug. 14, 1947 23 Sheets-Sheet 5
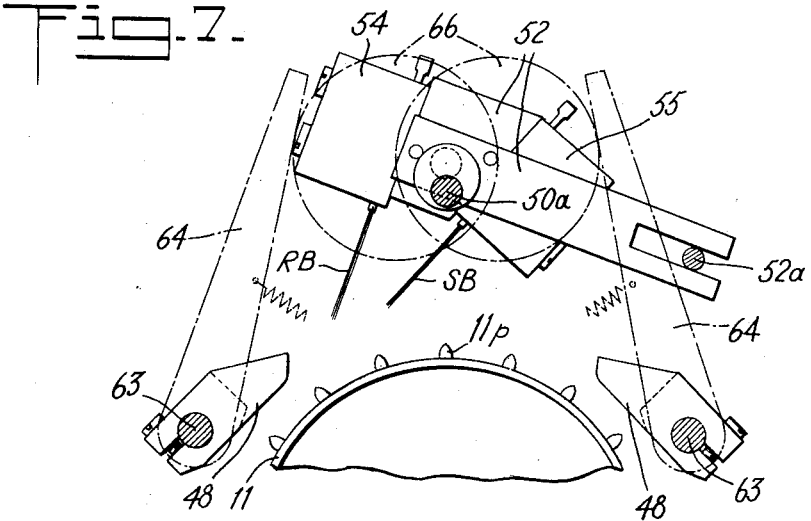
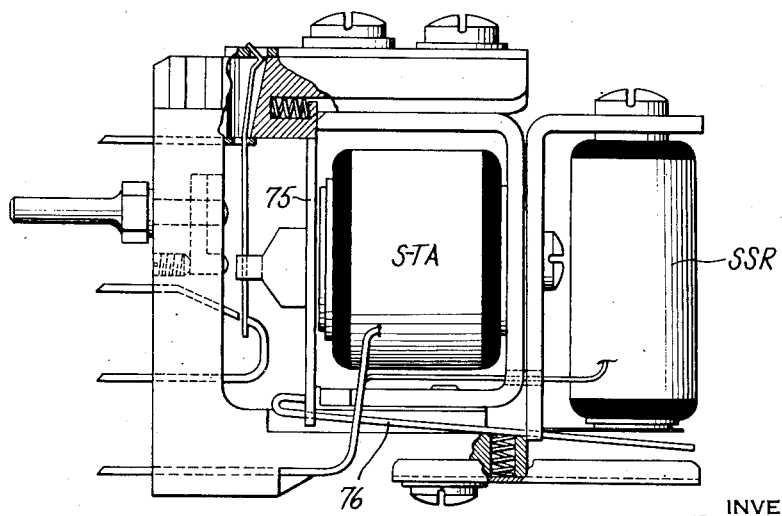
INVENTORS
F. E. HAMILTON
R. R. SEEBER, JR.
BY R. W. PRENTICE
ATTORNEY

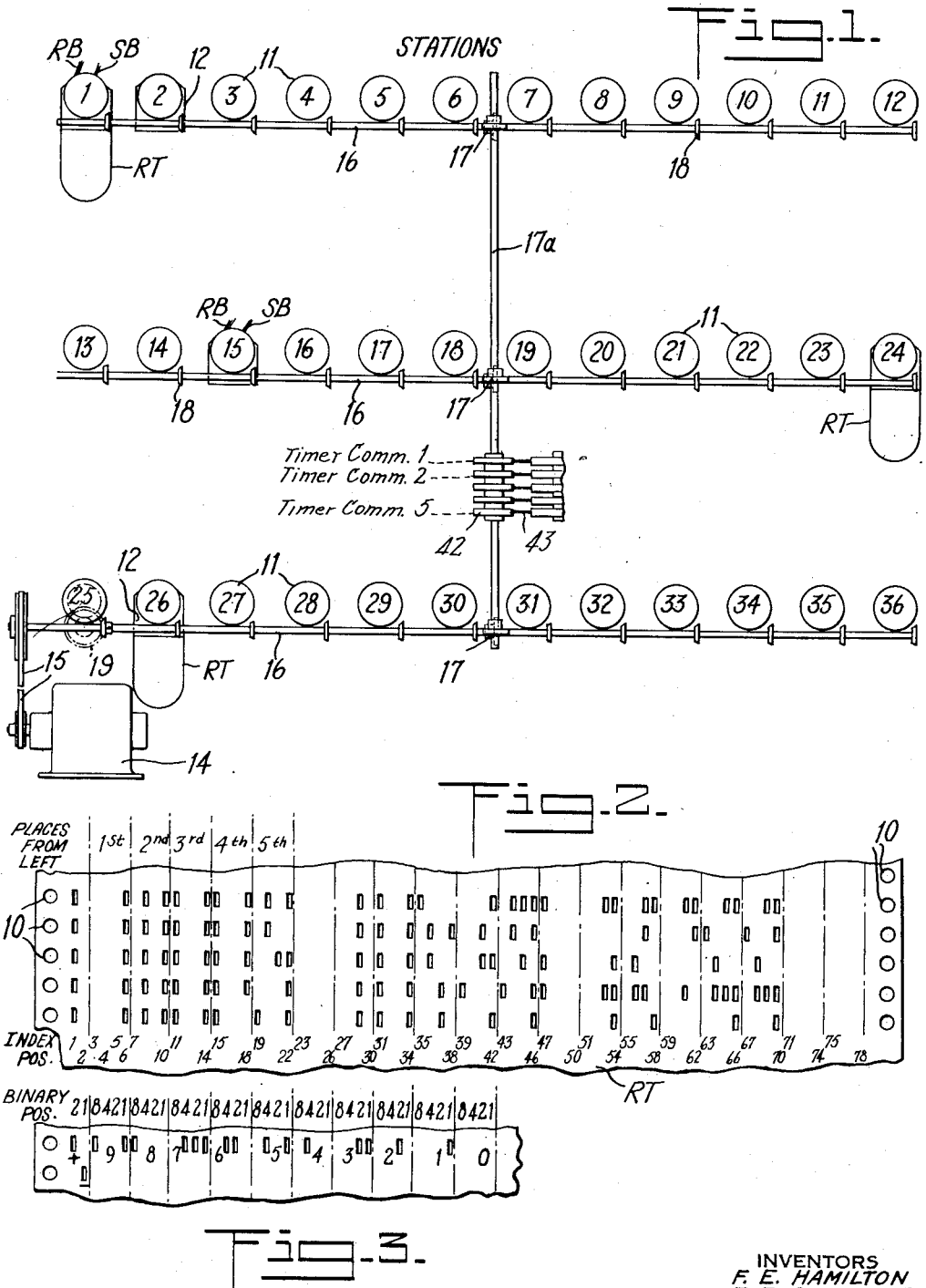

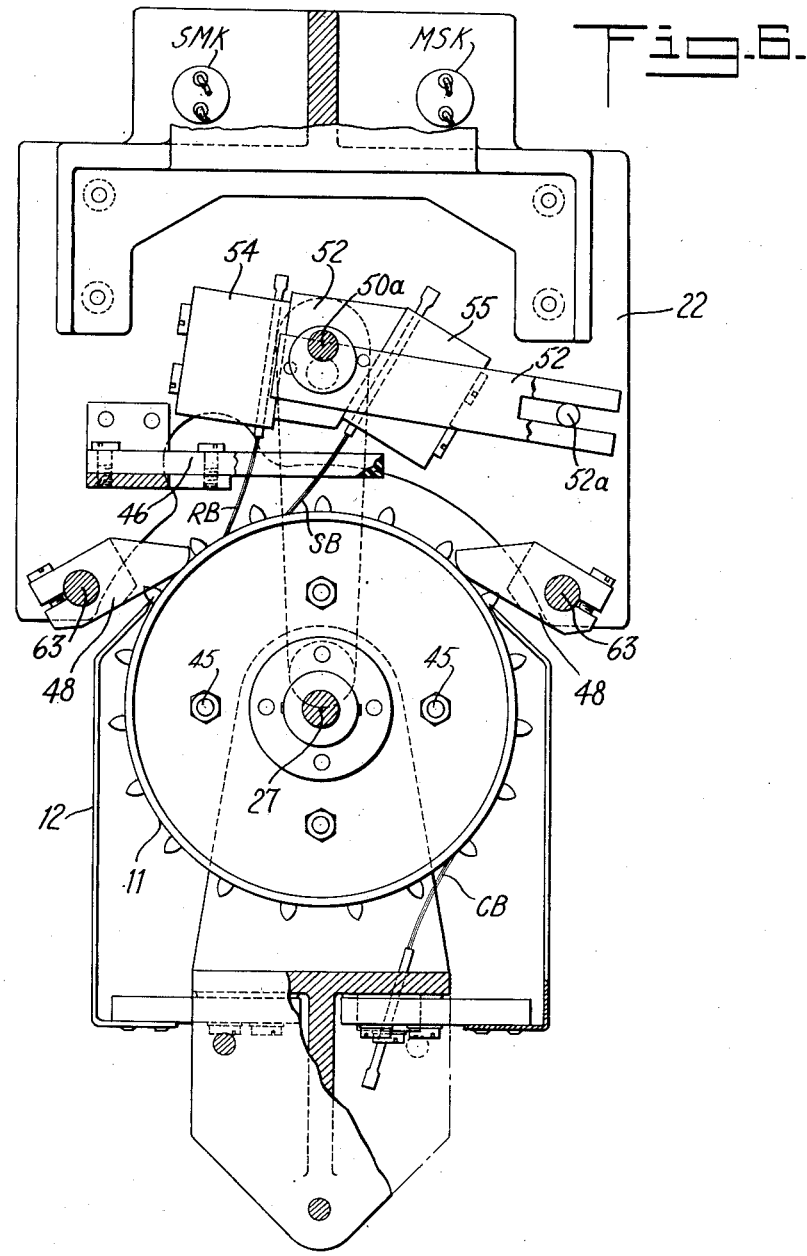

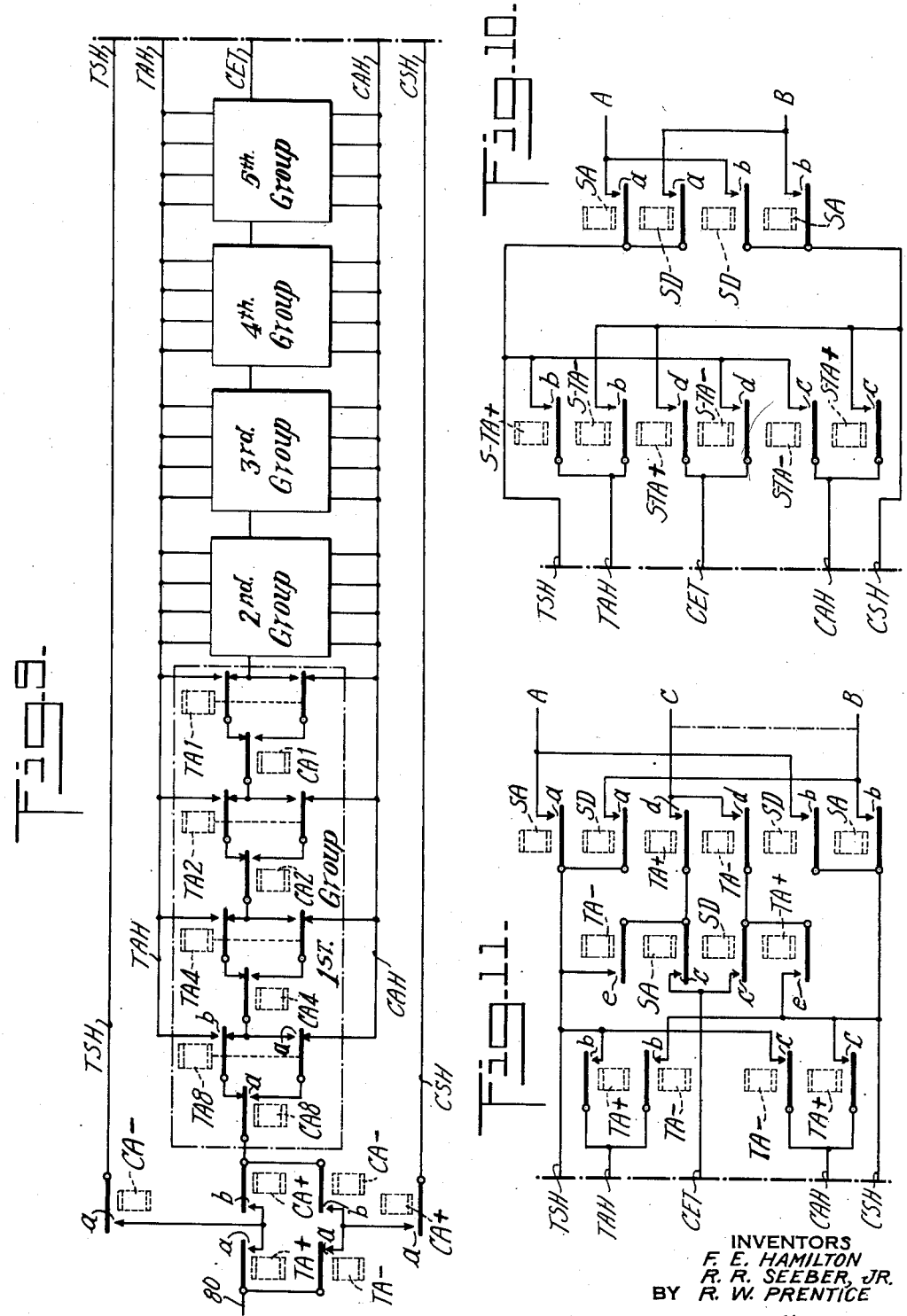

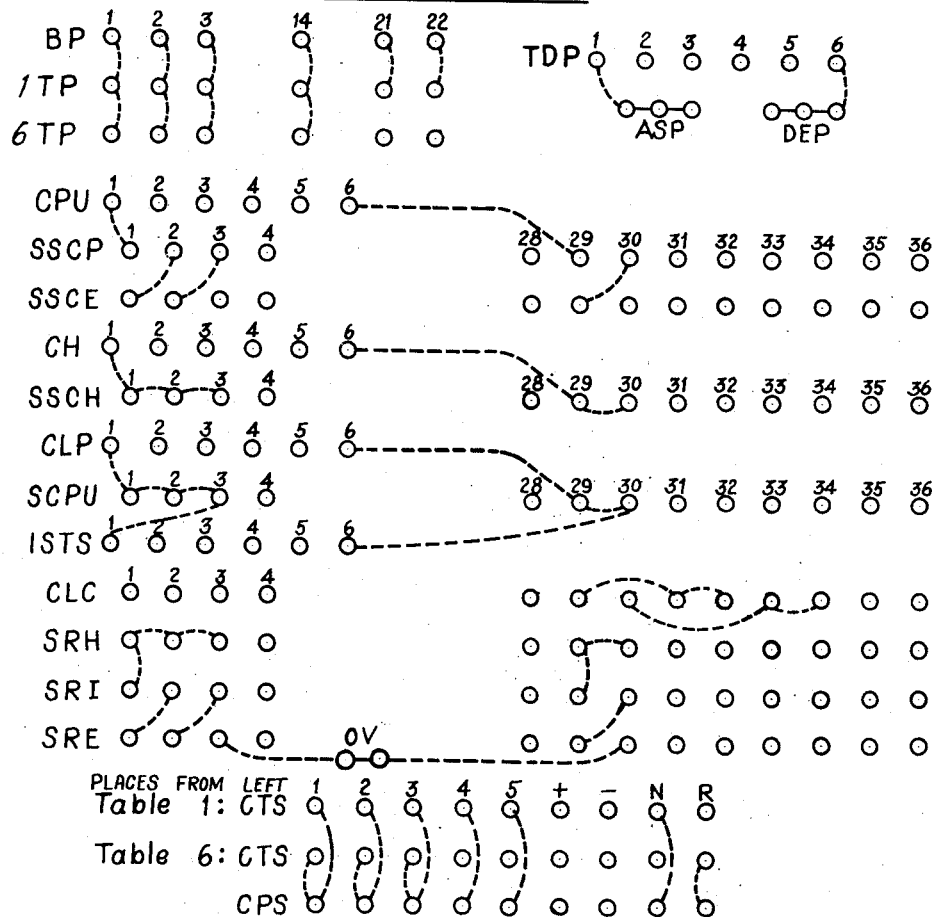
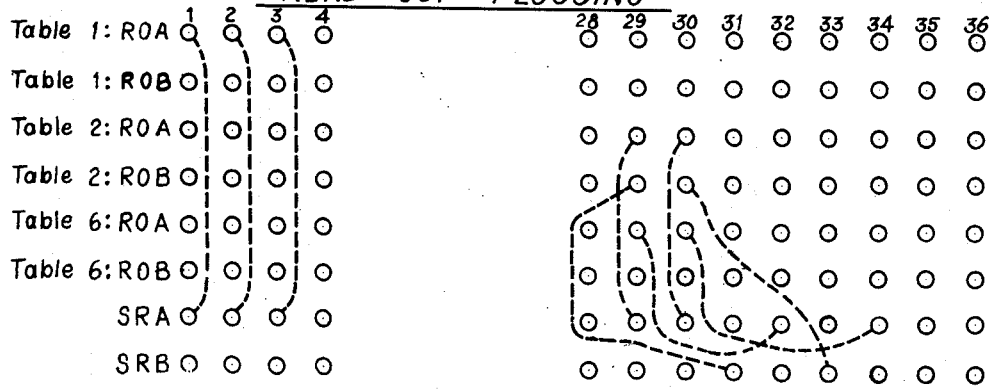
Fig. 12.

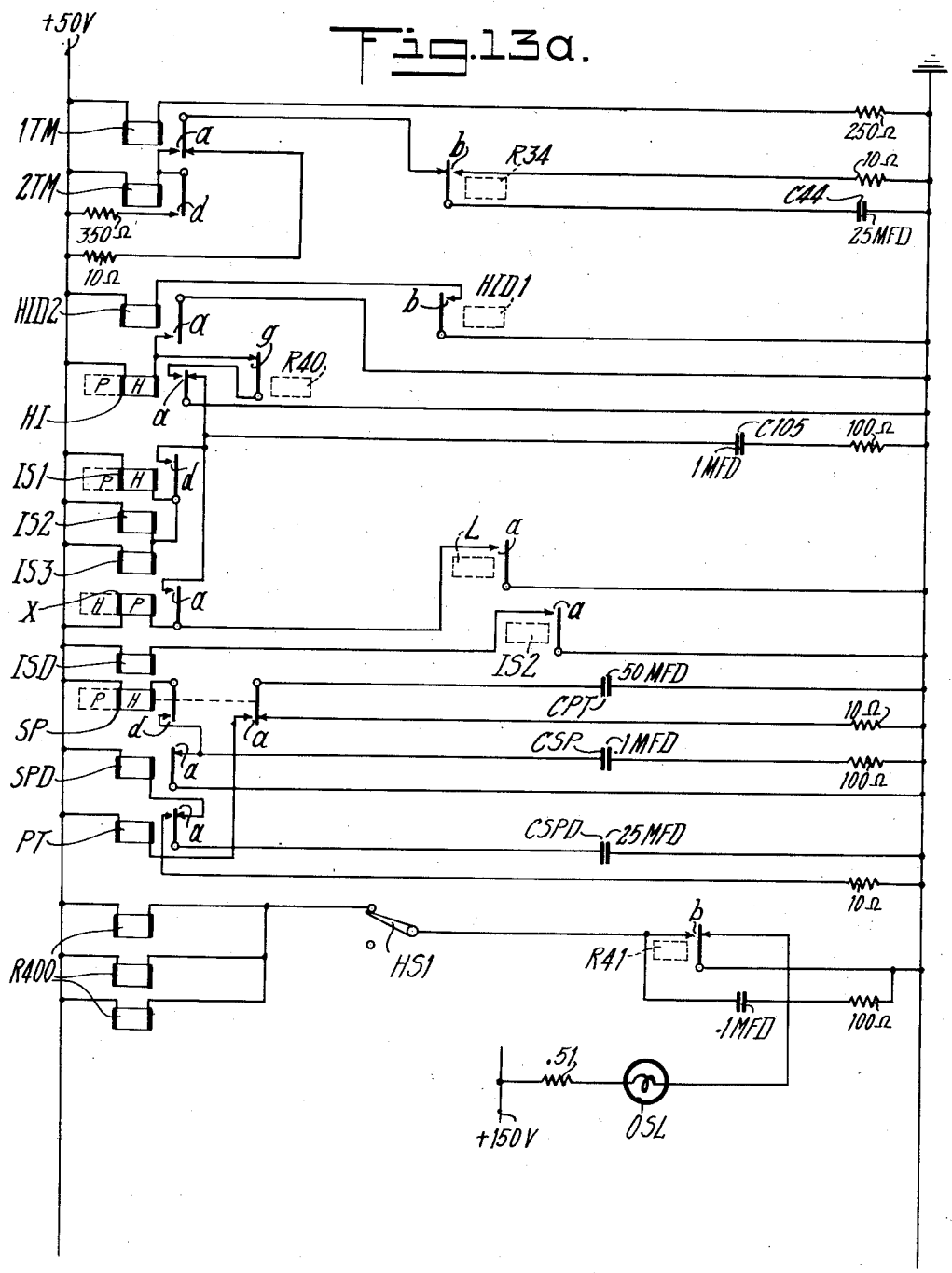

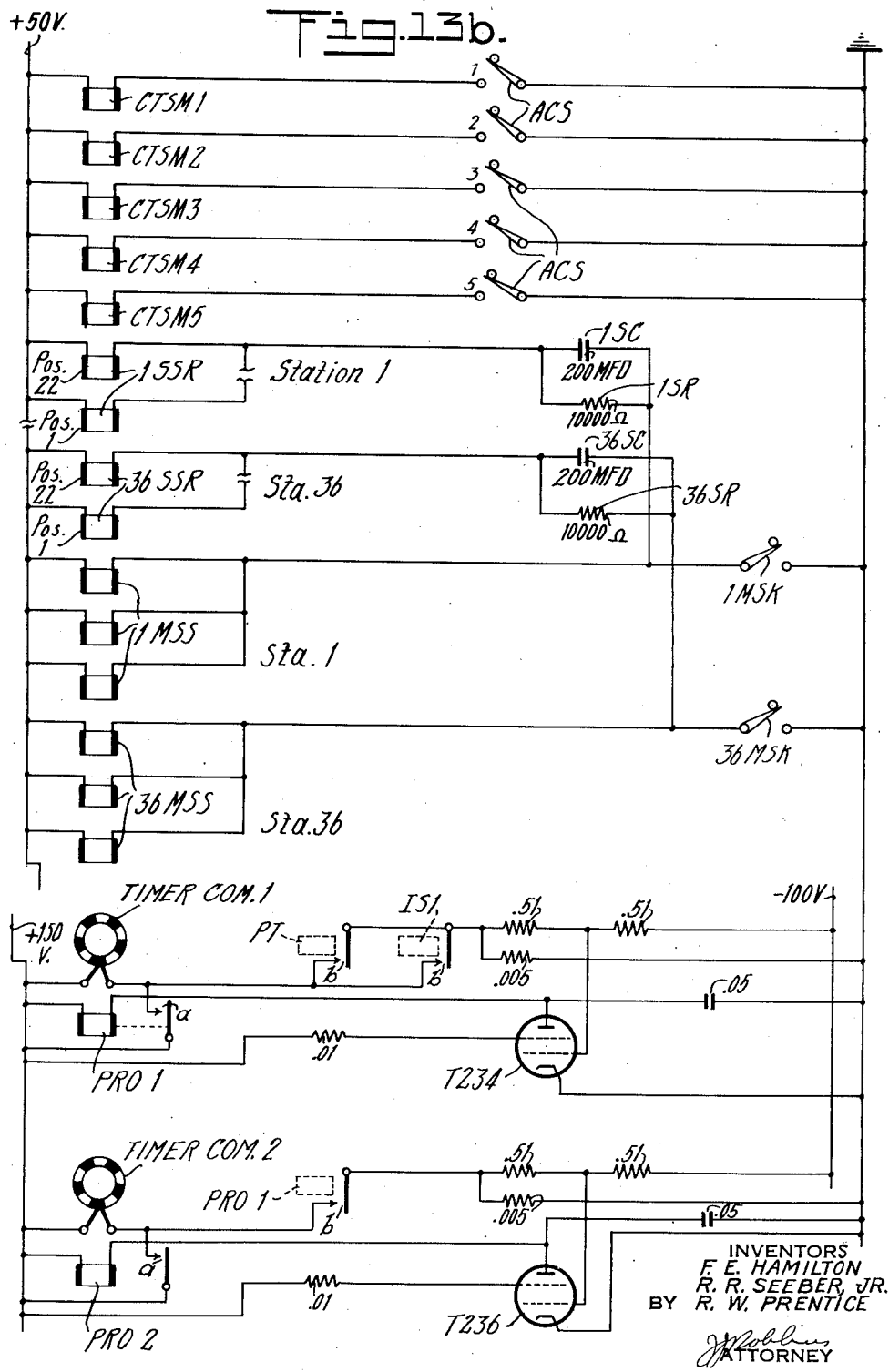

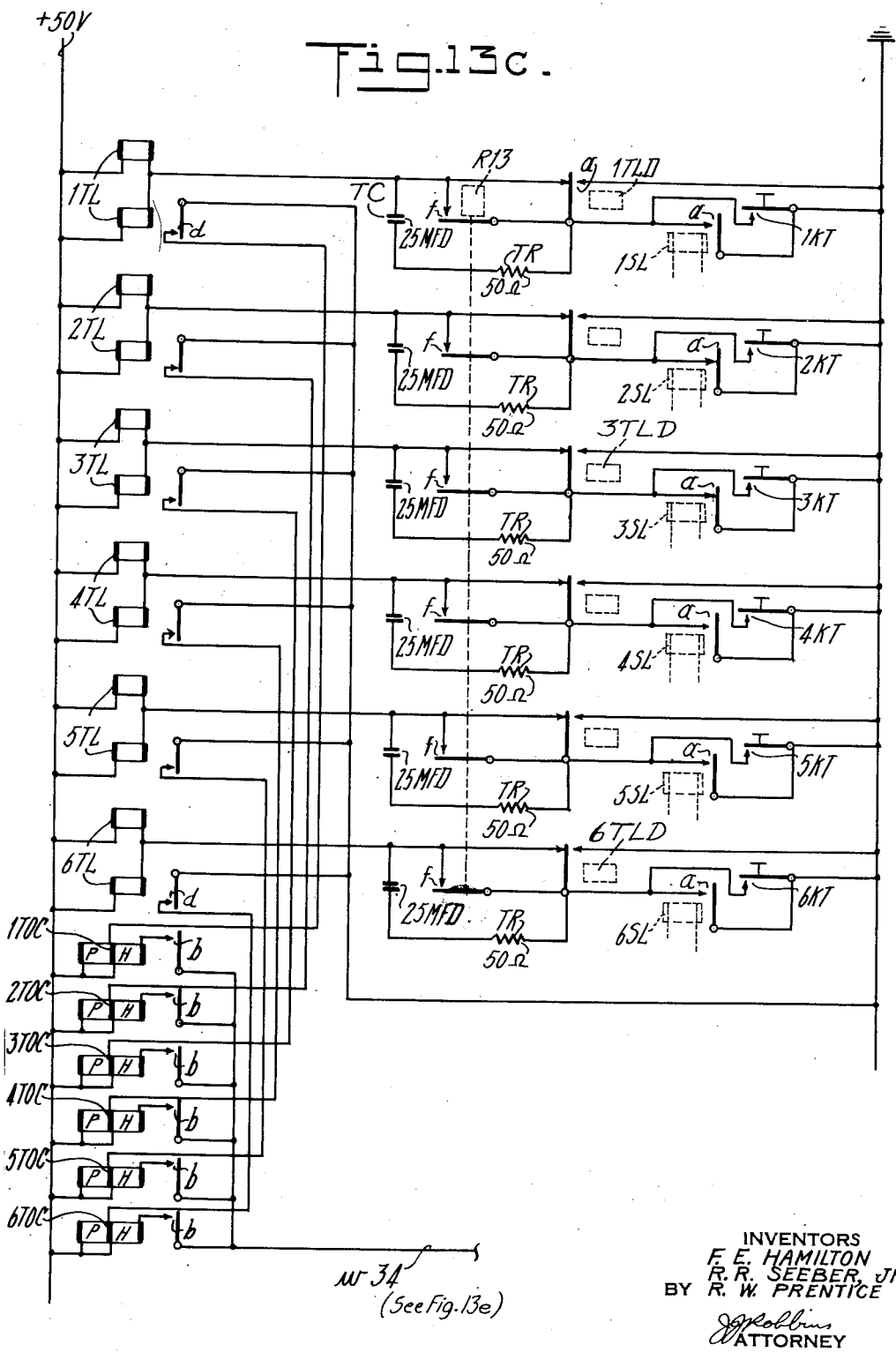

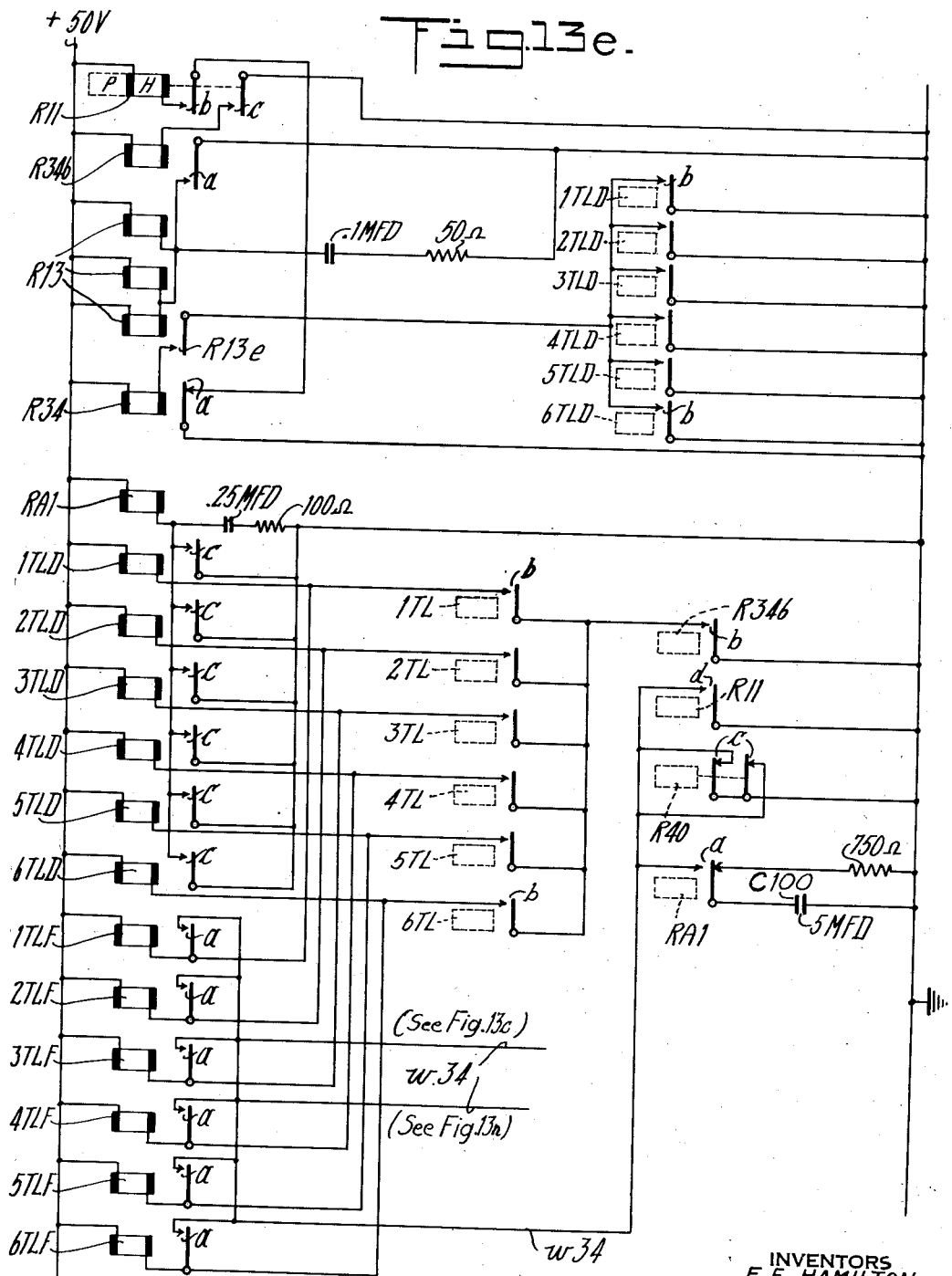

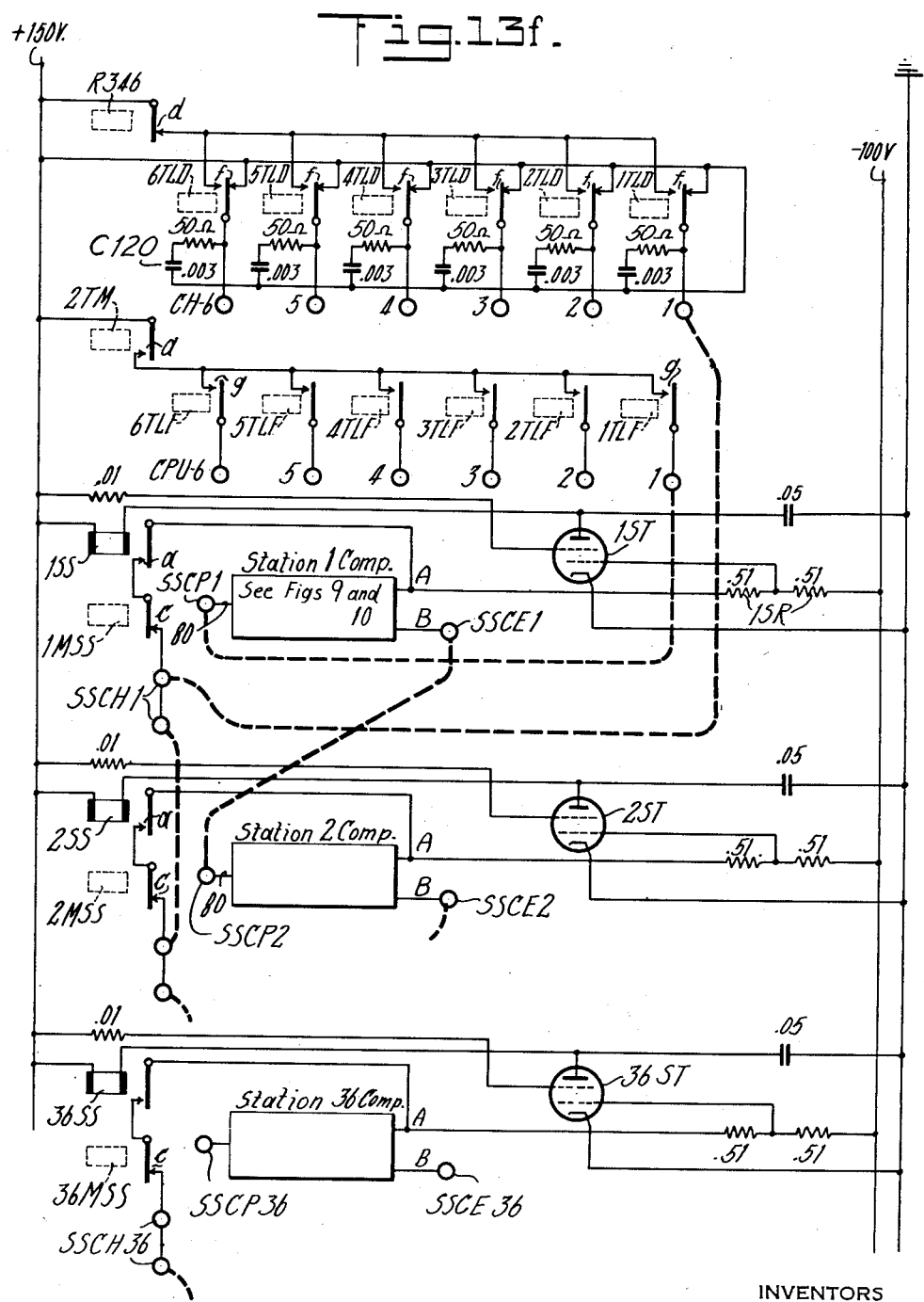

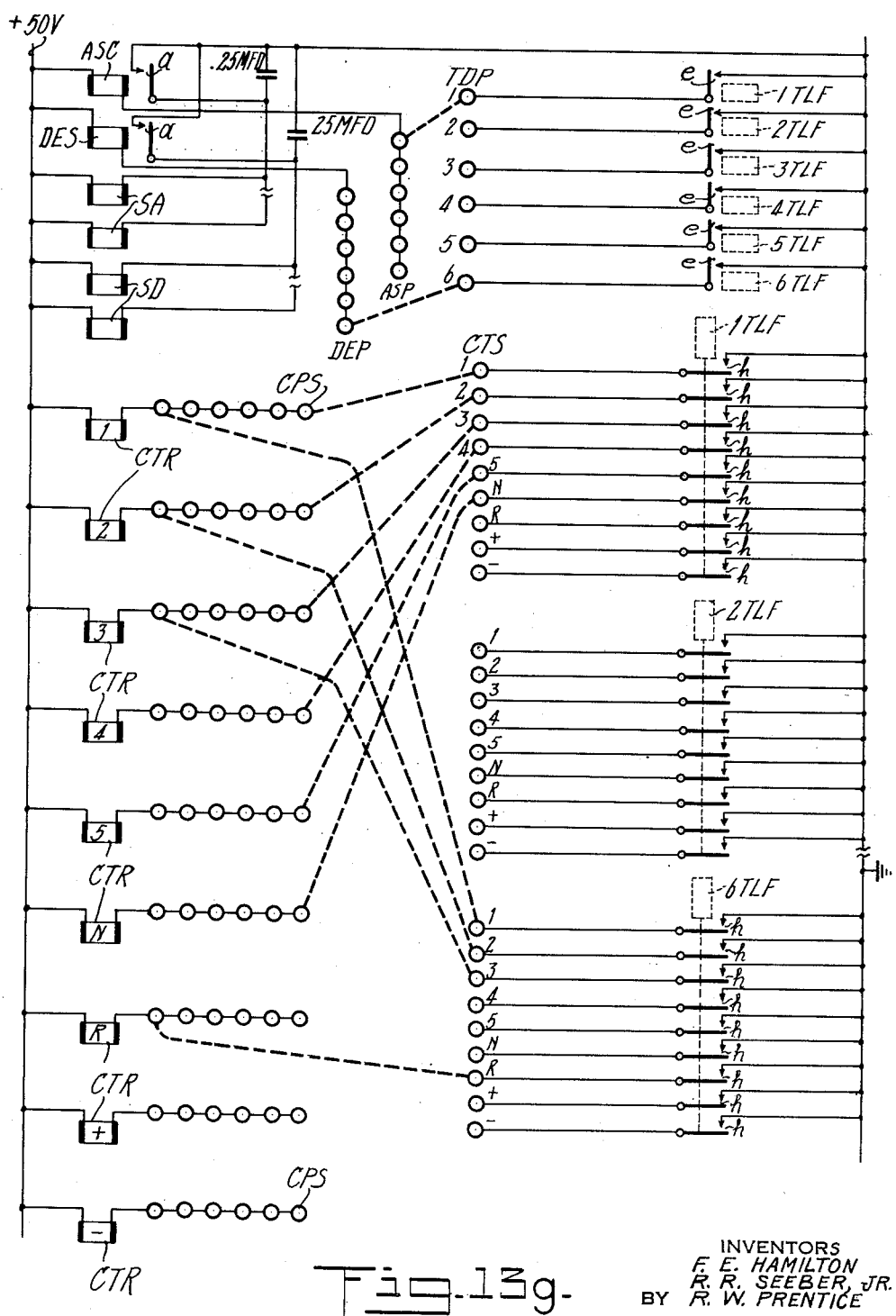

INVENTORS
F. E. HAMILTON
R. R. SEEBER, JR.
BY R. W. PRENTICE
ATTORNEY

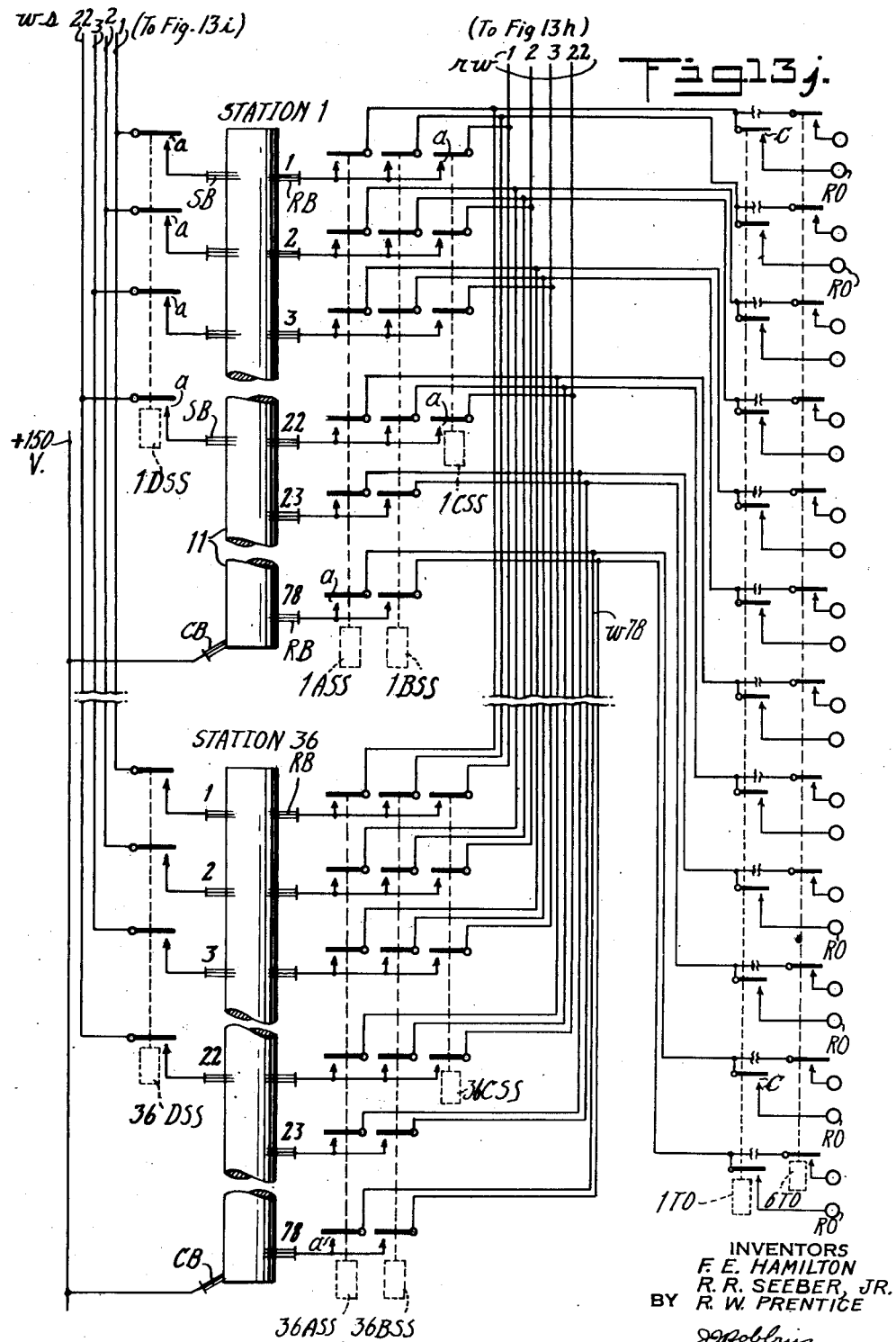

Jan. 1, 1952   F. E. HAMILTON ET AL   2,580,768
DATA LOOK-UP APPARATUS FOR COMPUTING OR OTHER MACHINES
Filed Aug. 14, 1947   23 Sheets-Sheet 19

INVENTORS
F. E. HAMILTON
R. R. SEEBER, JR.
BY R. W. PRENTICE
ATTORNEY

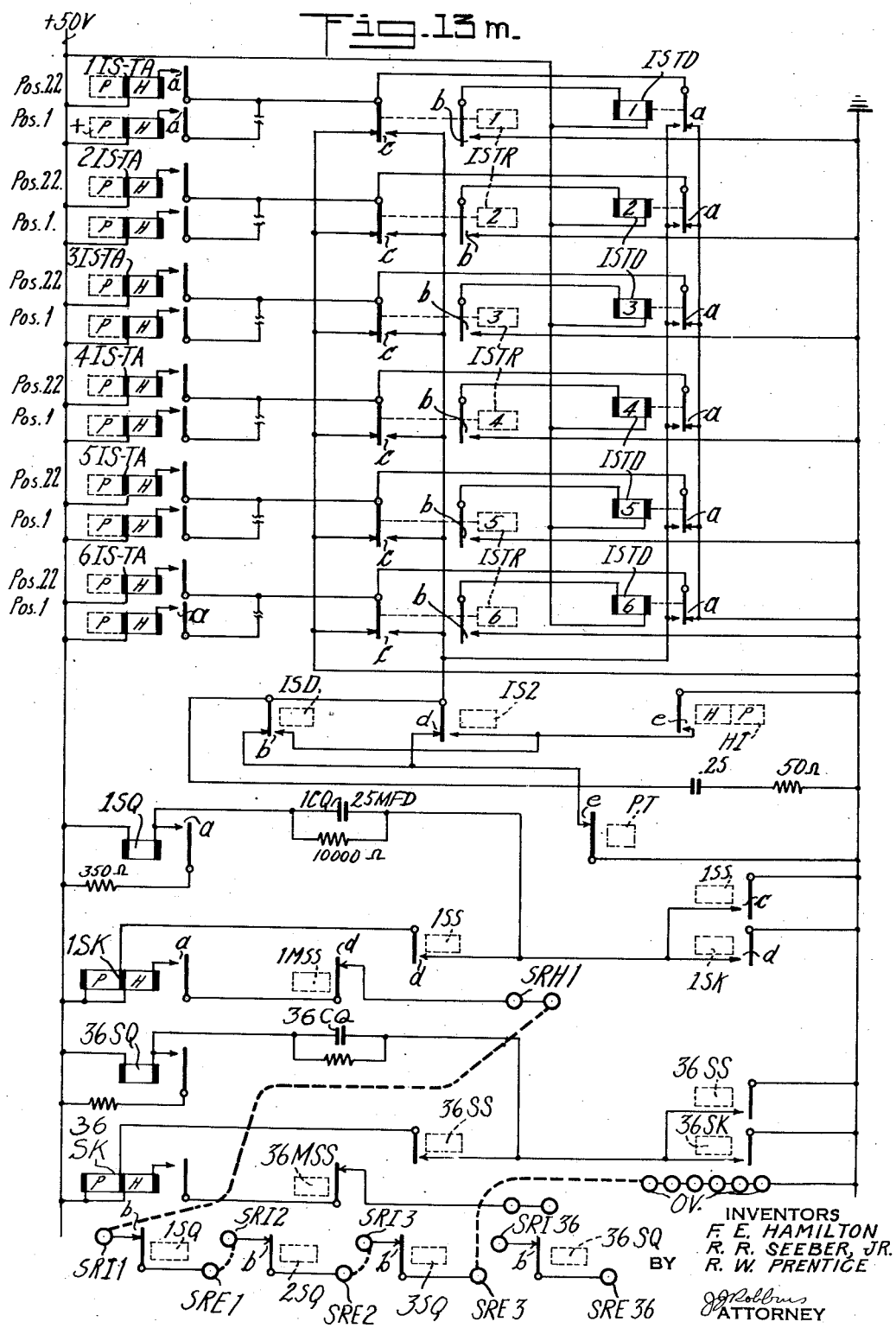

Jan. 1, 1952 — F. E. HAMILTON ET AL — 2,580,768
DATA LOOK-UP APPARATUS FOR COMPUTING OR OTHER MACHINES
Filed Aug. 14, 1947 — 23 Sheets-Sheet 22

INVENTORS
F. E. HAMILTON
R. R. SEEBER, JR.
BY R. W. PRENTICE
Robbins
ATTORNEY

Jan. 1, 1952  F. E. HAMILTON ET AL  2,580,768
DATA LOOK-UP APPARATUS FOR COMPUTING OR OTHER MACHINES
Filed Aug. 14, 1947  23 Sheets-Sheet 23
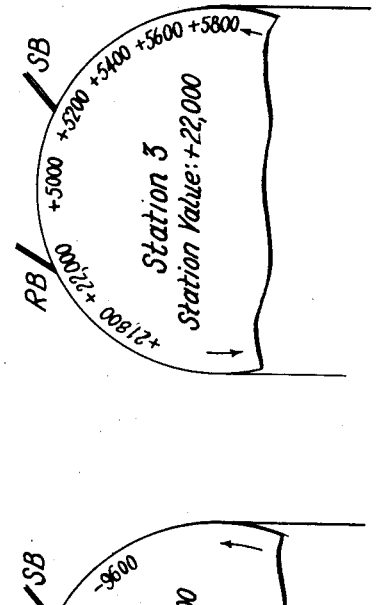
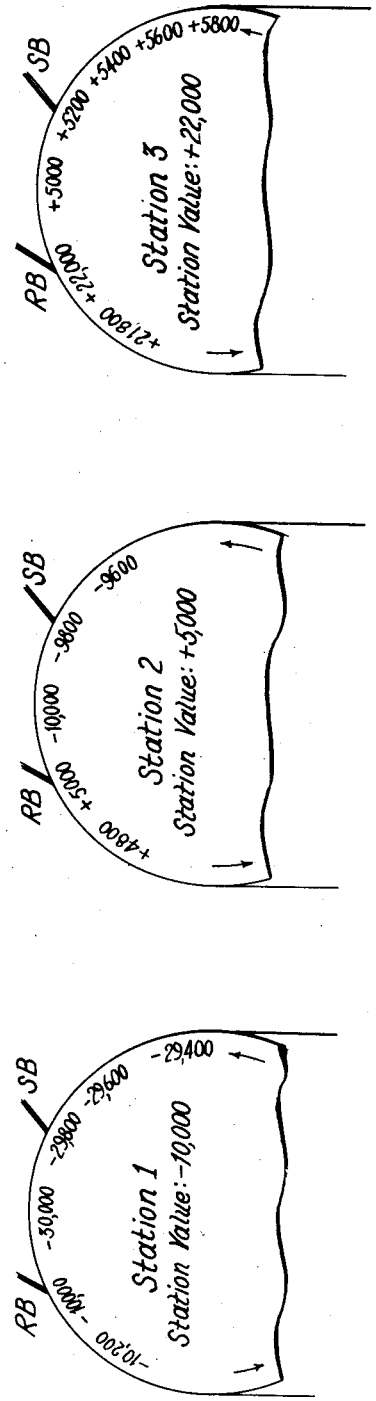
Fig.14.
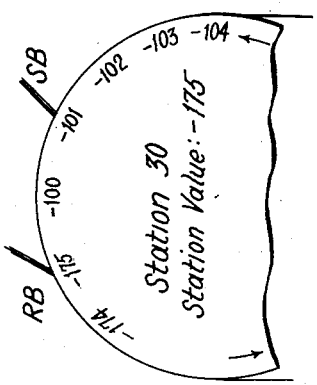
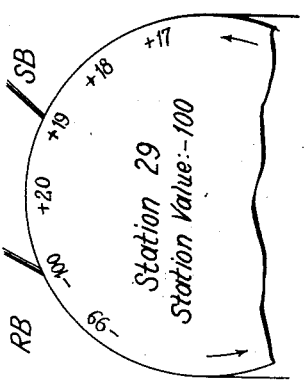
Fig.15.
INVENTORS
F. E. HAMILTON
R. R. SEEBER, JR.
BY R. W. PRENTICE
Robbins
ATTORNEY

Patented Jan. 1, 1952

2,580,768

UNITED STATES PATENT OFFICE 2,580,768

DATA LOOK-UP APPARATUS FOR COMPUTING OR OTHER MACHINES

Francis E. Hamilton, Endicott, Robert R. Seeber, Jr., Scarsdale, and Ralph W. Prentice, Newark Valley, N. Y., assignors to International Business Machines Corporation, New York, N. Y., a corporation of New York Application August 14, 1947, Serial No. 768,600

48 Claims. (Cl. 235—61)

This invention relates to the look-up section of a computing or other machine having need for stored data, such look-up section affording storage for a variety of data and means for selecting desired data out of storage. Specifically, the table look-up section which is the subject matter of this application is a part of the computing machine disclosed in application Serial No. 71,642, filed January 19, 1949, of F. E. Hamilton et al.

More particularly, the invention is concerned with a look-up section which affords data storage in the form of records at various stations and means for selecting data from the records at the stations. Specifically, the data are mathematical tables of arguments and related function values codally represented on record tapes at the stations, and the look-up means is to select arguments and related functional values involved in mathematical computations. An example of a look-up section in a computing machine and of the mathematical application of arguments and related functional values is disclosed in application Serial No. 576,892, of Lake et al., filed February 8, 1945.

The present invention provides look-up apparatus which is an improvement over prior look-up apparatus.

In the application referred to immediately above, the arguments, there called $c$ values, represented on a record tape were spaced apart by functional values, there called coefficients. Selection of an argument and its following related functional values involved step-by-step feed of the tape and the sensing of the arguments and other values while the tape was at rest between steps of feed. It was necessary to distinguish the arguments from the functional values since each was sensed by common means. Moreover, distinctive identification of the arguments was required in the look-up operation so that only one argument should be compared with a signaled value, there called the $c_x$ value and here called the computed argument. Still further, location of an argument and its following coefficients involved the counting of the number of arguments on the tape between the argument to be found and the argument at sensing position at the beginning of a look-up operation. In such procedure, it was required to skip over the coefficient fields intervening on the tape between the argument fields. To provide for skipping over of the coefficient fields during look-up operation, the number of coefficient fields following each argument had to be counted and a pre-setting made of the number of coefficient fields. The look-up procedure also required the value interval between successive arguments to be uniform and required the number of coefficient fields following each argument on a tape to be uniform. Further, it was necessary to provide for selection of a tape station by means other than the signaled value means. Also, only an argument equal to the signaled value could be selected. After finding a desired argument, it was necessary to feed the record tape in steps to bring the related functional values successively to a read position.

An object of the present invention is to provide look-up means which is extremely fast in operation as compared to prior look-up means.

An object of the invention is to increase rapidity of look-up operation by providing selecting means for a value on a record while the value field on the record is moving towards a read position, thus allowing a time interval for arrest of the record with the desired value at the read position. According to the invention, the selecting means includes means at a selector position in advance of the read position for sensing the values on a record.

An object of the invention is to provide look-up means capable of interpolating between a series of stored values, specifically arguments, to locate the stored value mathematically adjacent to a signaled value. Thus, according to the invention, the signaled value need not, although it may have, a matching value in the stored series but the signaled value may be mathematically intermediate two adjacent values in the series.

According to the invention, the look-up operation does not involve counting of arguments on a record nor is it required in the midst of look-up operation to skip past functional values, so that the arguments need no special identification on a record nor need the value intervals between the arguments in a series be uniform. The look-up means, according to the present invention, selects an argument from a series of stored arguments by comparing each of successive arguments with a computed argument until the comparison result indicates that the desired argument has been located. The comparing means is under partial control of sensing means for the stored arguments and rapidity of operation is increased by the provision of electronic discharge means in special sensing circuits. Rapidity of look-up operation is further increased by storing the arguments in succession upon a record tape and without interrupting the succession with functional values, so that sensing and comparison of the stored arguments may be done without interruption. The functional values are separately located in successive record fields.

A feature of the invention is the simultaneous presentation of a plurality of functional values at read positions to be read out in desired sequence which may include simultaneous reading out of a plurality of the selected functional values.

According to the invention, a value, stored in a record, is compared with a signaled value while the stored value is at a selector position and if a required comparison result is obtained, then a check comparison is made of the stored value with the signaled value while the stored value is at a read position.

The look-up section which is the subject of the invention may store a table of values upon a plurality of individual records and selection of one of these records and then of a value out of the selected record will be made in accordance with a signaled value. In this way, a table of values may be distributed over several short records instead of represented on a single long record and look-up operation speeded up by first selecting a short record including a desired stored value and then searching the selected short tape for the desired value. According to the invention, the records bearing a table of values may be distributed at random among a plurality of sensing and feeding stations and brought into table relationship by changeable circuit connections such as plugging connections.

An object of the invention is to provide look-up means for ascending and descending tables. An ascending table is one which has one or more records successively presenting arguments of ascending valve to sensing means. The arguments on each record of an ascending table have such ascending value relation, and the arguments on one record of such table also have an ascending value relation to the arguments on a preceding record of such table. A descending table is one which has one or more records bearing arguments which have a descending value relationship on each record and on one subsequent record after another.

A feature of the present invention is the provision of remembering means by which the record last selected from a plurality of records is remembered by storing an identification of said last selected record and which causes a departure from the normal look-up process if the same record is selected twice in succession. When a tape is looked up the first time or after another tape or tapes have been looked up, there is small possibility that the tape being looked up is presenting the desired argument or an adjacent argument at sensing position. But for repetitive look-ups, where a tape is being looked up at successive times, often advantage in speed of look-up may be obtained by exploring the position of the tape since for such repetitive look-ups, the computed argument may change in consecutive small steps.

More specifically, the invention provides means to remember the record tape station last selected and, if this same station is next selected, to cause a comparison to be made between the signaled value and each of three recorded values; namely, the value at the read position, the value at the selector position, and the value intermediate these two positions. According to this comparison, the tape at the station will either be fed a single step, or else be fed continuously as in the normal look-up operation, or remain still.

Another feature of the invention is novel comparing means which distinguishes between negative and positive values and between ascending and descending tables of stored values.

An ascending or descending series of arguments may be all positive or all negative or run from arguments of one sign to arguments of opposite sign. The signs of arguments and functional values will be represented on the records. Provision is made for taking the represented signs into account or for disregarding the represented signs and allotting predetermined signs or for treating the signs as reversed.

A feature of the invention is the provision of look-up means which upon selecting an argument stored on one record simultaneously selects the related functional values which may be on separate records.

More specifically, upon the look-up means causing movement of a record tape to locate a desired argument therein, it may simultaneously cause movement of another one or more record tapes to locate a functional value or values thereon related to the desired argument.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a diagrammatic view of the tape stations and driving means.

Fig. 2 shows a fragment of a record tape.

Fig. 3 shows a code for representing numbers and signs.

Fig. 6 is a sectional view substantially along lines 6—6 of Fig. 5.

Fig. 7 shows the upper portion of Fig. 6 with the parts in a different position.

Fig. 8 is a view of a storage relay used herein.

Fig. 9 shows the circuit, partially diagrammatically, of the common initial portion of all the comparison sections used in the look-up apparatus.

Fig. 10 shows the circuit of the terminal portion of a station comparison section.

Fig. 11 shows the circuit of the terminal portion of all other comparison sections.

Fig. 12 is a chart diagrammatically illustrating the plugging connections with respect to a chosen example.

Fig. 14 is a diagrammatic illustration of the data with respect to an illustrative table 1.

Fig. 15 is a similar illustration with regard to an illustrative table 6 and

*The record tapes and stations*

Figure 4:
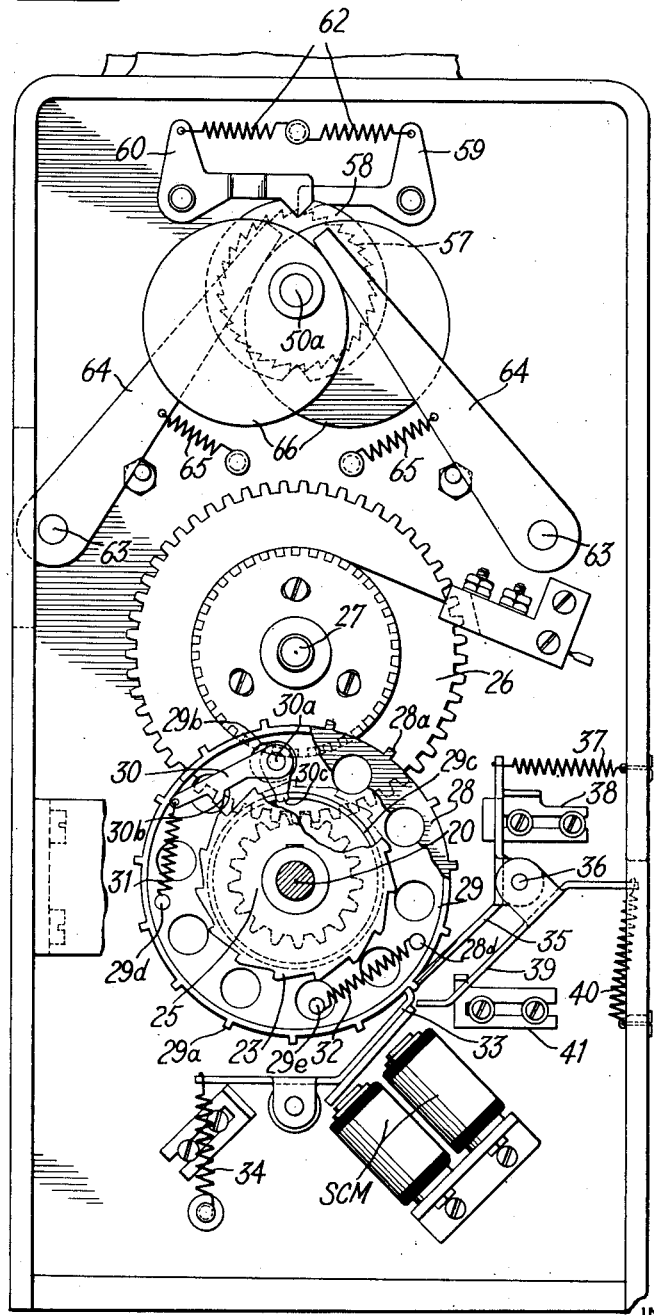
Fig. 4 is a rear elevational view of a tape station.

A portion of a record tape appears in Fig. 2. The tape has marginal feed holes 10 and transverse lines of index positions 1 to 18 for conventional oblong perforations to represent data according to a chosen code. The code preferred here is a binary term code (see Fig. 3) in which four successive index positions along a line provide a zone of four binary positions 8, 4, 2 and 1. A perforation in one of the binary positions represents the digit corresponding to the number of the position. Combinations of perforated binary positions represent the remaining digits of the decimal notation. A half zone of binary positions 2 and 1 is allotted to sign representation, a perforation in position 2 representing plus and a perforation in position 1 representing minus. It is preferred to locate the sign representing half zone of binary positions to the left of the zones of binary positions representing the value whose sign is given in the half zone. There are argument tapes and functional tapes. An argument tape is one which bears successive designation lines perforated to represent arguments and also, if desired, their signs.

It is preferred to locate the arguments on a record tape as far to the left as possible. The maximum number of digit places in the arguments of a given table determines the number of index positions from the left which are set aside as an argument field of each argument tape in the table. The maximum number of places of any arguments to be used in the present case is five so that along with its sign such argument will not require more than 22 index positions leaving 56 index positions which may be utilized for representing one or more functional values and related signs. If the arguments run to no more than four digit places, then the highest or left-hand digit place will be represented in index positions 3 to 6 inclusive, from which it is clear that a four-place argument and sign field will span index positions 1 to 18. Similarly a three-place argument and sign field will span index positions 1 to 14, and so on. The index positions to the right of the argument field may be used to represent one or more functional values and signs. The index positions 1 and 2 will always be utilized here as sign positions. These two positions ordinarily will be used for the argument signs but they may be used for the signs of functional values, if desired, in which case, the tape arguments will be accorded a selected sign by means outside the tape and described in a later section of the description. Fig. 2 shows an illustrative argument tape with five-place arguments preceded by their signs and punched to the right of the argument representations with ten-place functional values and their signs, each functional value on a designation line bearing a mathematical relationship to the argument on the same line. A functional tape is one which bears representations only of functional values and their signs, the related arguments being represented on another record tape. Each record tape is spliced at the ends to form a continuous loop. As diagrammatically shown in Fig. 1, thirty-six tape stations are provided, arranged in three tiers of twelve stations each. Each station includes a drum 11 and an associated guide structure 12 around which a record tape may be looped. In order that the record tape applied to one station should be clear of the station below, the maximum tape length is limited to 150 designation lines. To permit of ready application of a tape at a station or removal of the tape, its minimum length should be 60 designation lines. If the series of values to be recorded on a tape requires less than 60 lines, duplicate series are recorded on the tape, so that in all events the tape shall have at least the minimum length to permit its application to any of the stations.

The record tape or tapes bearing a table of arguments and functional values will be referred to as a record table or simply table. Table look-up controls, described later in relation to the circuits, limit the number of tables which should be present at the same time at the thirty-six tape stations to a maximum of six tables. A table is said to have a length equal to the number of its argument tapes and a width equal to 1 plus the number of functional tapes accompanying each argument tape. The thirty-six tape stations limit maximum length of a table to thirty-six tapes. Table read-out controls, described later, limit the maximum width of a table to twelve tapes. One or more tables, up to six tables, having various combinations of length and width, within the limits described above, may be applied to the tape stations. Thus, a single table may be applied of thirty-six tapes length and one tape width or of eighteen tapes length and two tapes wide, and so on. Two tables may be present made up for example of one table having a length of eighteen tapes and a width of one tape and another table with a length of six tapes and a width of three tapes. Various other combinations are possible limited only by the thirty-six tape stations and the number of table look-up and table read-out controls. For reasons which will become clear, in a table of multiple tape length, the end argument on a tape is repeated as the initial argument on the next tape. The end argument on an ascending tape is the highest algebraic value argument, while the end argument on a descending tape is the lowest algebraic value argument. If a table is of multiple tape width, the arguments need be punched on only one of the series of tapes in the width since the accompanying tapes of such series and which bear the extra capacity functional values may be controlled in parallel with the argument tape. The table tapes may be installed in any combination of stations and brought into table relation by plugging. It may be mentioned that the number of values on each tape of a table do not have to be equal. By the use of individual tapes, the table may be extended by inserting additional tapes or condensed by omitting tapes, depending on the range of values involved in computations to be performed.

*Mechanism of a record station*

Figure 5:
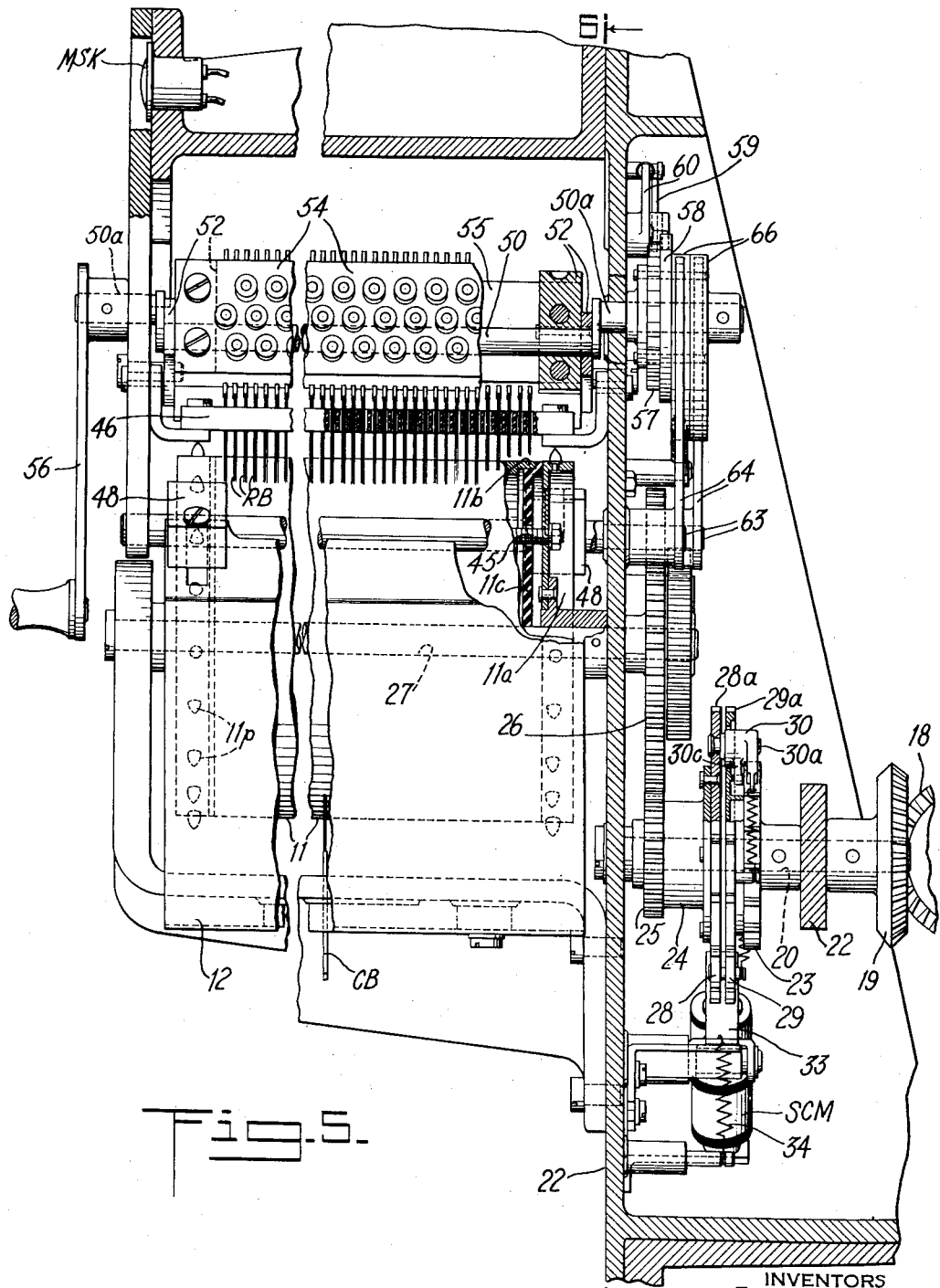
Fig. 5 is an end view of the tape station.

Figs. 4, 5, 6 and 7 provide a detailed illustration of a tape station, all of which are constructed alike. The drum 11 at each station has marginal feed pins 11p to mesh with feed holes 10 of a record tape for feeding it upon rotation of the drum. The drums 11 at the plurality of stations are individually and selectively clutchable to drive means. The drive means includes a common motor 14 (Fig. 1) kept continuously running during look-up operations. Motor 14, through a belt-and-pulley connection 15, drives one of three shafts 16 geared together by spiral gear pairs 17. Each shaft 16 is below a tier of twelve tape stations and carries bevel gears 18, one for each of these stations. Referring now to Fig. 5, each bevel gear 18 meshes with a bevel gear 19 to turn a shaft 20 which is journaled in a sub-frame 22 which mounts the elements of a tape station. Fixed on shaft 20 is a ratchet wheel 23 (also see Fig. 4) which is the drive element of a station clutch. The driven portion of this clutch includes a sleeve 24 rotatably mounted upon the shaft 20. Sleeve 24 is formed with a gear 25 meshed with a gear 26 on the shaft 27 of the station drum 11. Fixed on sleeve 24 is a toothed disk 28. Positioned between disk 28 and ratchet wheel 23 and freely mounted on sleeve 24 is a toothed disk 29. Disks 28 and 29 are of the same diameter and respectively provided with the same number of teeth 28a and 29a. Projecting from disk 28 and passing with appreciable play through an elongated slot 29b in disk 29 is the pivot stud 30a of a clutch dog 30. The clutch dog 30 lies in front of the disk 29 and has a tooth 30b to engage the driving ratchet 23. The tail 30c of the clutch dog is rounded at the free end which is seated in a notch cut in a front rib 29c of the disk 29. Thus, the tail 30c of the clutch dog has pivotal engagement with the disk 29. A spring 31 connects the clutch dog with a stud 29d projecting from disk 29. Another spring 32 is anchored at opposite ends to studs 29e and 28d of disks 29 and 28 respectively. Springs 31 and 32 urge the disk 29 to turn clockwise relative to disk 28, such relative movement, when permitted, being limited by the play of the hub of the clutch dog in notch 29b of the disk 29. The clockwise movement of disk 29 relative to disk 28 is prevented in the declutched positions of the parts (Fig. 4) by a latch 33 engaged with alined teeth of the disks. Latch 33 carries the armature of the station clutch magnet SCM and is urged to latching position by a spring 34. A rebound pawl 35 pivoted on a stud 36 is urged clockwise by a spring 37 against a stop 38 and is constantly maintained effective to prevent reverse movement of the disks 28 and 29.

To effect clutch engagement, magnet SCM is energized, withdrawing latch 33 from disks 28 and 29. Springs 31 and 32 now act to turn disk 29 clockwise relative to disk 28 and by reason of the pivotal engagement between the disk 29 and the tail 30a of the clutch dog and under the further direct pull of the spring 31, the dog is rocked into engagement with ratchet 23. Clockwise rotation of the ratchet now is transmitted to disk 28 and through springs 31 and 32 to the disk 29. Sleeve 24 rotates clockwise with disk 28 and through gears 25 and 26 rotates the tape-feeding drum 11 counterclockwise. It should be noted that in the final increment of movement of latch 33 away from disks 28 and 29, it encounters a lever 39 pivoted on stud 36 and urged by a spring 40 against a stop 41. Spring-urged lever 39 assists spring 34 in overcoming the residual attraction of magnet SCM when its circuit subsequently is broken, thus speeding restoration of latch 33 to clutch disengaging position. During rotation of the disks 28 and 29, their teeth 28a and 29a are out of alinement, disk 29 having moved clockwise to a limited extent relative to disk 28 upon release of the disks by the latch 33. Deenergization of magnet SCM to effect clutch disengagement is timed to occur just before a tooth of disk 29 reaches the latch position. Thus, latch 33 will first encounter a tooth of disk 29 and arrest it while disk 28 continues to turn until a tooth thereof meets the latch 33. While the disk 28 is moving clockwise relative to the arrested disk 29, the clutch dog 30 gradually withdraws from ratchet 23 and is free of the ratchet by the time the disk 28 is latched.

Shaft 17a (Fig. 1) carries commutator disks 42 wiped by brushes 43 to time certain operations. Three of these commutator disks and their related brushes comprise timer commutators 1, 2 and 5 shown in circuit form in circuit Figs. 13b and h. Commutators 1 and 2 will time station clutch magnet energization to insure the clutch tooth 30b (Fig. 4) dropping in midway between teeth of driving ratchet 23, thereby avoiding nicking of the ratchet and clutch teeth. The deenergization of the station clutch magnet SCM will be timed to occur just after a tooth of disk 28 has passed and just before a tooth of disk 29 is to pass the latching position. The circuits controlling energization and deenergization of the clutch magnet will be described later.

The drum 11 is built up of several parts, including end rings 11a which carry the feed pins 11p. Between the end rings is a contact cylinder 11b with a smooth periphery, preferably silver-plates. Insulating disks 11c space the cylinder from the end rings. The parts 11a, 11b and 11c are clamped tightly together by bolts 45.

Two spaced transverse lines of sensing brushes SB and RB wipe the contact cylinder. Brushes RB are used for sensing arguments, confined to index positions 1 to 22, and also for sensing functional values; hence there are seventy-eight brushes RB. Brushes SB are used only for sensing arguments; hence, only twenty-two brushes SB are required, to sense index positions 1 to 22. The brushes of each line are kept apart near their sensing tips by a fixed comb bar 46, of insulating material. Brushes SB are called the selector brushes and define the selector position, while brushes RB are called the read brushes and define the read position. The spacing between the selector and read positions is equal to the spacing around the cylinder, of alternate designation lines of a record tape. Thus, with brushes SB engaged with one designation line, the brushes RB engage the second preceding designation line, in the direction of counter-clockwise travel of the drum 11, and midway between the lines of the brushes is the designation line intermediate the designation lines under the two lines of brushes. A common brush CB (Fig. 6) constantly engages the contact cylinder. The contact cylinder and common brush together may be referred to as the brush common. It may be mentioned that when the station clutch is disengaged, the drum 11 is arrested with designation lines, of the tape on the drum, directly at the sensing positions.

The portion of the record tape adjacent to and under the sensing brushes is held taut by pressure fingers 48. The pressure fingers and the sensing brushes SB and RB are commonly adjustable, at will, from their active positions (Fig. 6) to their inactive positions (Fig. 7) remote from the drum when it is desired to remove or insert a record tape at the tape station. The adjusting means comprises an eccentric shaft 50 with end pintles 50a rotatably bearing in the subframe 22. Two parallel links 52 are pivotally supported at one end by the eccentric portion of shaft 50 and have pin-and-slot connections 52a at the opposite ends with the subframe 22. The arms 52 rigidly carry between them the brush blocks 54 and 55 which respectively mount brushes RB and SB. One of the pintles 50a carries a crank handle 56. Fixed to the other pintle are a ratchet wheel 57 and a disk 58 with diametrically opposite V notches. Detents 59 and 60 are pivoted to the subframe and urged by springs 62 into engagement, respectively with the ratchet wheel 57 and the notched disk 58. Coaction of detent 59 with the ratchet wheel restricts the shaft 50 to rotative adjustment in one direction. The detent 60 is seated in one of the V notches of disk 58 when the parts are in the positions shown in Figs. 4 and 6. When shaft 50 is given half a turn by handle 56, it lifts the links 52, adjusting the brushes SB and RB to elevated positions remote from the drum, as shown in Fig. 7. The detent 60 springs into the other of the V notches in disk 58 when the half turn of the crank shaft is completed. Detent 60 thus coacts with disk 58 to releasably latch the crank shaft and the parts operated thereby either in the positions shown in Fig. 6 or the positions shown in Fig. 7. To return the parts from inactive positions to active positions, the shaft 50 is turned through the second half of its revolution, at the completion of which the detent 59 springs into a V notch of disk 58 to position the brushes accurately on the drum.

The pressure fingers 43 are clamped on a pair of shafts 63 turnable in the subframe. Each of shafts 63 fixedly carries at its right hand end (Fig. 5) an arm 64 to which springs 65 (Figs. 4 and 7) are connected. The free ends of the arms 64 rest against the peripheries of a pair of cams 66 fixed, in front of notched disk 58, to the right-hand one of the pintles 50a of the shaft 50. With the shaft 50 in the position shown in Figs. 4 and 6, the cams 66 allow the arms 64 to be closest to each other and the pressure fingers 48 to press against the record tape on the drum 11. When the crank shaft is given half a turn to the position shown in Fig. 7, the cams 66 rock the arms 64 apart, displacing the pressure fingers to positions away from the drum. Thus, the pressure fingers and the sensing brushes are commonly adjustable from the positions shown in Fig. 6 to the positions shown in Fig. 7, and vice versa. It may be noted that the pressure exerted by arms 64, under the influence of springs 65, against the cams 66 helps to prevent unintentional movement of the adjusting means for the sensing brushes and the pressure fingers. Also, the pressure fingers not only serve to keep the record tape taut under the sensing brushes but they exert a braking effect on rotation of the drum 11 and its drive gearing. This braking effect is desirable to prevent overrunning of the drum with respect to the drive means, particularly at the time the station clutch is being engaged.

*Station key switches and station storage*

Each station is provided with key switches MSK and SMK, respectively known as the station storage and station move key switches. The end argument on an argument tape installed at a station represents the station argument value which is retained in station storage until a new tape is installed, and is used in station selection during a look-up operation. As previously stated, the end argument on a descending argument tape is the lowest algebraic argument and on an ascending tape is the highest algebraic argument. To provide for insertion into station storage of the end argument on a tape, upon installation of the tape at the station it is conveniently advanced under control of move key switch SMK, in a manner described later, to a position in which its end argument is under the read brushes RB of the station. The end argument is then entered into station storage under control of the station storage key switch MSK, entry of a new station value being preceded automatically by the clearing of the previous station value out of station storage, all as will be described in detail later in connection with the circuits. It is understood that when a table of multiple tape width is installed, the functional tapes will be positioned initially with the functional values related to the end arguments under the read brushes of the carrying stations.

Station storage is provided by storage relays of the mechanically latched type. As previously stated, a tape argument is not to exceed a five decimal notation place number which, along with its sign, requires twenty-two index positions along a designation line. Hence, twenty-two station storage relays are provided for each station storage of the thirty-six stations. Fig. 8 shows the particular storage relay used. It comprises a magnet S-TA which upon energization attracts its armature 75 to close relay contacts. After deenergization of magnet S-TA, the armature is retained in attracted position by the latching armature 76 of a latching magnet SSR. In a manner explained later in connection with the circuits, when a new station value is to be entered, all twenty-two magnets SSR of the station storage are momentarily energized to release the armatures 75 while the magnets S-TA of station storage are energized selectively according to the new station value. Magnets SSR are deenergized before the selectively energized magnets S-TA so that the new station value storage setting will be retained by the restored latching armatures 76.

*Comparison sections*

There are thirty-six station comparison sections, each to compare one of the station values with a computed argument. Six intermediate comparison sections selectively compare a computed argument with the intermediate arguments at selected stations, such intermediate argument at a station being the tape argument between the read and selector positions. A selector brush comparison section compares a computed argument with the argument under the selector brushes at any selected station. A read brush comparison section compares the computed argument with the argument under the read brushes at any selected station. Except for the end arrangements, all the comparison sections are alike.

Fig. 9 shows the like portion of all the comparison sections. Relays generally designated TA are selectively energized to manifest signs and binary terms of a tape argument. Relays generally designated CA are those selectively energized according to signs and binary terms of the computed argument. Potential on incoming line 80 is directed via contacts $a$ of TA— and $a$ of CA+ to line CSH if a negative tape argument is being compared with a positive computed argument. If their signs are reversed, then the line 80 is connected via $a$ of TA+ and $a$ of CA— to a line TSH. Should the signs be equal, the potential is fed either via $a$ of TA+ and $b$ of CA+ or $a$ of TA— and $b$ of CA— to the numerical value comparison elements. It is clear that a sign comparison is made first and if the signs are unlike then the numerical value comparison elements are by-passed. As the arguments are limited to a maximum of five places, each comparison section includes only five groups of numerical comparison elements each group for comparing the binary positions of matched places of the tape and computed arguments. The 1st, 2nd, etc. groups respectively compare the highest or first from the left places, the next lower or second from the left places, etc. If the arguments run to five places, then all five groups of numerical comparison elements are allowed to function. If only four-place arguments are to be compared, then the 5th group is allowed to remain idle, and the 1st, 2nd, 3rd, and 4th groups will function to compare the first, second, third and fourth places from the left, respectively, of the tape and computed arguments. Similarly three-place arguments will be compared by the 1st, 2nd, and 3rd groups of numerical comparison elements and the 4th and 5th groups will be held idle; two-place arguments will be compared by the 1st and 2nd groups, and the remaining groups will be held idle; and one-place arguments will be compared by the 1st group, and the remaining groups will be inactive. In this connection, it is to be noted that the tape arguments will be disposed on the tapes as far to the left as possible and that computed arguments will be entered as far to the left as possible in computed argument storage. Thus, a known and definite positional relationship will be maintained among the comparison elements, sensing elements, and storage elements.

The 1st group of numerical comparison elements of a comparison section is shown complete in Fig. 9; the remaining four such groups are alike and shown in box form. Numerical comparison testing proceeds from high place to low place sequentially; that is, the 1st, 2nd, 3rd, 4th, and 5th groups function seriatim. With respect to each group, the comparison is made sequentially of the 8, 4, 2, and 1 binary positions. The elements relating to these positions are indicated by the numbers appended to the general reference characters; e. g., TA8 and CA8 relate to binary positions 8. If in the first left-hand zones of the tape and computed arguments, the binary positions 8 are "live," then CA8 and TA8 are both energized, then the path of potential is through the lower side of contacts $a$ of CA8 and the upper side of contacts $a$ of TA8 to the binary positions 4 comparing elements. If both CA8 and TA8 are deenergized, a circuit path to the binary positions 4 comparing elements is made via the upper side of $a$ of CA8 and the lower side of $b$ of TA8. It is clear that if the binary positions 8 in matched places of the computed and tape arguments are in equal status, that a comparison test is next made of binary positions 4 of the same matched places. As long as equal numerical relationship is detected, the comparison testing potential is passed on to the next pair of comparison relays and eventually to a line CET. If a pair of comparison relays detects inequality, the potential is diverted either to line CAH or TAH. Thus, if in the 1st group, CA8 is energized and TA8 is deenergized, the potential is diverted to line CAH via the lower side of $a$ of CA8 and the lower side of $a$ of TA8. If TA8 is energized but not CA8, the path to line TAH is made via the upper side of $a$ of CA8 and the upper side of $b$ of TA8.

In short, if signs of the tape and computed arguments are alike, the relation of the arguments is dependent on their numerical values. If the signs are unlike, the plus sign dominates regardless of numerical value. The comparison section thus leads the potential applied to line 80 selectively to one of the following lines: line CSH if the computed argument is superior by reason of sign, line TSH if the tape argument is superior by reason of sign, line CAH if the signs are alike and the computed argument is numerically superior, line TAH if the signs are alike and the tape argument is numerically superior, and line CET if the signs and numerical values of the compared arguments are alike.

Fig. 10 shows the terminal portion of a station comparison section. Fig. 11 shows the general terminal portion of other comparison sections. These other comparison sections include the six intermediate comparison sections and a selector brush comparison section and a read brush comparison section (see Fig. 13$k$). The comparison must take into account whether the chosen table is ascending or descending. All the terminal portions of the comparison sections, therefore, include points of relays SA and SD. Relays SA and SD are energized to manifest ascending and descending tables respectively. The circuits for selectively energizing these relays will be described subsequently. It is sufficient for the present to state that when a table is selected for lookup, then relays SA or SD are energized according to whether the chosen table is ascending or descending.

The terminal portions of the comparison sections also must take into account whether the signs of the compared arguments are both positive or negative. If the arguments are of like sign, then the comparison is determined by the numerical relationship of the arguments. However, a superior negative numerical argument is the algebraically inferior argument. Accordingly, the signs must be considered by the comparing section after the numerical relationship is determined. Potential will be present on line CAH or TAH or CET only if the signs are alike; hence it is sufficient to manifest the signs by points of relays TA+ and TA− following the numerical value comparison portion. The selector brush comparison section is involved in so-called intrastation selection which will now be described.

*The intrastation selection*

After a signaled value or variable, here termed for convenience the computed argument, has been received by the look-up unit, it is compared with the station arguments of the chosen table in order to effect station selection. The requirements for station selection flow from the requirements for intrastation selection. Intrastation selection is the singling out and positioning under the read brushes of the selected station of a desired one of the tape arguments of the selected station, and in the case of a multiple tape-width table also results in the selection of the correlated functional values. When a station in a table has been selected for the first time or after a different station in the same table has previously been looked up, the intrastation selection involves the comparison of the computed argument with tape arguments successively sensed only by the selector brushes of the selected station. For convenience, this may be called the regular or normal intrastation selecting operation. When the station in a table is selected two or more times in direct succession, the position of the tape at the selected station is tested to determine whether the desired tape argument is under the read brushes of the selected station or is in the position intermediate the read brushes and the selector brushes of this station. Such test of the tape position is effective under control of remembering means which will be described in a subsequent section of the description. The remembering test involves the comparison of the computed argument with the tape argument under the read brushes of the selected station or also may involve the comparison of the computed argument with the tape arguments under the read brushes and in the intermediate position or may also involve the comparison of the computed argument with the tape arguments under the read brushes, in the intermediate position, and under the selector brushes. In accordance with this remembering test or check, the normal intrastation selection may be entirely suppressed or may be modified to a one-step tape feed operation or may be performed in the normal manner. With respect to the normal intrastation selection, it is to be noted that the search for the desired argument is made by the selector brushes while the record tape is in motion. Since the selector brushes are in advance of the read brushes, they can pre-sense the desired tape argument while the record tape is moving rapidly. This affords sufficient time to arrest the tape with the desired tape argument moved to the read brush position. The desired tape argument is not necessarily algebraically equal to the computed argument. The desired tape argument may be the algebraically next lower tape argument in an ascending table or the algebraically next higher tape argument in a descending table. The functional values sought for are to be used by the computing means (not shown) in interpolation calculations, such as performed, as one specific example, with the Taylor series $$f(x) = f(a+h) = C_0 + C_1 h + C_2 h^2 + \ldots C_n h^n$$

where $a$ is the selected tape argument and where the terms $a$ and $h$ may be positive or negative. When using an ascending table, the selected tape argument value will be either equal to or algebraically less than the computed argument. When using a descending table, the selected tape argument will be either equal to or algebraically higher than the computed argument. Considering an ascending table, if the computed argument $a$ is positive, a tape argument equal to the computed argument will be selected but if no equal tape argument is present, then the tape argument next algebraically lower than the computed argument will be selected. Still considering an ascending table, if the computed argument $a$ is negative, then the tape argument selected will be the one next algebraically lower than the computed argument.

It is understood from the foregoing that in dealing with an ascending table, the intrastation selection, if the computed argument is positive, must select a tape argument equal to or algebraically lower than the computed argument, but if the computed argument is negative, then a tape argument algebraically lower than the computed argument must be selected.

In considering a descending table, the intrastation selection must operate to these ends: If the computed argument is negative, then a tape argument equal to the computed argument is to be selected, but if the table does not have an equal tape argument, then the tape argument next algebraically higher is to be selected. If, still dealing with a descending table, the computed argument is positive, then the selected tape argument will be algebraically higher than the computed argument.

The intrastation selection will select the proper tape argument according to the requirements given above. The selection will result in locating the desired tape argument under the read brushes of the selected station. This is done under control of the selector brushes of the selected station which are the only brushes reading the record tape in motion. The sensing of tape arguments by the selector brushes, during intrastation operation, will cause energization of the TA relays of the selector brush comparison section (see Fig. 13k). The CA relays of this, as well as all the other comparison sections, are operated according to the computed argument. The terminal portion of the selector brush comparison section is such as shown in Fig. 11 with a jumper, indicated by the dot-and-dash line, connecting output lines C and B. The selection relays will be explained subsequently when the circuit will be described. It is sufficient now to state that a selection of the tape argument is made when the selector brush comparison section applies potential upon its output line A following application of potential upon its output lines B and C. During the intrastation selection, the selected station clutch is engaged so that the record tape is in motion. The selector brush comparing section is continually comparing the computed argument with the tape arguments successively passing and sensed by the selector brushes. One such comparison causes potential to be placed on line A after potential has already been applied to lines B and C. As a result, in a manner explained later in the circuit description, the station clutch is disengaged, but the driven clutch parts are not latched up until the record tape has advanced one line space following the last mentioned comparison. In further explanation, four distinct cases of tape arguments sought in tables 1 and 6 (see Figs. 14 and 15) will now be discussed:

*Case 1.—Positive computed argument and ascending table*

Assume the computed argument is +5400 and table 1 is chosen. In a manner described later, station comparison occurs and selects station 3. The station 3 clutch is engaged and the record tape at this station fed. Assume that initially +5200 is under brushes SB. Since the signs of the computed and tape arguments are alike and the computed argument is greater than +5200, the initial comparison portion (Fig. 9) of the selector brush comparison section places potential on line CAH. Referring now to Fig. 11, the potential on line CAH is transmitted via $c$ of TA+ and $b$ of SA to lines B and C. The next tape argument passing the brushes SB is +5400 which is equal to the computed argument +5400. Potential therefore is on line CET (Figs. 9 and 11) of the selector brush comparison section. This potential is transmitted via $c$ of SA and $d$ of TA+ to lines C and B. The next tape argument sensed by brushes SB is +5600 which is greater than the computed argument +5400. Consequently, there is potential on line TAH which is transmitted via $b$ of TA+ and $a$ of SA to line A. Potential on line A following application of potential to lines B and C results in declutching of station 3, and the record tape stops after completing a line space which brings +5600 to the intermediate position, between the selector brush position and the read brush position. The preceding tape argument +5400 is under brushes RB and the argument +5800 will be under brushes SB. If the computed argument were +5500 instead of +5400, the tape argument +5400 nevertheless would be selected. This is because potential on line A after potential on lines B and C would not exist until +5600 has been sensed by brushes SB. Accordingly, the record tape will again stop with +5400 under brushes RB.

The general rule to be deduced from Case 1 is that for an ascending table, if the computed argument is positive, then the intrastation selection will select a tape argument equal to or next algebraically lower than the computed argument.

*Case 2.—Negative computed argument and ascending table*

Assume table 1 is chosen and the computed argument is —29,600. Station 1 will be selected and its clutch engaged. Assume that —29,300 is initially under brushes SB. Since the signs of the computed and tape arguments are alike and the tape argument is numerically greater, potential is fed to line TAH of the selector brush comparison section. The potential on TAH is transmitted via $b$ of TA— and $b$ of SA to lines B and C. Thus, the sensing by the brushes SB of the algebraically lower tape argument results in application of potential to lines B and C. The next tape argument sensed by brushes SB is —29,600 which is equal to the computed argument. Accordingly, there is potential on line CET which is transmitted via $c$ of SA (Fig. 11), $e$ of TA— and $a$ of SA to line A. The tape will stop, as a result, with —29,600 in the intermediate position, with —29,400 under brushes SB, and with —29,800 under brushes RB. It is seen then that for an ascending table, if the computed argument is negative, the selected tape argument is the one next algebraically lower than the computed argument. If instead of the computed argument being —29,600, it were —29,700, the selected tape argument still would be the next algebraically lower tape argument —29,800. Comparison of —29,600 under brushes SB with the computed argument —29,700 would result in application of potential to line CAH, thence via $c$ of TA— and $a$ of SA to line A. Hence, the tape would stop with —29,800 under brushes RB.

The general rule to be deduced from Case 2 is that for an ascending table, if the computed argument is negative, then intrastation selection will select the tape argument next algebraically lower than the computed argument.

*Case 3.—Positive computed argument, descending table*

For a descending table, the effects are reverse to those obtained for an ascending table, as will appear. Assume table 6 has been chosen and the computed argument is +18. Accordingly, station 29 will be selected. Assume also that +19 is initially under brushes SB. Accordingly, potential is transmitted to line TAH of the selector brush comparison section and via $b$ of TA+ and $a$ of SD to lines B and C. The next tape argument under brushes SB is +18, equal to the computed argument. Accordingly, there is potential on line CET which is transmitted via $c$ of SD, $e$ of TA+ and $b$ of SD to line A. Hence, the tape will stop with +18 in intermediate position, +19 under brushes RB and +17 under brushes SB. The rule for Case 3 is, then, that for a positive computed argument and a descending table, the tape argument selected is the one next algebraically higher than the computed argument.

*Case 4.—Negative computed argument, descending table*

Assume table 6 has been chosen and the computed argument is —102. Accordingly, station 30 is selected. Suppose —101 to be under brushes SB. Accordingly, potential is applied to line CAH (Figs. 9 and 11) thence via $c$ of TA— and $a$ of SD to lines B and C. The next tape argument under brushes SB is —102 which is equal to the computed argument. Hence, potential is in line CET and transmitted via $c$ of SD and $d$ of TA— to lines C and B. The next tape argument sensed by brushes SB is —103. Accordingly, the comparison with the computed argument —102 results in application of potential to line TAH, thence via $b$ of TA— and $b$ of SD to line A. Therefore, the tape will stop with —103 in the intermediate position, —104 under brushes SB, and —102 under brushes RB. It is seen that if the descending table has a tape argument equal to the negative computed argument, then this equal tape argument is selected. If the descending table did not provide a negative tape argument to match the negative computed argument, then the next algebraically higher tape argument would be selected. Assume, for instance, that the arguments at station 30 were multiplied by 10 and, therefore, that the argument interval were 10. Assume, further, that the computed argument were —1025. With —1010 under brushes SB, the comparison would result in potential being applied via CAH, $c$ of TA— and $a$ of SD to lines B and C. With the next argument —1020 under the brushes SB, potential again would be led to lines B and C. With the next argument —1030 under brushes SB, potential would be placed on the line TAH and transmitted via $b$ of TA— and $b$ of SD to line A. Hence, the tape would stop with —1030 in the intermediate position and —1020 under brushes RB. It is to be noted that —1020 is the tape argument next algebraically higher than the computed argument —1025. The rule for Case 4 is, then, that for a descending table and a negative computed argument, intrastation selection will select the tape argument equal to or next algebraically higher than the computed argument.

Briefly summarized, the rules of intrastation selection are:

1. Ascending table, positive computed argument; select equal or next algebraically lower tape argument as a result of selector brushes sensing an algebraically higher tape argument following an algebraically lower or equal tape argument.

2. Ascending table, negative computed argument; select first algebraically lower negative tape argument as a result of the selector brushes sensing of an equal or first algebraically higher tape argument following a low tape argument.

3. Descending table, positive computed argument; select first algebraically higher tape argument as a result of selector brushes sensing an equal or first algebraically lower tape argument following an algebraically higher tape argument. (Note that rules 2 and 3 have opposite requirements.)

4. Descending table, negative computed argument; select equal or first algebraically higher tape argument, as a result of selector brushes sensing of an algebraically lower tape argument following an equal or algebraically higher tape argument. (Note that rules 1 and 4 have opposite requirements.)

It should be noted that if potential is on line TSH, indicating a positive tape argument and a negative computed argument, that the potential will be transmitted via a of SA to line A (Fig. 11) if the table is ascending and via a of SD to lines B and C if the tape is descending. Thus, for an ascending table, potential on line TSH is routed to line A as a manifestation of a higher tape argument under the selector brushes, while for a descending table, the potential on line TSH is transmitted to lines B and C. Similarly, potential on line CSH is transmitted to lines B and C, via b of SA, if the tape is ascending or to line A, via b of SD, if the tape is descending.

*Station selecting comparison*

Station selection is the singling out for intrastation selecting operation of that one of the stations, of a chosen table, which has the desired tape argument. The station selection involves the comparison of the computed argument with the station values, one after another, of the successive stations of the chosen table. For each station, there is a comparison section, the terminal portion of which is shown in Fig. 10 where the relays generally designated TA are further distinguished as S-TA since they are the station argument storage relays (also see Fig. 8). The comparison testing potential will be applied to line 80 (Fig. 9) of the station comparison section of the first station in the chosen table. If potential is transmitted by this section to the exit line A (Fig. 10), the station is selected and no potential is applied to the next station comparison section. But if potential is transmitted by the first station comparison section to the line B (Fig. 10), the station is not selected and the potential is directed from line B to the input line 80 of the next station comparison section.

The requirements for station selection flow from and are consistent with the rules for intrastation selection. In general, that station will be selected which has a range of tape arguments embracing the computed argument. When the computed argument and the station value are equal, selection of the station or the next (the initial argument of which is the same as the end argument and station value of the preceding station) will be selected, depending on whether the chosen table is ascending or descending and on whether both compared arguments are positive or negative.

The pertinent portions of the rules for intrastation selection and the related conditions of station selection are given below:

*Rule 1.*—Ascending table, positive computed argument; the selector brushes must sense an algebraically higher tape argument following an algebraically lower or equal tape argument.

If the station argument is negative, it is algebraically lower than the positive computed argument; potential is on line CSH (Figs. 9 and 10) and fed via b of SA to line B. If the station argument also is positive but numerically lower, potential is on line CAH and fed via c of S-TA+ and b of SA to line B. If the station argument is positive and numerically equal to the positive computed argument, potential is on line CET and fed via d of S-TA+ and b of SA to line B. It is clear, then, that if the station argument is equal to or algebraically lower than the computed argument the station is not selected and the comparison potential is directed to the next station comparison section. The initial tape argument of this next station is equal to the end tape argument or station argument of the preceding station. Hence, it is evident that this next station includes an argument equal to or algebraically lower than the computed argument. If the station argument of this next station is algebraically higher than the positive computed argument, potential is on line TAH and fed via b of S-TA+ and a of SA to line A, causing selection of the station. This station has a tape argument which is algebraically higher than the positive computed argument and also has a tape argument algebraically lower or equal to the computed argument. Thus, the proper station has been selected for allowing the intrastation selection to be performed according to rule 1.

*Rule 2.*—Ascending table, negative computed argument; the selector brushes are required to sense an equal or algebraically higher tape argument following an algebraically low tape argument.

If the station argument is negative and numerically higher, then it is algebraically lower; potential is on line TAH and fed via b of S-TA— and b of SA to line B. Under this condition, the comparison potential will be led to the next station comparison section. The initial tape argument at this next station necessarily is algebraically lower than the negative computed argument. If the station argument of this next station is equal to the computed argument, potential is on line CET and fed via d of S-TA— and a of SA to line A. If the station argument is negative but numerically lower, it is algebraically higher; potential is on line CAH and fed via c of S-TA— and a of SA to line A. If the station argument is positive, potential is on line TSH and fed via a of SA to line A. Thus, a station is selected which has the tape arguments allowing compliance with rule 2 of intrastation selection.

*Rule 3.*—Descending table, positive computed argument; selector brushes are required to sense an equal or algebraically lower tape argument following an algebraically higher tape argument.

For descending tables, it is to be recalled that the station arguments are the algebraically lowest tape arguments at these stations.

If the station argument is algebraically higher than the positive computed argument, then all the other tape arguments at the station are also algebraically higher. Thus, this station does not provide an equal or algebraically lower tape argument for allowing compliance with rule 3 of intrastation selection. Accordingly, under the stated condition, the station will not be selected. Specifically, if the station argument is superior, potential is on line TAH and fed via b of S-TA+ and a of SD to line B, from which it will be directed to the next station comparison section. At this next station, the initial argument necessarily is algebraically higher than the computed argument. If the station argument at this next station is algebraically equal, potential is on line CET (Fig. 10) and fed via d of S-TA+ and b of SD to line A. If the station argument is algebraically lower and positive, potential is on line CAH and fed via c of S-TA+ and b of SD to line A. If the station argument is algebraically lower by reason of being negative, potential is on line CSH and fed via b of SD to line A. Thus, the station is selected in compliance with the requirements of rule 3.

*Rule 4.*—Descending table, negative computed argument; selector brushes are required to sense an algebraically lower tape argument following an equal or algebraically higher tape argument.

If the station argument is positive, potential is on line TSH and fed via $a$ of SD to line B. If the station argument is negative but numerically lower, it is algebraically higher; potential is on line CAH and fed via $c$ of S–TA— and $a$ of SD to line B. If the station argument also is negative and numerically equal to the computed argument, potential is on line CET (Fig. 10) and fed via $d$ of S–TA— and $a$ of SD to line B. Under these conditions, where the station argument is algebraically equal to or higher than the negative computed argument, the station is not selected, as there is no algebraically lower tape argument at this station to be sensed by the selector brushes during intrastation selection according to rule 4. The initial tape argument at the next station necessarily is equal to or algebraically higher than the negative computed argument. If the station argument at this next station is algebraically lower, potential is on line TAH and fed via $b$ of S–TA—, and $b$ of SD to line A, so that this next station will be selected.

*Plugging*

Preparatory to look-up operation, required plugging is done. Fig. 12 is a simplified plug chart showing the plugging set-up for two illustrative tables 1 and 6, data for which are given in Figs. 14 and 15 and also below.

Table 1 is ascending, one tape wide, three tapes long, the tapes are at stations 1 to 3, the value interval is 200 and the tape arguments are distributed at the stations as follows:

Station 1: —30,000 to —10,000
Station 2: —10,000 to +5,000
Station 3: +5,000 to +22,000

Table 6 is descending, two tapes long, three tapes wide, the argument tapes are at stations 29 and 30, the functional tapes related to the tape at station 29 are located at stations 31 and 32, the functional tapes related to the tape at station 30 are located at stations 33 and 34, the value interval on the argument tapes is 1, and the arguments are distributed as follows:

Station 29: +20 to —100
Station 30: —100 to —175

As previously explained, the tape argument values are located immediately to the right of the sign index positions 1 and 2. Hence, it is understood that in table 6, the argument numbers are located within the index positions 3 to 14.

In the plugging diagram, Fig. 12, intermediate sockets of a large group of sockets have been omitted.

Sockets BP1 to 22 are illustrative of sockets which receive the binary codal electrical signal equivalent of signs and values of computed arguments. For each table, a set of twenty-two sockets TP is provided which are wired through selective table look-up control to computed argument receiving means in the table look-up section. Only the sockets 1TP and 6TP respectively for tables 1 and 6 are indicated in Fig. 12. The signs of the computed arguments are always read into sign positions 1 and 2 of the computed argument receiving means, regardless of the number of places in the computed argument. The computed argument values are read into those positions of the computed argument receiving means immediately to the right of the sign positions. In the example, with regard to table 1, five-place computed arguments will be entered into the look-up section, while with regard to table 6, two and three-place computed arguments will be entered.

Accordingly, for table 1, the plugging is from sockets BP1 to 22 to 1TP1 to 22; for table 6, the plugging for sign is from BP1 and 2 to 6TP1 and 2 and from BP3 to 14 to 6TP3 to 14 for values.

Sockets TDP1 to 6 pertain to tables 1 to 6, respectively, and are plugged to sockets ASP or DEP according to whether the table is ascending or descending. In the chosen example, TDP1 is plugged to ASP because table 1 is ascending and TDP6 is plugged to DEP since table 6 is descending.

Sockets CPU1 to 6 respectively relate to tables 1 to 6 and are known as the initial station comparison pick-up sockets. The input lines 80 (Fig. 9) of the station comparison sections start at input sockets SSCP. The sockets CPU are selectively plugged to sockets SSCP of the initial station comparison section of the tables. Thus, in the example, CPU1 is plugged to SSCP1 and CPU6 is plugged to SSCP29. The outgoing lines B of station comparison sections (see Fig. 10) terminate at exit sockets SSCE. The station comparison sections of a table are connected in series by plugging the exit socket SSCE of one station comparison section to the input socket SSCP of the next station comparison section. Hence, in the example, SSCE1 is plugged to SSCP2 and SSCE2 is plugged to SSCP3, the input socket for the comparison section of the final station 3 in table 1. Likewise, for table 6, the argument tapes are at stations 29 and 30; hence SSCE29 is plugged to SSCP30.

Sockets CH1 to 6 relate to tables 1 to 6, respectively. The socket CH relating to a table is plugged to all the sockets SSCH of the station comparison sections of the stations chosen for the table. In the example, CH1 is plugged to sockets SSCH1, 2 and 3 for table 1 and CH6 is plugged to sockets SSCH29 and 30 for table 6.

Sockets CLP1 to 6 pertain to tables 1 to 6 and are known as the initial station clutch pick-up sockets. There are thirty-six sockets SCPU, one for each station, known as the station clutch pick-up socket. Also, for each station, there is a socket CLC, known as the clutch commoning socket. The socket CLP relating to a table is plugged to the sockets SCPU of all the table stations carrying argument tapes. Thus, for the example, CLP1 is plugged to sockets SCPU1, 2, and 3 and CLP6 is plugged to sockets SCPU29 and 30. The socket CLC of each argument tape carrying station is plugged to the sockets CLC of the companion functional tape carrying stations. In the chosen example, table 1 is one tape wide and hence does not demand plugging between sockets CLC. In table 6 argument tape 29 is accompanied by functional tapes 31 and 32 while argument tape 30 is accompanied by functional tapes 33 and 34. Accordingly, CLC29 is plugged to CLC31 and 32, and CLC30 is plugged to CLC33 and 34.

There is a set of six sockets ISTS1 to 6 respectively relating to tables 1 to 6. These sockets are in circuits for selecting one of the six intermediate comparison sections (see Fig. 13k) according to the table being looked-up. Accordingly, the sockets ISTS are plugged according to the tables to be looked up. In the example, ISTS1 is plugged to CLP1 by way of the plugging between ISTS1 and SCPU 3, 2, 1 and CLP1; and ISTS6 is plugged to CLP6 by way of the plugging to and through sockets SCPU30 and 29.

There are three sets of plug sockets SRH, SRI and SRE, each set containing thirty-six sockets, one for each station. The sockets SRH may be called the station remembering hold sockets, the sockets SRI may be called the station remembering input sockets, and the sockets SRE may be referred to as the station remembering exit sockets. All of these sockets are used in connection with the remembering means which functions upon repeat selection of the same station to modify look-up operation, in a manner described later in connection with the circuits. The sockets SRH pertaining to the stations bearing argument tapes of a table are plugged to one another and to the socket SRI of the first of these stations. In the example, for table 1, SRH1, 2, and 3 and SRI1 are plugged together, SRE1 is plugged to SRI2, SRE2 is plugged to SRI3 and SRE3 is plugged to a 0 v. socket; for table 6, SRH29 and 30 and SRI29 are plugged together, SRE29 is plugged to SRI30 and SRE30 is plugged to the 0 v. socket.

Assigned to each of the six tables is a set of nine sockets CTS5, 4, 3, 2, 1, +, —, N, and R and associated with all the sets of sockets CTS is a similar set of sockets CPS. Sockets CTS of a table are plugged to sockets CPS according to the number of decimal notation places, from the left, in the table tape arguments and according to whether the signs of these arguments are to be taken as represented or in reverse or as fixed plus or fixed minus signs. In the chosen example, table 1 arguments run to five places and their signs are to be taken as represented. The plugging for table 1 therefore is from table 1–CTS, 1, 2, 3, 4, 5 and N to CPS, 1, 2, 3, 4, 5 and N, respectively. For table 6, the arguments run to three places and their signs are to be taken in reverse. The plugging for table 6 is from table 6–CTS1, 2, 3 and R to CPS1, 2, 3 and R.

The remaining plugging shown in Fig. 12 is for read-out purposes. There are six table look-up controls and six table read-out controls, as previously mentioned. The table read-out controls are brought into operation separately from the table look-up controls. To read out a single tape width table of tapes, only a single read-out control is brought into operation. To read out a multiple tape width table, the number of table read-out controls required is half the number of tapes, in the width, in a table. If the table has an odd number of tapes in the width, then a table read-out control must be used for the extra tape. Thus, for a table three tapes wide, two read-out controls must be used. The foregoing explanation will make clear the read-out plugging shown in Fig. 12. Specifically, for each of the six table read-out controls, there are thirty-six sockets ROA and thirty-six sockets ROB. Common to the table read-out controls are two sets of sockets SRA and SRB, each set having thirty-six sockets. In the chosen example, table 1 is a single width table with argument tapes 1, 2, and 3. Accordingly, a single table read-out control is necessary in the reading out of table 1. Table 1 read-out control has been chosen to control the reading out of table 1 and the plugging is from table 1 sockets ROA1, ROA2, and ROA3 to sockets SRA1, SRA2, and SRA3, respectively. Table 6 is three tapes wide. Accordingly, two table read-out controls must be utilized, and table 2 and table 6 read-out controls have been chosen. The plugging for reading out tapes 29, 31 and 32 of table 6 is from table 2 ROA29 to SRA29, table 2 ROB29 to SRB31, and table 6 ROA29 to SRA32. The plugging for reading out tapes 30, 33 and 34 of table 6 is from table 2 ROA30 to SRA30, table 2 ROB30 to SRB33, and table 6 ROA30 to SRA34.

The circuits in general

Figure 13D:
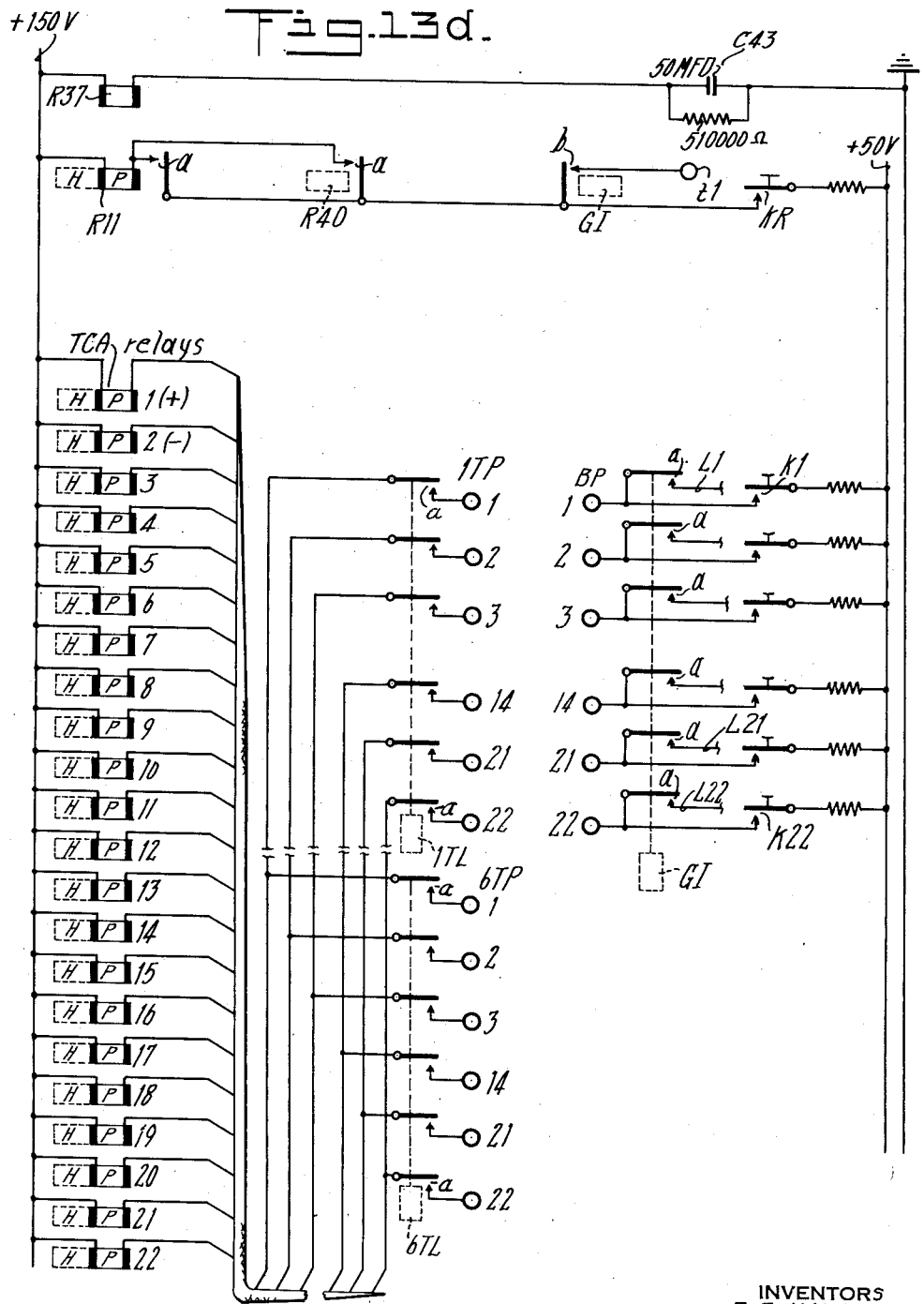
Figs. 13a to 13o represent the circuits of the look-up apparatus.
Figure 13H:
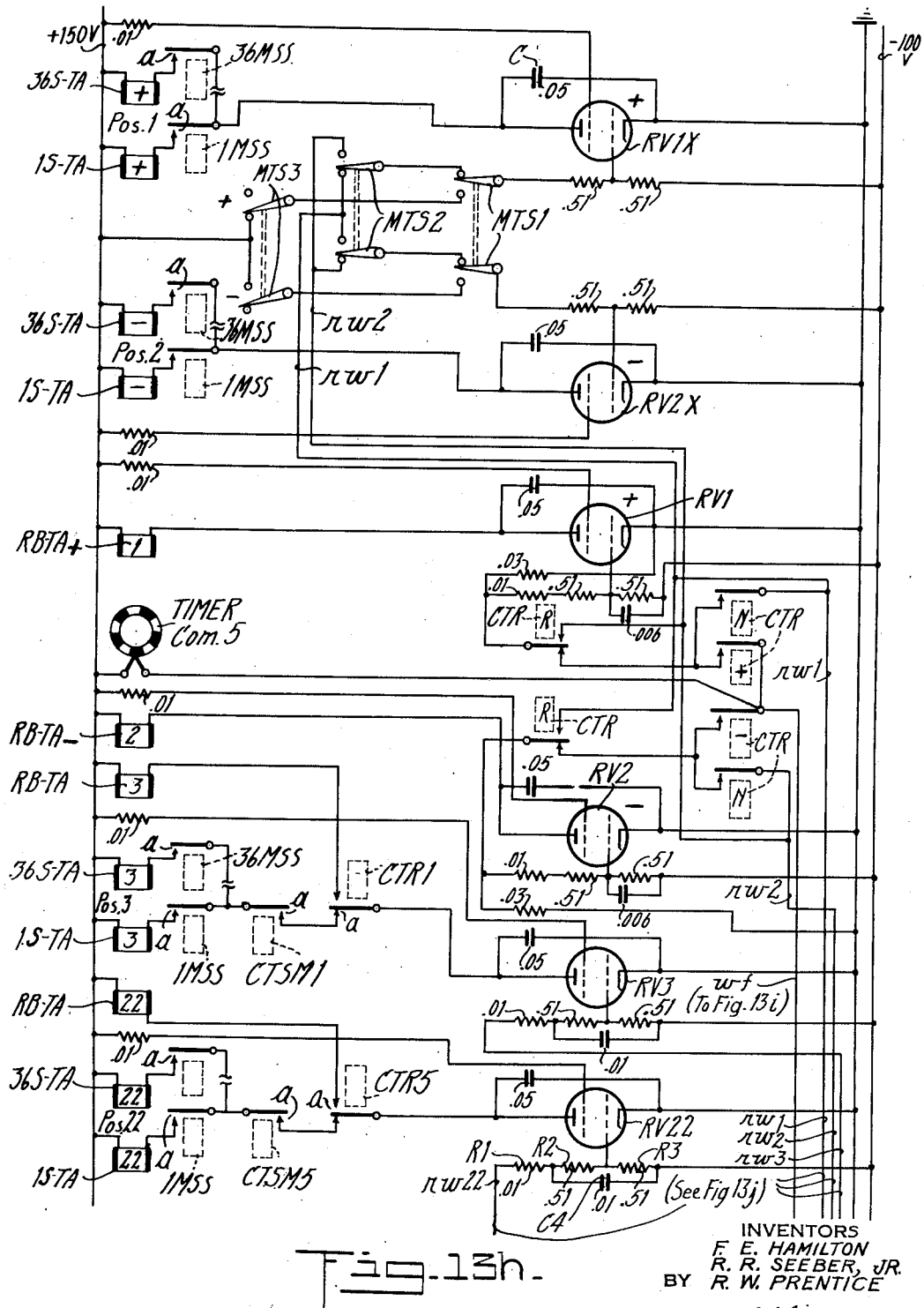
Figure 13I:
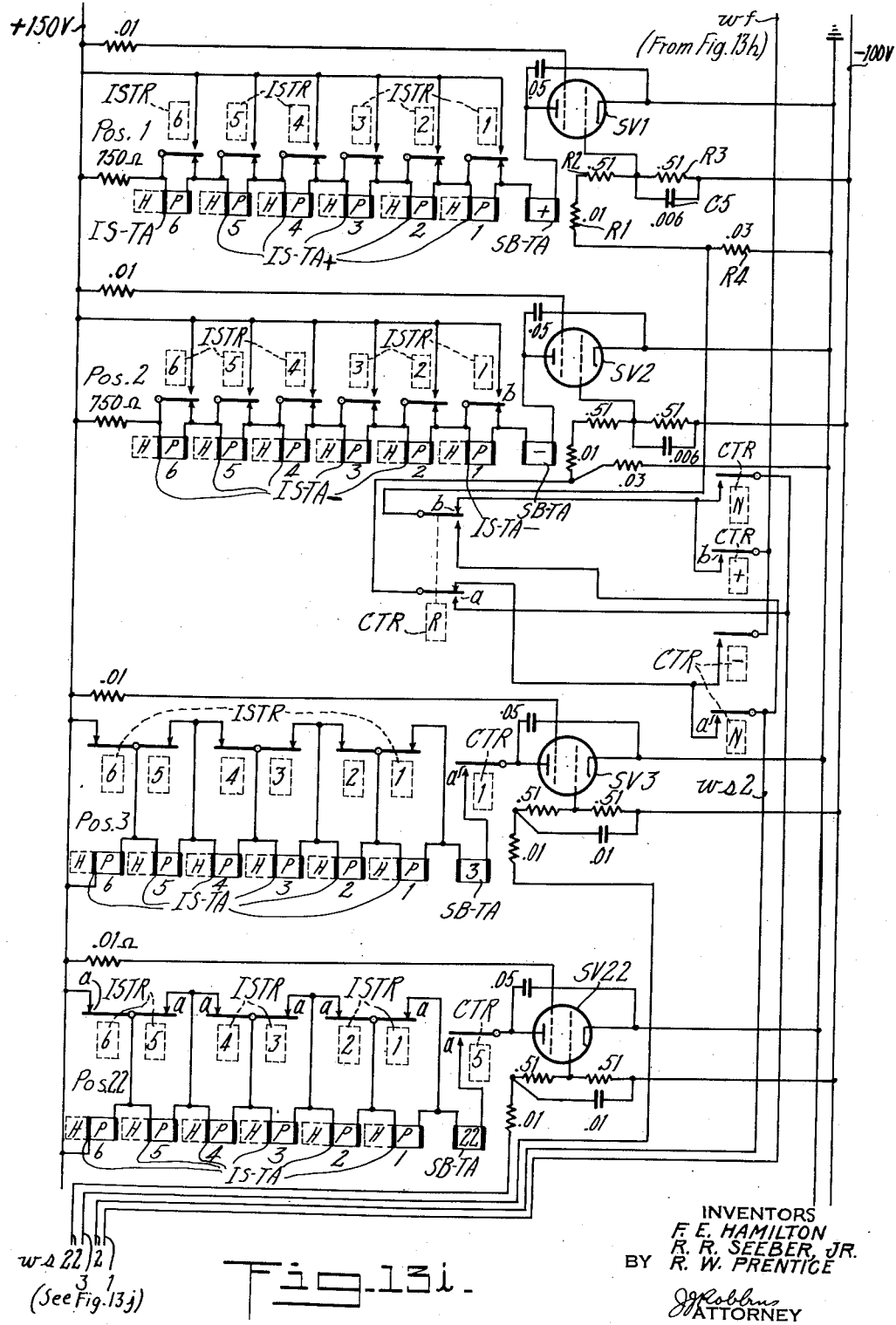
Figure 13K:
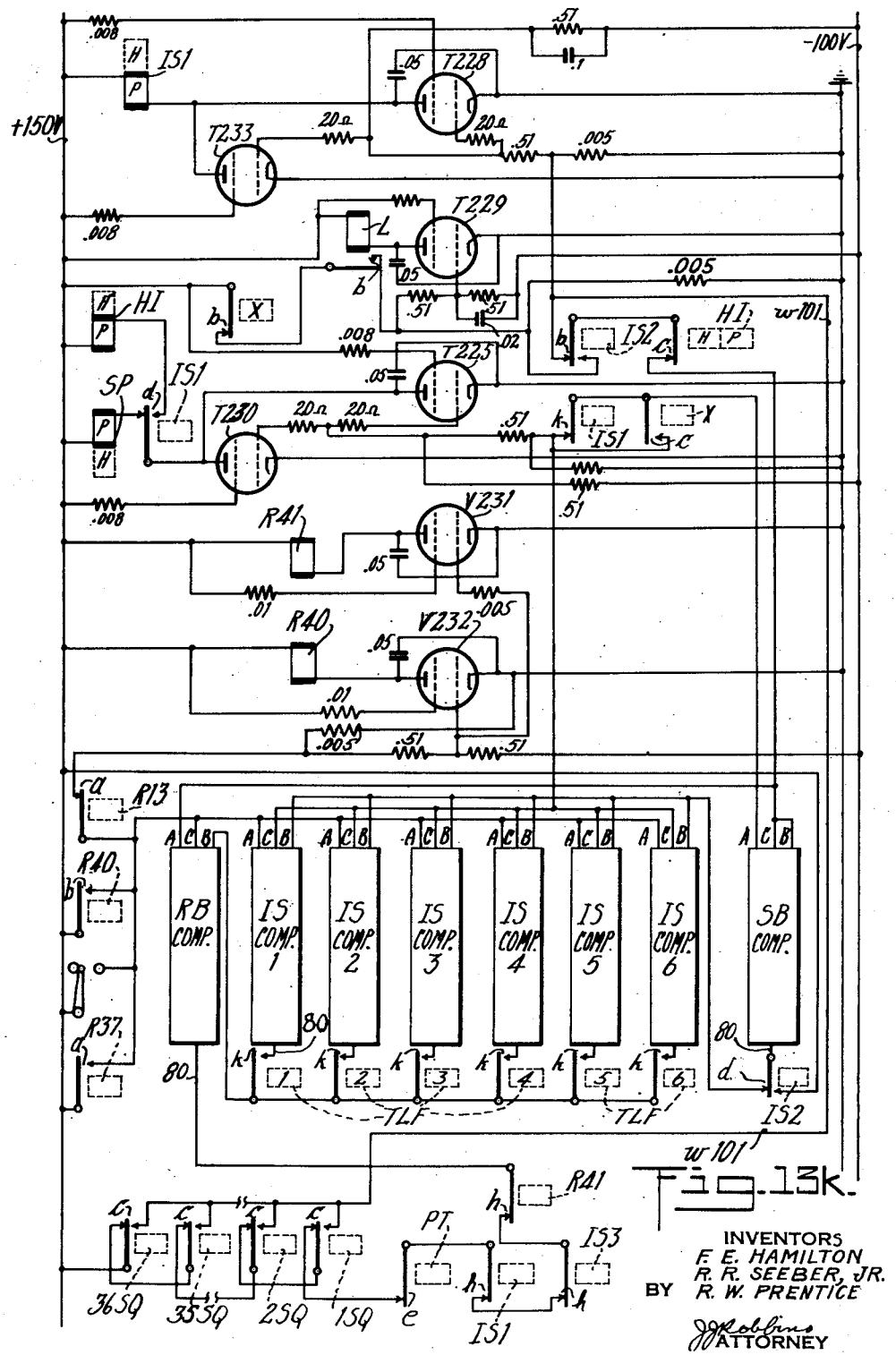
Figure 13L:
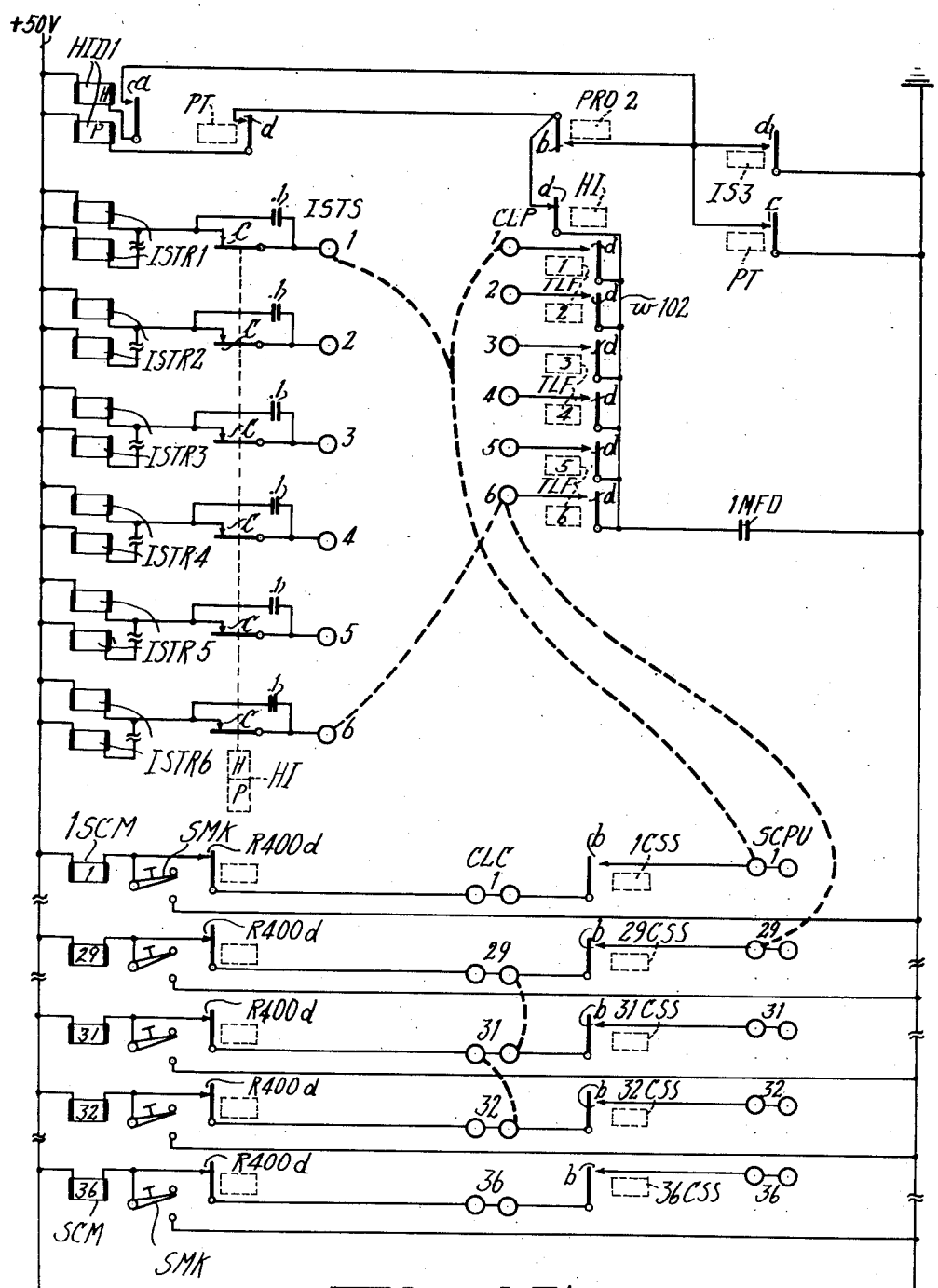
Figure 13N:
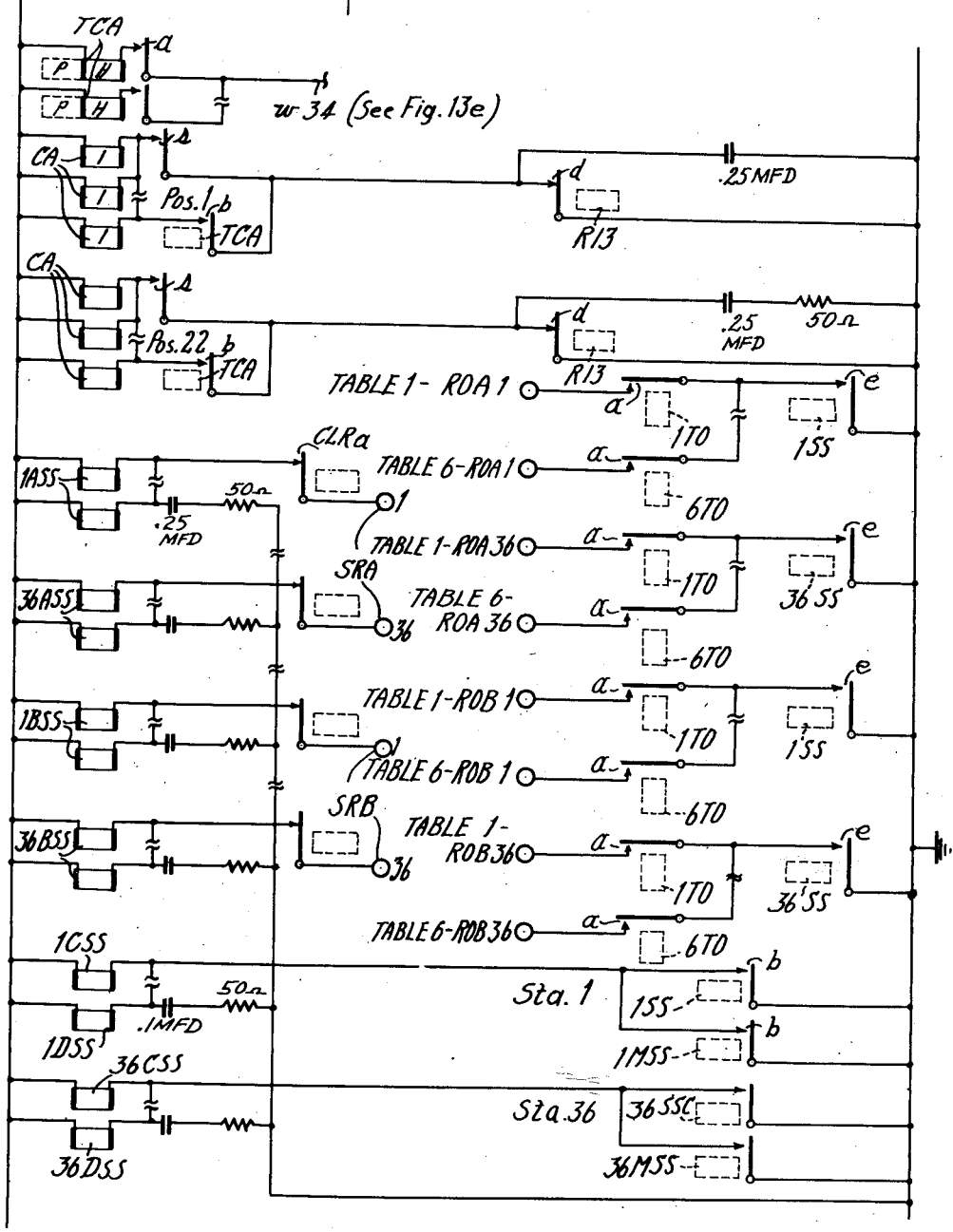
Figures 13O, 16:
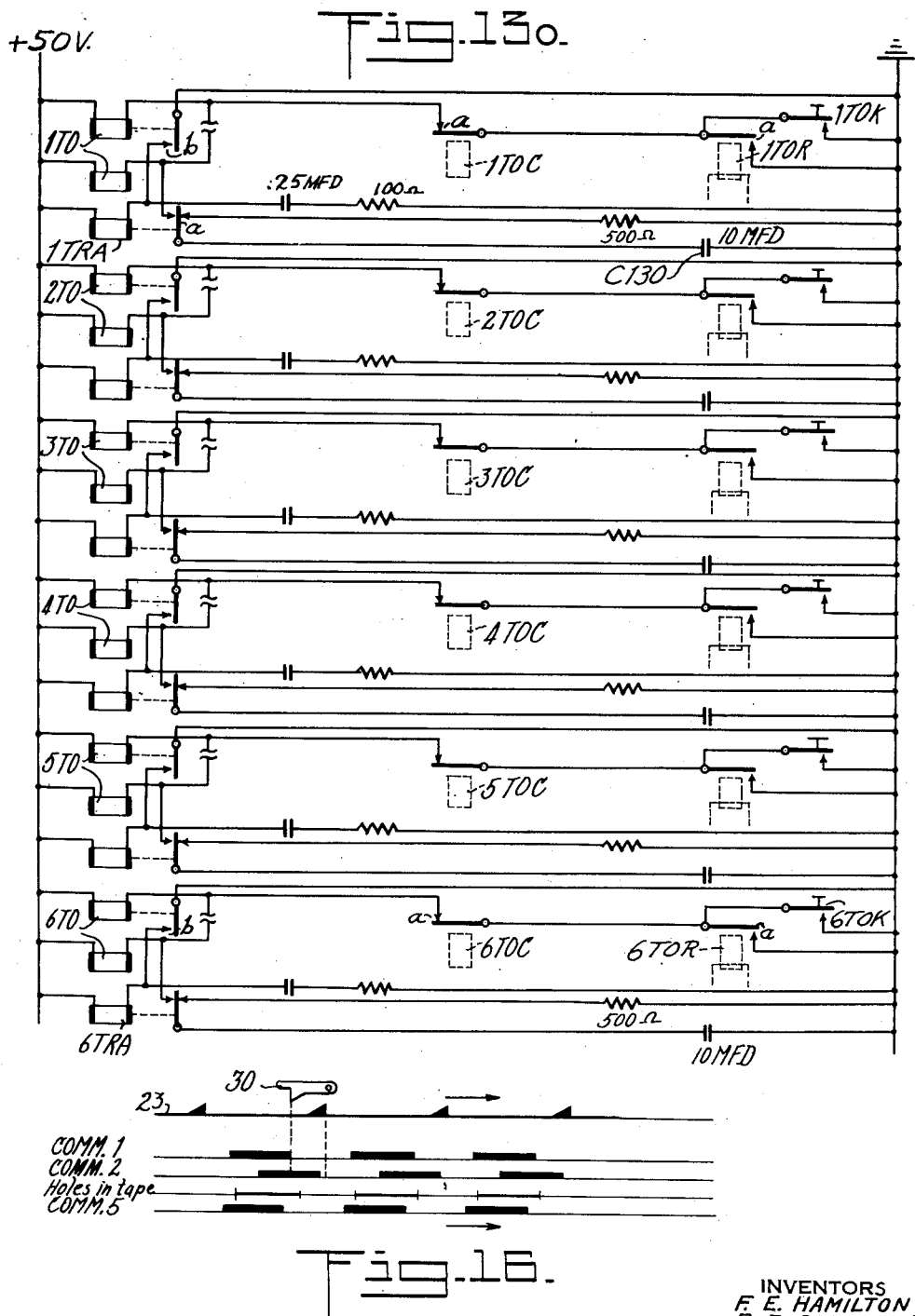
Fig. 16 is a timing chart with respect to pertinent circuit breaker contacts.

The relevant circuits are shown in Figs. 13a to 13o. Potential from a suitable supply is impressed on a +150 v. line, a +50 v. line, and a —100 v. line with respect to ground (0 v.). The electron tubes shown are suitably supplied with heater voltage. To simplify the drawings, intermediate elements of a number of similar elements are not shown. Where a plurality of relay coils are in parallel and energized by a common circuit, only one or a few of the coils may be shown. There are several duo-wound relays used in the circuits. As is well known, these duo-wound relays have a pick-up winding designated by P and a hold winding designated by H. Normally the coil P will be energized first and close the armature contacts including contacts for enabling the coil H to be energized subsequently. The coil H when energized will maintain the same armature contacts closed. In a few instances the winding H is not connected into the circuits. However, upon the deenergization of the winding P of such relay the induced current in the winding H causes its momentary energization to delay the opening of the armature contacts. It will be recognized that such duo-wound relay is in effect a delay relay.

A set of twenty-two tetrodes SV1 to 22, a few of which are shown in Fig. 13i, is common to the selector brush sensing circuits of all thirty-six stations. A similar set of twenty-two tetrodes RV1 to 22 (Fig. 13h) is common to the read brush sensing circuits for index positions 1 to 22 of tapes at all thirty-six stations. Two extra tetrodes RV1X and RV2X are controlled by the sign positions 1 and 2 read brush sensing circuits only for purposes of station storage. Station selecting relays to be described select any of the thirty-six stations for controlling the common set of tubes SV or RV.

The screen grids of tubes RV and SV are resistance-coupled to the +150 v. line and remain at fixed screen potential.

The cathodes all connect to ground. The anodes connect through selectively closed relay contacts and comparison relays generally designated TA to the +150 v. line. The control grids (hereafter simply referred to as grids) of the tubes RV and SV are connected into the various sensing circuits. Application of sensing potential to the grid of a tube will drive it above cut-off, turning the tube on; i. e. rendering it conductive. Thereupon a circuit will make by way of the tube through a comparison relay TA. The tubes RV1 and 2 and SV1 and 2 are controlled by the sensing of sign positions whereas the tubes RV3 to 22 and SV3 to 22 are controlled by the sensing of numerical value positions. It is desired to delay the turning on of the sign tubes under control of sensing potential momentarily until after the tubes which relate to numerical positions have had sufficient time to become conductive and pick up the related relays TA. Reference to Figs. 9 and 10 indicates that all the comparison paths are made through points of the sign relays TA+ or TA—. Hence by delaying the pick-up of the sign relays the comparison circuits may be timed to operate correctly according to the sign and numerical value of the tape argument. It is also desired to allow the sign relays to drop out sooner than the numerical value relays, so that the break of the comparison paths as well as the make of these paths may be timed by the points of relays TA+ and TA—. It may be mentioned that premature energization of the sign relays must be avoided in order to insure correct comparison results. In order to provide the necessary timing of the turning on and off of the tubes RV and SV, the grids of tubes RV1 and 2 and SV1 and 2 are connected into respective RC circuits which include resistors R1, R2, R3, R4 and a capacitor C5 shunting resistor R3 which terminates at the −100 v. line. This grid circuit is connected at a point between resistors R1 and R4 to sign positions sensing circuits. The grids of tubes RV3 to 22 and SV3 to 22 are connected to RC circuits which include resistors R1, R2 and R3 in series between the −100 v. line and the sensing circuits, the resistors R2 and R3 being shunted by a capacitor C4.

During look-up of an argument by brushes SB of a selected station, the record tape at the station is moving quite rapidly. Accordingly, a sensing impulse will be of brief duration and act upon the related tube to pick up a relay TA. The RC circuits of the grids of the tubes SV delay the turning off of these tubes until after the designation line has passed the brushes. This insures sufficient time for proper operation of the comparison relays. It may be mentioned that if the comparison upon intrastation selection determines that the station clutch shall be disengaged and the tape arrested, the tape will actually be stopped after the designation line last under the brushes SB has advanced to a position centrally between the line of brushes SB and the line of brushes RB. In this connection it may be pointed out that the latch 33 (Fig. 4) is substantially in alinement with a tooth of disk 29 when the designation line of a record tape is substantially centrally under the brushes SB. Declutching and therefore latching up of the disk 29 will not occur until after the designation line has already passed the selector brushes. By then a tooth of disk 29 will just have passed the nose of latch 33. Accordingly, the latch will engage the next tooth and cause arrest of the record tape when the designation line, the sensing of which brought about declutching, has advanced one line space past the selector brushes. The tetrodes shown are of 25L6 type. Resistance and capacitance values given in the drawings are in megohms and microfarads, respectively, unless otherwise noted.

*Manual station move circuit*

A record tape at a station may be advanced, under manual control, by the operator closing the station move key switch SMK (Fig. 6). A circuit thereupon is completed from ground (0 v.) line (Fig. 13L) through the switch and the station clutch magnet SCM, to the +50 v. line. Clutch magnet SCM (also see Fig. 4) then causes the tape to be advanced until the operator releases the key switch SMK to deenergize the clutch magnet. Such manually controlled tape feed is particularly convenient when the tape has been newly placed in the station and its end value is to be brought to the read brush position.

*The station storage circuits*

The end argument on an argument tape at a station is the station argument as long as the tape remains at the station. When a tape is installed at a station, its end argument is brought under the read brushes RB (see Figs. 6 and 7) of the station. The operator closes the station key switch MSK to initiate a sequence of operations resulting in the reading into station storage of the end argument on the tape. The sign of the end argument may be stored as represented on the tape or the reverse sign stored or a fixed plus or fixed minus sign may be stored if the sign representation is omitted or is to be ignored. Before closing switch MSK, the operator selectively closes five hand switches ACS 1, 2, 3, 4 and 5 (Fig. 13b) according to the number of argument places in the table containing the record tape. Thus, for table 1 (see Fig. 14), all five switches would be closed as the arguments run to five places. For table 6 (see Fig. 15), only switches ACS 1, 2, and 3 would be closed since the arguments run to three places only. Each of these switches is in series with a relay CTSM. The closure of the switch completes a circuit from the 50 v. line through the relay CTSM and the connected hand switch ACS to ground. The relays CTSM control the number of places of station storage relays which are to receive the station argument. To control sign entry into station storage, three double pole, double throw hand switches MTS1, 2, and 3 (Fig. 13h) are provided. If the sign is to be taken as represented, then the switches are left in the shown positions. If the represented signs are to be stored in reverse, switch MTS2 is thrown to its alternative position. If fixed signs are to be stored, then switch MTS1 is reversed and, in addition, switch MTS3 is left as shown for a fixed plus sign or thrown to alternative position for a fixed minus sign. Each time a station argument is to be entered, the switches ACS (Fig. 13b) and MTS (Fig. 13h) are re-positioned according to requirements.

To initiate station storage operations, the operator closes the station key switch MSK (Figs. 6 and 13b). Assume, for instance, that the first tape of table 1 (see Fig. 14) has been newly installed at station 1 and its end argument is to be entered into station storage. The operator closes the station 1 switch 1MSK establishing a circuit from ground, through the key switch, the station 1 control relays 1MSS, to the +50 v. line. A parallel circuit is completed, by way of a capacitor 1SC and its shunting resistor 1SR, through the twenty-two station 1 storage reset coils 1SSR. Coils 1SSR (also see Fig. 8) clear station 1 storage of its previous setting. Energization of coils 1SSR is momentary because their circuit is made through the capacitor 1SC. Hence, the reset coils stay energized just long enough to reset the station storage, after which they deenergize and are ready to latch up the new setting to be made in station storage.

The station 1 relays 1MSS close their relay points a (Fig. 13h), respectively in series with the twenty-two station 1 storage magnets 1S-TA (only those for positions 1, 2, 3, and 22 are shown). This constitutes selection of station 1 storage to receive a new station argument. The relays 1MSS also close their contacts b to establish the circuit of station 1 relays 1CSS and 1DSS (see Fig. 13n) of which the latter need not be considered in connection with station storage. Relay 1CSS closes relay points a respectively in series with the station 1 read brushes RB1 to 22 (Fig. 13j) for sensing index positions 1 to 22. Thus, station 1 read brushes for index positions 1 to 22 are selected for effective sensing of the end argument (Fig. 14) now under these read brushes.

Assume, for instance, that there is a perforation in index position 22 of the designation line in the reading position at station 1. A read brush sensing circuit is established as follows: From the +150 v. line (Fig. 13j), station 1 common CB-11, brush RB22 of station 1, the connected contacts a of 1CSS, a wire rw22 common to read positions 22 of all 36 stations to the coupled control grid of tube RV22 (Fig. 13h) and to the —100 v. line. Tube RV22 becomes conductive, allowing the following circuit to make: From the +150 v. line through position 22 station 1 storage magnet 1S-TA22, the now-closed, connected contacts a of 1MSS, the now-closed contacts a of CTSM5, the normally closed side of contacts a of CTR5 and through the tube RV22 to ground.

The sign station storage circuits are partially under control of hand switches MTS1, 2, and 3. With these switches MTS (Fig. 13h) set as shown, if a perforation is sensed in index position 1 (plus sign), the sensing potential on wire rw1 is transmitted via the closed sides of switches MTS2 and 1 to the resistance-coupled control grid of tube RV1X. The tube becomes conductive, allowing the circuit of the + sign station 1 storage relay 1S-TA+ to be made via the connected, now-closed contacts a of 1MSS. If, instead of a perforation 1 in the index position 1, there is a perforation in index position 2, potential for overcoming the cut-off bias of tube RV2X is transmitted from wire rw2 through closed sides of switches MTS2 and 1 to the grid of RV2X. The storage magnet 1S-TA— is then energized by way of the tube and contacts a of 1MSS.

If it is desired to store the sign reverse to that designated, then switch MTS2 is reversed. This reverses the connections of wires rw1 and rw2 with respect to the tubes RV1X and RV2X. Accordingly, a represented plus sign will be stored as a minus sign and a represented minus sign as a plus sign.

If it is desired to store a fixed sign, switch MTS1 is reversed, disconnecting the tubes RV1X and RV2X from the sensing circuits. If a fixed plus sign is to be stored, switch MTS3 is left in the position shown. Potential for overcoming the cut-off bias of tube RV1X is thus applied from the +150 v. line via the upper side of MTS3 and the reversed upper side of switch MTS1. If a fixed minus sign is to be stored, both switches MTS1 and 3 are reversed. Potential is thereby applied from the +150 v. line via the reversed lower sides of MTS3 and 1 to the control grid of tube RV2X.

*Circuits relating to computed argument entry*

The computed arguments will be derived from storage means outside the scope of this disclosure, and which stores a computed argument in the binary term form considered hereinbefore. At the proper time, the binary terms of the computed argument will be transmitted to the look-up section by selectively applying potentials to lines L1 to L22 (Fig. 13d). The numbers identifying these lines correspond to the index position numbers 1 to 22 of a designation line of a record tape (Fig. 2). To transmit a computed argument, the lines L1 to L22 corresponding to the sign and binary terms of the computed argument will be placed at a potential of about 80 volts while the remaining lines will be at +150 volts. For instance, if the 5th place, from the left, of a computed argument contains digit 1, the binary term equivalent will be applied by placing line L22 at about 80 volts potential and lines L21, L20 and L19 (the latter two not shown) at +150 v. potential. Prior to transmission of the computed argument (with sign) to lines L1 to L22, a circuit controlled outside the look-up section will energize a relay G1 to close its contacts a for connecting lines L1 to L22 to plug sockets BP1 to 22. Sockets BP are selectively plugged to sets of sockets TP, each set pertaining to a different table, as explained before in connection with the plugging diagram (Fig. 12). Also, before transmission of the computed argument to the look-up section, one of the table look-up relays 1TL to 6TL (Fig. 13c) will be energized to close its relay contacts a (Fig. 13d) for connecting the related table sockets TP to the pick-up coils P of duo-wound relays TCA1 to TCA22.

The key switches K1 to K22 (Fig. 13d) represent alternative means for applying the binary terms of a computed argument to sockets BP.

It was stated above that one of the table look-up relays 1TL to 6TL (Fig. 13c) is to be energized before transmission of the computed argument to the look-up section. In practice, selection of a table look-up relay will be made through program or sequence controlled circuits which are diagrammatically represented here by the relays 1SL to 6SL and their relay contacts a. Key switches 1KT to 6KT represent alternative means for selecting a table look-up relay. Closure of one of the key switch or the contacts a of a relay 1SL will complete a circuit from ground through the key switch or relay contacts, the normally closed side of contacts a of a relay TLD, and through the chosen table look-up relay TL to the +50 v. line.

Another operation to be performed prior to transmission of the computed argument to the table look-up section, is the energization of pick-up coil R11P (Fig. 13d) of a duo-wound relay. The circuit of this coil includes relay contacts R40a which are normally open. The relay R40 (Fig. 13k) will be energized only when power is first applied to the voltage lines of the table look-up section and, thereafter, only if a look-up is not taking place. Let it be assumed that power has just been applied to the voltage lines of the table look-up section. A circuit thereupon makes from the +150 v. line through a relay R37 (Fig. 13d) and a capacitor C43 to ground. As the circuit is made by way of the capacitor, energization of relay R37 is momentary but of sufficient duration to close its contacts R37a (Fig. 13k) to establish the following circuit: from the +150 v. line, via contacts R37a, the normally closed contacts R13a, and via parallel paths to the control grids of tubes V232 and V231 and thence to the —100 v. line. This circuit overcomes the normal cut-off grid bias of the tubes and renders them conductive. The relays R40 and R41 then are energized by parallel circuits through the tubes. Relay R40, being energized, closes its contacts R40b to shunt out the temporarily closed contacts R37a, in the grid circuits of tubes V232 and V231. The relays R40 and R41 will thus be maintained energized until contacts R13a open.

Relay R40 closes its contacts R40a (Fig. 13d) in the circuit of relay coil R11P. When the relay G1 is energized to close its a contacts in the circuits of coils P of relays TCA, it also closes its b contacts in the circuit of coil R11P. At the proper time, prior to the transmission of the computed argument to the look-up section, a signal pulse of about +80 v. is applied from a source outside the scope of this disclosure to the terminal t1 to complete the circuit of the coil R11P. Alternative means in the form of a key switch KR is illustrated for completing this circuit. Coil R11P, when energized closes stick contacts R11a to shunt out contacts R40a.

Coil R11P also closes contacts R11b (Fig. 13e) establishing a circuit through the relay hold coil R11H, this circuit being from ground via normally closed contacts R34a and via contacts R11b through coil R11H to the +50 v. line.

Relay R11 closes contacts R11c (Fig. 13e) establishing the circuit of relay R346. Contacts R346a close and establish the circuit of relays R13. Thereupon, contacts R13a (Fig. 13k) open and break the grid circuits of tubes V231 and V232 which cease conducting, in consequence of which the relays R40 and R41 are deenergized.

Relay contacts R346b (Fig. 13e) have been closed and together with a now closed one of the table look-up relay contacts TLb establish the circuit of a relay TLD and a parallel relay TLF. Contacts c of the energized relay TLD close and complete a circuit through an arc suppressor relay RA1.

Contacts a of the energized relay TLF complete a stick circuit extending from ground via now closed contacts R11d, or contacts R40c when they reclose, a wire w34, the stick contacts a of the energized relay TLF, in parallel via this relay TLF and the companion relay TLD, to the +50 v. line. The arc suppressor relay RA1 has been energized and has shifted its contacts RA1a to connect a capacitor C100 between wire w34 and ground. Contacts R11d will open first as will be brought out shortly. Contacts R40c will open when the look-up operation is completed. Upon the opening of R40c the stick circuit of TLF and TLD will be maintained for a brief period by the current flow through the shifted side of RA1a and the capacitor C100. As soon as the condenser is charged the stick circuit will break; thereupon RA1 will be deenergized and its points a will open.

The computed argument will eventually be stored in binary term form in twenty-two position relays CA (Fig. 13n). Prior to receiving a new computed argument, the relays CA are cleared. For this purpose, the relays R13 (see Fig. 13e), upon energization, open contacts R13d in series with the relays CA (Fig. 13n), so that they all become deenergized.

Transmission of the computed argument to the table look-up section will start any time from the beginning of the energization of relay R11 to the dropping out of R11. The computed argument transmitting potentials will be maintained for a few milliseconds after the dropping out of R11. In a manner previously described, the computed argument transmitting potentials will result in energization of selective ones of coils P of relays TCA (Fig. 13d). Contacts a (Fig. 13n) of TCA close and establish a circuit from the +50 v. line, through the hold coils H of the picked-up relays TCA, via their a contacts, to wire w34 (also see Fig. 13e), and through contacts R40c or R11d to ground.

Contacts TCAb (Fig. 13n) close and when contacts R13d are released to reclose, establish the circuits of those argument storage relays CA which manifest the binary terms of the computed argument. Contacts CAs close to provide a stick circuit for the relays CA.

Contacts R13e and contacts b of the energized relay TLD (Fig. 13e) complete a circuit through relay R34. Relay R34 opens its contacts a in the circuit of coil R11H which thereupon becomes deenergized. The circuit of coil R11P (Fig. 13d) will be opened just about the same time or slightly after the computed argument is transmitted to relays TCA. With both coils R11H and R11P deenergized, the relay contacts R11c (Fig. 13e) open and relay R346 is deenergized. Contacts R346a open and the circuit of relays R13 is broken. Contacts R13d reclose and enable the computed argument to be entered in storage relays CA (Fig. 13n).

With respect to the table look-up relays TL (Fig. 13c), a selected one of these relays has been energized by a control signal or by depression of a key KT, as previously described. When a relay TLD (Fig. 13e) is energized, it shifts its contacts a (Fig. 13c) and together with contacts R13f, which are closed before deenergization of relay R13, establish an alternative circuit through the selected table look-up relay TL. It will be noted that the selected relay TL has previously closed contacts TLb (Fig. 13e) to cause a corresponding one of the relays TLD to be energized when contacts R346b closed. The contacts a (Fig. 13c) of the particular relay TLD then shift so as to maintain a circuit, together with one of the contacts R13f, through the corresponding relay TL. When R13 is deenergized in the manner described before, the circuit of the selected relay TL is momentarily continued by way of a resistor TR and a capacitor TC. This provides sufficient delay in deenergization of relay TL to insure time for the computed argument entry circuits of coils H of relays TCA (Fig. 13n) to be established even after dropping out of relay R11 and the consequent deenergization of relay R13. Condenser TC remains fully charged until the look-up operation has been completed. In a manner which will be explained later, completion of the look-up operation will be manifested by re-energization of relay R40 (Fig. 13k). Contacts R40c (Fig. 13e) will reopen and the two energized relays TLD and TLF as well as the relays TCA (Fig. 13n) will be dropped under control of arc suppressor relay RA1, in the manner explained before. Contacts a (Fig. 13c) of TLD will return to normal, allowing the capacitor TC to discharge.

*Circuits relating to station selection*

After a computed argument has been entered in relays CA (Fig. 13n), it is compared with the station arguments of a selected table in order to select a station for intrastation operation. The station selecting circuits are made through a common relay switch 2TMa (Fig. 13f) when closed. The relay 2TM (Fig. 13a) will not be energized until after the relay R34 (Fig. 13e) has been energized and then deenergized. When power is first applied to the voltage lines, a circuit makes from ground through a capacitor C44 (Fig. 13a), the normally closed side of relay contacts R34b, the normally closed side of relay contacts 1TMa and via a resistor, to the +50 v. line. Also, when power is so applied to the voltage lines, relay 1TM is energized. Before relay 1TM shifts its contacts a, capacitor C44 is fully charged. Hence, upon the shifting of these contacts, the circuit of relay 2TM will not be made and contacts 2TMa (Fig. 13f) will not be closed. Relays R13 (Fig. 13e) will be energized as an indirect consequence of the energization of relay R11 when a look-up operation is called for, as described in the preceding section of the specification. Upon energization of R13 it closes its contacts R13e (Fig. 13e) so that upon the energization of a table look-up relay TLD and closure of its b contact the relay R34 is energized. Upon energization of R34 it shifts its contacts R34b, causing the capacitor C44 to discharge through a resistor. When the relay R14 (Fig. 13e) is deenergized its points c open so that relay R34 is deenergized. Contacts a of R346 open allowing the relays R13 to be deenergized. Consequently, points R13e open and relay R34 is deenergized. Upon deenergization of R34 its contacts b (Fig. 13a) return to normal allowing a circuit to be made from ground through capacitor C44, the normal side of R34b, the shifted contacts 1TMa and through relay 2TM to a +50 v. line. Relay 2TM closes its contacts d to provide a resistance shunt around the relay accelerating the charging of condenser C44, so that the relay 2TM will be closed only long enough, following the storing of the computed argument in the relays CA (Fig. 13n), to provide for a station selection operation.

To simplify the explanation, the previous example of table 1 (see Fig. 14) will be considered. Selection of this table is effected by energization of the relay 1TL (Fig. 13c). Relay contacts 1TLb (Fig. 13e) close, so that upon closure of contacts R346b, the relays 1TLD and 1TLF are energized and then held through their stick circuit. Also, relay contacts 1TLa (Fig. 13d) are closed to partially complete the paths of entry for the computed argument which is to be compared with tape arguments of table 1. Relay 1TLF closes its contacts e completing a circuit (Fig. 13g) from ground through these contacts and the plugging between TDP1 and ASP (also see Fig. 12), and through a relay ASC. Relay ASC closes its contatcs a to establish the circuit of relays SA. These relays close points in the several comparison sections (Figs. 9, 10, and 11) described before, as a manifestation that the selected table 1 is an ascending table and, hence, consists of ascending tapes. Had the previous example of descending table 6 been selected, then relays 6TL and 6TLF would have been energized. Relay contacts e of 6TLF and the plugging between sockets TDP6 and DEP, would have caused the circuit of relay DES to be established. Relay contacts DESa would then be closed, so that the circuit of relays SD would make and close contacts in the comparing sections as a manifestation that the selected table 6 was a descending table.

To continue with the example of selected table 1 (see Fig. 14) the station selection will consist of a comparison seriatim of the station arguments at stations 1, 2 and 3 with the computed argument. The plugging for this purpose is as indicated in Fig. 12 in which socket CPU1 is plugged to socket SSCP1 from which the wire 80 of the station 1 comparison section extends (see Fig. 13f). Further plugging is from socket SSCE1 at the terminal end of wire B of station 1 comparison section to the input socket SSCP2 of station 2 comparison section. Other plugging is from SSCE2 at the end of wire B of the latter comparison section to the input socket SSCP3 (not shown in Fig. 13f) of the station 3 comparison section. Upon the closure of contacts 2TMa, a pulse of potential will be transmitted from the +150 v. line via these contacts, the now closed contacts g of 1TLF, the plug connection between sockets CPU1 and SSCP1, thence through the station 1 comparison section to output line A, if station 1 is selected by the comparison operating in accordance with the plan previously outlined. If station 1 is not selected, the comparison potential goes to output line B. If potential does go to line B of station 1 comparison section, it is transmitted further via the plug connection between SSCE1 and SSCP2 to the station 2 comparison section. The comparison potential will be led to line A if station 2 is selected and to line B if station 2 is not selected. From line B the comparison potential will go to station 3 comparison section and if station 3 is selected the potential will ultimately be applied to its line A. Suppose, for example, that the computed argument is —20,000. This computed argument is less than the station 1 argument and therefore station 1 will be selected and potential will be fed to its line A. Suppose instead that the computed argument is +2,500. Accordingly, station 2 will be selected and potential will be placed on its line A. Let it be supposed that the station comparison determines that station 1 is to be selected so that potential is applied during station selection upon line A of station 1 comparison section. From line A the potential is fed through a pair of resistors 1SR to the —100 v. line. The resistors 1SR are tapped at their junction point by the grid of the tubes 1ST. The potential fed to the grid overcomes the cut-off bias and renders tube 1ST conductive. A circuit thereupon is completed from the +150 v. line through station 1 selection relay 1SS and through the tube 1ST to ground. Contacts a close and establish a stick circuit for the grid of tube 1ST to maintain the tube conductive. This stick circuit is from the +150 v. line through the normally closed contacts R346d, the now shifted contacts f of 1TLD, the plug socket CH1 (also see Fig. 12), the plug wire to socket SSCH1, thence via the normally closed contacts 1MSSc, the now closed stick contacts a of 1SS and to the grid of tube 1ST and to the —100 v. line. Hence tube 1ST will remain conductive and relay 1SS energized until another look-up operation takes place upon table 1.

*Intrastation selection circuits*

After the station has been selected as manifested by energization of its relay SS, intrastation selection takes place. The station selection singles out a station in the chosen table according to the plan previously outlined. The intrastation selection selects a particular one of the arguments at the selected station in accordance with the rules previously described. For an ascending tape the particular tape argument selected will be either equal to the computed argument or immediately lower in the algebraic sense. For a descending table the particular argument will be either equal to the computed argument or immediately higher in the algebraic sense. In the chosen example of table 1, assume that station 1 has been selected, so that relay 1SS is now energized. Energization of 1SS closes its contacts b (Fig. 13n) to close the circuit of station 1 selection relays 1CSS and 1DSS. Energization of 1SS also closes its contacts c and d (Fig. 13m) to complete circuits through a relay 1SQ and through the coil P of a relay 1SK. The circuit for relay 1SQ extends from ground via 1SSc through a capacitor 1CQ and through 1SQ to the +50 v. line. Relay 1SQ closes its contacts a to provide a resistance shunt path which accelerates the charging rate of condenser 1CQ. Hence the relay 1SQ will be energized only for a very brief interval.

The circuit of coil P of relay 1SK will be established as follows: From ground via 1SSc and 1SSd through the coil P to +50 v. line. Coil P closes contacts 1SKa to establish a circuit through the hold coil H of this relay. This hold coil circuit extends from the +50 v. line through the coil H, the now closed contacts ISKa, the normally closed contacts IMSSd and plug socket SRHI (also see Fig. 12) and the plugging from socket SRHI to SRII, contacts ISQb when they reclose, the plugging between sockets SREI and SRI2; thence via the normally closed contacts b of 2SQ, plugging between SRE2 and SRI3, the normally closed points b of 3SQ, socket SRE3, and the plugging from this socket to the 0 v. socket, connected to ground.

During the brief period of energization of relay ISQ it shifts its contacts c (see Fig. 13k) to establish a circuit from the +150 v. line, serially through the unshifted contacts c of stations 36 to 2 relays SQ and shifted contacts c of relay ISQ, to a wire w101 and to the resistance-coupled grids of tubes T228 and T233 and thence to the −100 v. line. Accordingly tubes T228 and tubes T233 become conductive and provide parallel circuit paths which enable the coil P of relay IS1 to be energized. Coil P of IS1 closes its contacts d to establish a circuit for the companion hold coil H (Fig. 13a) and also for two parallel relay coils IS2 and IS3, the circuits being from the +50 v. line through coil H (IS1), IS2 and IS3 in parallel, contacts d of IS1, the normally closed side of contacts a of a relay HI, thence to ground. Contacts a of IS2 close and complete a circuit through relay ISD. Energization of relay IS1 also closes its contacts b and when the timer commutator 1 (also see Fig. 1) makes, a circuit is established as follows (Fig. 13b) from the +150 v. line through the timer commutator 1, the now closed contacts b of IS1 and across the resistance coupled grid of a tube T234, to the −100 v. line. Tube T234 becomes conductive and a relay PRO1 thereupon becomes energized. Relay PRO1 closes its contacts a to establish a stick circuit for the grid of tube T234, this stick circuit extending from +150 v. line through contacts a of PRO1 through contacts b of IS1 and across the grid of T234 to the −100 v. line. Shortly before the timer commutator 1 makes, the timer commutator 2 makes and with relay PRO1 energized and closing its contacts b, a circuit makes from the +150 v. line through the timer commutator 2, to contacts b of PRO1 and across the resistance-coupled grid of tube T236 to the −100 v. line. T236 becomes conductive and the relay PRO2 thereupon becomes energized. Energization of relay PRO2 closes its a contacts and establishes a shunt circuit around timer commutator 2 for maintaining the grid of T236 above cut-off bias. This combination of two relays PRO1 and PRO2 gives assurance of a full pulse to the clutches. The PRO2 relay is used to time the pulse to the clutch magnets so there will be no danger of nicking the clutch teeth and also to insure that the same tooth of several clutches, when their magnets are energized together, will be engaged. Referring to Fig. 13L closure of contacts PRO2b completes the circuit of the station 1 clutch magnet ISCM. This circuit extends from ground through contacts d of IS3, contacts b of PRO2, the normally closed contacts d of relay HI, the wire w102, the now closed contacts ITLFd, plug socket CLP1 (also see Fig. 12), plug connection to socket SCPU1, thence through contacts b of ICSS, the normally closed contacts R400d through clutch magnet ISCM to the +50 v. line. Energization of this clutch magnet causes station 1 tape to be set moving.

At the time that the station clutch magnet is energized, a parallel circuit makes through the selected one of the relays ISTR. In this particular example the table 1 plug socket CLP1 (also see Fig. 12) is connected by plug wiring to the socket ISTS1. Accordingly, at the time that station 1 clutch magnet is picked up, a circuit also makes from the +50 v. line (Fig. 13L) through the group of relays ISTR1, then through the related pair of normally closed contacts c of relay HI, to plug socket ISTS1, plug connections to CLP1 and through contacts ITLFd, HId, PRO2b, and IS3d to ground.

It is pointed out that at the time the table look-up relay ITLF was energized it also established circuits through relays CTR (Fig. 13g) in accordance with the plugging between sockets CTS and CPS (also see Fig. 12). As table 1 has a maximum of five-digit arguments the plugging is such that upon closure of contacts h of ITLF the relays CTR1, 2, 3, 4 and 5 are energized. Also, with the plugging as shown the relay CTR(N) is energized.

At the time that relay IS2 is energized, it shifts its contacts d (Fig. 13k) isolating the selector brush comparison section from the intermediate and read brush comparison sections with the result that upon intrastation selection a comparison is made only of the computed argument with the arguments sensed by the selector brushes. Even before or as the tape at station 1 starts moving, the argument under the selector brushes is sensed and manifested by selective energization of relays SB—TA (see Fig. 13i). Assume, for instance, that there is a perforation in index position 22 under the selector brushes at station 1. Accordingly, a sensing circuit will make from +150 v. line (Fig. 13j), the station 1 common, brush SB22 at station 1, the connected contacts a of relay IDSS to a wire ws22. Wire ws22 (also see Fig. 13i) connects to the resistance-coupled grid of tube SV22 and to the −100 v. line. SV22 becomes conductive and the following circuit is established. From the +150 v. line through the closed serially connected contacts a of ISTR6, ISTR5, ISTR4, ISTR3, and ISTR2, thence through coil P of a relay IIS—TA (pos. 22) and relay SB—TA (pos. 22), the now closed contacts a of energized relay CTR5 and through the tube SV22 to ground.

The relay IIS—TA (pos. 22) controls position 22 points of the table 1 intermediate comparison section (see Fig. 13k). The relay SB—TA (pos. 22) controls points of the selector brush comparison section. It will be noted that the opening of the relay contacts a of the chosen one of the relays ISTR1 to 6 determines that the coils P of corresponding ones of the relays IIS—TA to 6IS—TA may be energized, the numbers 1 to 6 being indicative here of relationship to tables 1 to 6, respectively. Thus, with table 1 relay ISTR1 energized, it enables coils P of relays IIS—TA to be energized selectively according to the sensing of arguments by the selector brushes of the selected station. The sensing of index positions 1 and 2 by the selector brushes of the selected station controls the energization of the sign manifesting relays TA+ and TA−. The sign selectors are routed through selective sign relay points. For each chosen table, the plugging between sockets CTS and CPS (see Fig. 13g) determines the number of places (from the left) in the arguments which are to be sensed by the brushes and also whether the sign is to be taken as represented or in reverse or is to be ignored and accorded a fixed + or − sign. For table 1 the sign plugging is between CTSN and CPSN, so that relay CTR(N) is energized when the table 1 look-up relay is in operation. With relay CTR(N) energized, the sign will be taken as represented. If relay CTR(R) had been energized then the sign would be read out as reversed. If CTR+ were energized then the argument would be given a fixed + sign and if CTR— were energized it would be accorded a fixed − sign. In the present example where table 1 has been selected and relay CTR(N) energized, the signs will be taken as represented. Reference to Fig. 14 shows that selected station 1 has negative arguments. Hence the index positions 2 will be perforated. Referring now to Fig. 13j, the sensing of a perforation in index position 2 by the selector brush SB2 at station 1 establishes the following circuit: From the +150 v. line, the station 1 common, brush SB2, the connected points a of IDSS, to the wire ws2 (turn to Fig. 13i); the circuit continues from ws2 through relay contacts a (now closed) of CTR(N), the normally closed side of contacts a of CTR(R) and to the coupled grid of SV2 which is connected by a resistance-capacity circuit to the −100 v. line. Tube SV2 becomes conductive and allows a circuit to be made from the +150 v. line through the now shifted contacts b of energized relay ISTR1, then through the coil P of relay IIS—TA—, and through relay SB—TA— and the tube SV2 to ground. It will be recalled that the grid circuits of the sign sensing tubes have a slightly greater delay characteristic than the grid circuits of the numerical value sensing tubes for reasons which have been explained hereinbefore.

It should be noted that if relay CTR(R) had been energized its points a and b (Fig. 13i) would be shifted. Accordingly, the sensing circuit previously traced to line ws2 and through the contacts a of CTR(N) would be unable to make. Instead, the circuit would continue from ws2 through the shifted b contacts of CTR(R) to the grid circuit of the tube SV1. As a result, the relays IIS—TA+ and SB—TA+ would have been energized. If a fixed sign were to be accorded to the arguments then the relay CTR+ or CTR— would be energized depending on whether the desired sign were a + or a − sign. Assume, for instance, that CTR+ is energized. Accordingly, a circuit would make at every feed step from the +150 v. line (Fig. 13h) through the timer commutator 5 (also see Figs. 1 and 16), thence to the wire wf (also see Fig. 13i) and through the contacts b of CTR+ and the normally closed side of contacts b of CTR(R) to the coupled grid of SV1.

While the selector brushes are sensing arguments and controlling the energization accordingly of relays SB—TA and intermediate comparison relays IIS—TA, the read brushes are sensing arguments preceding by two lines, and selectively controlling energization of relays RB—TA (Fig. 13h) which control points of the read brush comparison section (Fig. 13k). The read brush circuits to the grids of tubes RV3 to RV22 are exactly the same as traced before in the description of station storage. However, with the relays MSS now not energized and relays CTR instead energized, tubes RV3 to RV22 upon becoming selectively conductive will complete circuits through the relays RB—TA3 to 22, selectively. Also at this time the sensing of signs by the read brushes will control the tubes RV1 and RV2 through the selective sign relay contacts of CTR(N) or R. These sign circuits are similar to those traced in connection with the selector brush sensing of signs. It is to be noted that fixed + or fixed − signs may be accorded the arguments under the read brushes in consequence of the preliminary energization of relay CTR+ or relay CTR—. If the tube RV1 is energized the relay RB—TA+ will be energized. If the tube RV2 is energized then the relay RB—TA— will be energized.

To return to the intrastation selection which is performed under control of the selector brush comparison section, as each argument is sensed by the selector brushes of the selected station, it causes selective energization of relays SB—TA to shift points of the selector brush comparison section. Thus, in step with the sensing of arguments by the selector brushes, the selector brush comparison section compares each sensed argument successively with the computed argument. The selector brush comparison circuit extends from the +150 v. line through the now shifted contacts d of energized relay IS2, thence through the selector brush comparison circuit and to line A or lines B and C depending upon the relation between the sensed argument and the computed argument. Since we are now dealing with an ascending table, comparison results will be in accordance with Rules 1 and 2 of intrastation selection. Let it be assumed that the computed argument is −20,000 as a result of which station 1 has been selected for intrastation operation. According to Rule 2 of intrastation selection it is desired to select the first algebraically lower negative tape argument as a result of the selector brushes sensing an equal or the first algebraically higher tape argument following a low tape argument. It will also be recalled that selection of a tape argument is effected when potential is on line A of the selector brush comparison section following the application of potential upon lines B and C. At the beginning of intrastation selection the tape at station 1 is in its initial position (see Fig. 14) in which −29,800 is under the brushes SB. Even before the tape starts to move the selector brush comparison circuit determines whether the argument under the selector brushes is equal to, lower than, or higher than the computed argument. Under the assumption that the computed argument is −20,000 and that −29,800 is under brushes SB, a comparison circuit is established from the +150 v. line through the shifted contacts d of IS2 and to an input line 80 of the selector brush comparison section. Since the computed and tape arguments are of the same signs the comparison potential proceeds to the numerical value comparison elements (see Fig. 9). Inasmuch as the tape argument is numerically higher than the computed argument the comparison potential is directed to line TAH (also see Fig. 11) and thence via b of TA— and b of SA to lines B and C. Referring back to Fig. 13k, potential on lines B and C is fed through the normally closed contacts c of relay HI and the shifted contacts b of IS2 to the resistance coupled grid of T229 and thence to the −100 v. line. Accordingly, tube T229 becomes conductive and the relay L connected to the anode of the tube is energized. It is clear that under the assumed conditions when the selector brush comparison section determines that the tape argument under the selector brushes is algebraically lower than the computed argument that the relay L will be energized. Referring to Fig. 13a, closure of contacts a of relay L establishes the circuit of coil P of duo-wound relay X. Relay X closes its points

*a* to establish a stick circuit from +50 v. line through the coil P, its contacts *a*, the normally closed side of points *a* of relay HI and then to ground. To make sure that relay L stays energized long enough to insure effective operation of relay X, the relay L when energized closes its contacts *b* (Fig. 13*k*). This establishes a circuit path from the +150 v. line through the normally closed contacts *b* of relay X and the now closed contacts *b* of relay L to the resistance-coupled grid of T229. Thus, the tube T229 remains conductive and relay L remains energized until relay X is effectively actuated to open its contacts *b*. As previously described the station I clutch has been engaged and the tape starts to move.

Successive comparisons are made during movement of the tape of each successive tape argument feeding under brushes SB with the computed argument until the comparison potential is applied to line A of the selector brush comparison section. In the particular case under discussion this will occur when a high or algebraically equal tape argument is sensed by brushes SB. The first such tape argument at station I is −20,000 equal to the computed argument. The comparison will place potential on line CET (see Fig. 11) and thence through *c* of SA and *e* of TA− and *a* of SA to line A. Referring back to Fig. 13*k*, the potential on line A is transmitted via the now closed contacts *c* of energized relay X to the resistance coupled grids of tubes T225 and T230. Tubes T225 and T230 become conductive and as a result the following circuit is now established: From the +150 v. line through coil P of relay HI, the shifted contacts *d* of energized relay IS1 and through tubes T225 and T230 to ground. It is clear that in intrastation selection, the relay HI will not be energized until the relay X is first energized. Coil P of relay HI shifts the relay contacts *a* (Fig. 13*a*) establishing a circuit from the +50 v. line through coil H of relay HI, the normally closed clear signal contacts R40*g*, the now shifted contacts *a* of HI, then to ground. Relay HI will thus remain effective until the relay R40 is energized and this will occur only when the intrastation selection is checked and found to be accurate.

The shifting of contacts *a* of HI also breaks the circuit previously established through the relays IS1(H) and IS2 and IS3. Also the shift of these contacts *a* of HI breaks the circuit through coil P of relay X. However, the relay ISD remains momentarily energized until contacts IS2*a* reopen.

Energization of the HI relay also opens its contacts *d* (see Fig. 13L) which are in the station clutch circuits. Accordingly, the station I clutch magnet ISCM is deenergized and the clutch disengaged. As previously explained, the clutch will be latched up after the line following the one last compared has moved to the intermediate position, midway between the selector brushes and the read brushes. The preceding tape argument will be under the read brushes. In the present example −20,000 therefore will be in intermediate position and the preceding value −20,200 will be under the brushes RB. Thus the requirement of Rule 2 has been met; namely, the intrastation selection has selected a tape argument which is algebraically next lower than the negative computed argument.

It is clear by now why the end argument on one table tape and the initial argument on the following table tape are duplicates. The desired argument, as is now understood, is selected as a result of two comparisons, the first being a conditioning comparison and the last of the two being a selection effecting comparison between the computed argument and the argument following the desired argument. The rules of intrastation selection indicate why such comparisons will never select the end argument of any table tape. However, the end argument is required not only for station selection purposes but also as the selection effecting comparison value for selecting a preceding argument, during intrastation selection. In a situation where the argument to be selected is equal to the end argument of one table tape, it is evident that the desired argument must be found on the following tape, wherefor the latter tape is provided with an initial argument equal to the end argument of the preceding tape. A few examples will make these points clear. Assume the computed argument is equal to −10,000 and that table I (Fig. 14) is chosen. Station selection will result in selecting station I. According to Rule 2 of intrastation selection, the desired value is the first algebraically lower negative tape argument and is found by the selection effecting comparison with the computed argument of an equal or first algebraically higher tape argument. With the computed argument equal to −10,000, selection effecting comparison is with the equal end argument, −10,000. However, under intrastation selection, the selected argument will be the preceding argument −10,200 which is next algebraically less.

Assume that the computed argument is −9,900 in which case the selected station will be station 2. The intrastation selection effecting comparison is with the first algebraically higher tape argument −9,800. The preceding argument is −10,000 which therefore is selected according to Rule 2.

From the foregoing it is seen that whereas the end argument at station I served as a determining comparison value in one case, the like value initial argument at station 2 was selected in the second case.

The computed argument is −100 and table 6 (Fig. 15) has been chosen. The selected station is station 30 at which the initial argument is −100 equal to the computed argument. According to Rule 4, the selection effecting comparison is with the first algebraically lower tape argument −101, so that the preceding, initial argument −100 is selected.

Assume instead that the computed argument is −99. Station 29 will be selected. At station 29 the first algebraically lower tape argument is −100 which is the end argument at the station. Accordingly, the preceding tape argument, −99, will be selected.

Considering Rule 1 of intrastation selection, the selection effecting comparison is with the first algebraically higher tape argument. There is no tape argument at an ascending tape station which is algebraically higher than the end argument. Accordingly, an end argument can never be selected under Rule 1.

Considering Rule 3 of intrastation selection, the selection effecting comparison is with an equal or first algebraically lower tape argument. The end argument of an ascending tape is its algebraically lowest argument. Accordingly, it is impossible to select the end argument since it does not precede an argument algebraically lower or equal with respect to the computed argument.

Intermediate storage

The purpose of intermediate storage is to have readily accessible, for comparison with the computed argument, the tape argument located in the intermediate position midway between brushes RB and SB of the selected station. Intermediate storage is used in checking the accuracy of intrastation selection and also in checking the position of the tape at a selected station upon repeat selection of the same station for a successive look-up operation.

Intermediate storage consists of the duo-wound relays ISTA of which coils P are shown in Fig. 13*i* and coils H in Fig. 13*m*. There are six sets of these intermediate storage relays, one for each of the six look-up tables. In the preceding section of the description it was pointed out that when a selected station is clutched in for intrastation operation, then a chosen table group of intermediate storage selection relays ISTR1 to 6 (Fig. 13L) is also energized. The energized relays ISTR select coils P of correspondingly numbered relays IS—TA to be energized selectively under control of the selector brushes and according to the tape arguments successively sensed by the selector brushes. As the record tape at the selected station moves line after line across the selector brush position, the set-up in the intermediate storage changes according to each successively sensed tape argument, until the desired argument has been located under control of the selector brush comparison section. In other words the coils H of the intermediate storage relays are not energized until the desired tape argument has been found. When this argument has been found the relay HI (Figs. 13*a* and *k*) consequently is energized and permits the coils H of the intermediate storage relays to be energized in accordance with the tape argument last entered into coils P of intermediate storage. To recapitulate, comparison of a controlling tape argument with the computed argument has caused the relay HI to be energized. The relay HI has brought about deenergization of the station clutch magnet, and the tape will stop with the controlling argument designation located in the intermediate position between the selector brushes and the read brushes. As previously explained, the circuits through the relays generally designated TA and selectively energized under control of the selector brushes are held for a short interval after the controlling designation line has passed the selector brushes. Thus, the energized coils P of relays IS—TA and the energized relays SB—TA (Fig. 13*i*), which manifest the tape argument now at intermediate position will remain energized for a short period after the relay HI has been energized.

It was previously explained that the relays ISTR1 to 6 (see Fig. 13L) are selectively energized at the beginning of the intrastation operation. In the present example the relay ISTR1 has been energized. Referring to Fig. 13*m*, with relay ISTR1 energized its point *b* is closed and establishes the circuit of a relay ISTD1, this circuit being from ground through the *b* contacts of ISTR1 and through relay ISTD1 to the +50 v. line. Also, with the relay ISTR1 energized, its points *c* are shifted and open one of the circuit paths to the coils H of intermediate storage relays IIS—TA. With relay ISTD1 energized it prepares a circuit path for the said coils H. During intrastation operation, until the relay HI is energized, there is no circuit path which can be established through the coils H of the selected intermediate storage relays. When the desired argument has been found during intrastation selection, the relay HI is energized. Accordingly, it closes its relay points *e* (Fig. 13*m*) to establish circuit paths for the hold coils H of the intermedate storage relays whose coils P have last been energized. For instance, if the coil P of IISTA+ has been energized, then it closes its relay contacts *a* and upon closure of points *e* of relay HI, a circuit makes from ground through the latter points and then in parallel through points *d* of IS2 (now energized) and points *b* of ISD (also now energized), thence through the shifted contacts *c* of ISTR1 or *a* of ISTD1, and the now closed contacts *a* of IIS—TA+ through its coil H to the +50 v. line. Also, upon energization of relay HI it opens its points *d* (Fig. 13L) to break the station 1 clutch magnet circuit and also to deenergize the relay ISTR1. In turn the relay ISTR1 opens its contacts *b* to deenergize ISTD1. However, there is sufficient delay between the deenergization of ISTR1 and ISTD1 to permit the circuit of the intermediate storage coil H to be maintained momentarily during the restoration of *c* contacts of ISTR1, by the shunt circuit from points *d* of IS2 or *b* of ISD to the shifted contacts *a* of ISTD1 and, as before, via contacts *a* of the energized intermediate storage relays, through their coils H.

The relay HI when energized also shifted its contacts *a* to break one circuit of coil H of IS1 and of the relays IS2 and IS3 (see Fig. 13*a*). However, the points *d* of IS2 (Fig. 13*m*) and the contacts *b* of ISD are still in operative condition when the points *e* of relay HI have been closed so that the above circuits through coils H of intermediate storage relays may be established. The relay IS2, being deenergized, permits its contacts *a* to be restored to open condition so that the relay ISD is deenergized. There is a short delay between deenergization of IS2 and deenergization of ISD. Accordingly, the circuits through coils H of intermediate storage (Fig. 13*m*) are retained during restoration of contacts *d* of IS2, by the still shifted points *b* of ISD. By the time relay ISD has been deenergized and the relay ISTD1 also deenergized, the points *c* of ISTR1 are fully restored to normal status. Accordingly, the circuits of coils H of the energized intermediate storage relays are established from ground through the restored points *c* of ISTR1 or *a* of ISTD1 and the *a* contacts of these relay coils H, through these coils, to the +50 v. line. In this manner the tape argument in intermediate position of any selected station in a table is retained in intermediate station storage. The next tape argument stops under the selector brushes and is sensed by these brushes, causing the selective energization of relays SB—TA (Fig. 13*i*). At this point, however, the relay ISTR1 is in a deenergized status. Accordingly, all the coils P of relays IS—TA are now shunted out and the circuit of SB—TA makes through the normally closed points of the ISTR6 to ISTR1 relays. It is clear then that the tape argument now stopped under the selector brushes cannot enter intermediate storage.

When the same table is again looked up and intrastation selection initiated, the same table relays ISTR and ISTD are reenergized. Their contacts (Fig. 13*m*) reverse and break the circuits of coils H of intermediate storage relays IS—TA for the table.

Checking the intrastation selection

After the intrastation selecting operation has been completed, a check is made to determine whether the desired argument has been properly located under the read brushes of the selected station. The argument under the read brushes is now being manifested by the selective energization of relays RB—TA (Fig. 13h). As previously stated these relays control points of the read brush RB comparison section (Fig. 13k). The check for correct intrastation selection is made first through the RB comparison section. In certain cases, the check by the RB comparison circuit is sufficient. In other cases, the check will proceed further through the selected one of the intermediate IS comparison sections. The checking operation will verify compliance with the four rules of intrastation selection which are, in fact, the rules for selection of the desired argument.

According to Rule 1, if the chosen table is an ascending one and the computed argument is positive, then a tape argument equal to or next algebraically lower is the desired argument. As a first case under Rule 1, assume that the tape argument under the read brushes is equal to the computed argument. Accordingly, a checking circuit will be established from +150 v. line (Fig. 13k) through the now normal, serially connected contacts c of relays 36SQ to ISQ, then through the normally closed contacts e of a relay PT, contacts h of relay IS1 (now deenergized), contacts h of relay IS3 (also now deenergized), then through the normally closed contacts h of relay R41 to the input line 80 of the RB comparison section. Referring to Figs. 9 and 11, the potential applied to line 80 is fed to line CET, since it has been assumed that the computed and tape arguments are equal. From line CET the potential is directed via contacts c of SA and d of TA+ to the exit line C. Returning now to Fig. 13k, the line C of the RB comparison section connects through the normally closed relay contacts R13a to the resistance coupled grids of tubes V231 and V232. Hence the tubes become conductive and clear signal relays R40 and R41 become energized. Energization of these relays is a manifestation that the correct tape argument has been located under the read brushes of the selected station and that look-up has been completed.

Still considering an ascending table and a positive computed argument, as a second case under Rule 1 assume that the tape argument under the read brushes is lower than the computed argument. The circuit to the read brush RB comparison section (Fig. 13k) is the same as in the preceding case. Since the tape argument under the read brushes is the lower one of the compared arguments, the read brush comparison section feeds the applied potential via either of two alternative paths to the exit line B. One of these paths is from line CSH (Fig. 11) through contacts b of SA. The other of the paths is from line CAH via c of TA+ and b of SA. Reference to Fig. 13k shows that line B of the RB comparison section leads to the common side of normally open table look-up relay contacts ITLFk to 6TLFk respectively associated with the six intermediate IS comparison sections 1 to 6. The potential upon line B of the RB comparison section will be directed to the intermediate comparison section corresponding to the table being looked-up. For example, with table 1 chosen for look-up, the relay 1TLF (see Fig. 13e) is energized and has closed its contacts k (Fig. 13k), thereby selecting intermediate comparison section 1. Further, when the selected station of table 1 was clutched-in for intrastation operation, the relays 1STR1 (Fig. 13L) were energized and selected the intermediate storage relays 1IS—TA for storing the intermediate argument at the completion of intrastation operation. These table 1 intermediate storage relays control the TA points of the table 1 intermediate, IS comparison section 1 which has been selected to function. According to Rule 1 of argument selection the tape argument under brushes RB of the selected station may be the tape argument next algebraically lower than the computed argument. If this is the case then the intermediate storage should contain a tape argument higher than the computed argument. Therefore, the test here is not only whether the read brush comparison section indicates that the tape argument under the read brushes is lower than the computed argument, but also whether the selected intermediate comparison section indicates that the intermediate tape argument is higher than the computed argument. The checking circuit for a lower tape argument under the read brushes has already been traced as far as the exit line B of the RB comparison section. Assuming that table 1 has been selected, contacts k of 1TLF are now closed and connect the exit line B of the RB comparison section to the input line 80 of IS comparison section 1. Referring to Figs. 9 and 11, if the intermediate tape argument is higher than the computed argument, potential on line 80 will be transmitted to line TAH of the intermediate comparison section 1 and then via contacts b of TA+ and a of SA to line A. Referring back to Fig. 13k, potential on line A of the selected intermediate comparison section is fed through the normally closed contacts R13a to the grids of tubes V231 and 232, rendering them conductive. Hence, relays R40 and R41 become energized, manifesting correct selection of the desired argument.

There is only one possible case of correct argument selection under Rule 2 of intrastation selection. According to this rule, if the table is an ascending one and the computed argument is negative the desired argument is the first algebraically lower negative tape argument. This means that the intermediate argument must be either equal to or the first algebraically higher tape argument. Assume that the tape argument under the read brushes is algebraically lower than the negative computed argument. The checking circuit is the same as before as far as the line 80 of the RB comparison section (Fig. 13k). An algebraically lower negative tape argument is the numerically higher of the two negative compared arguments. Hence, if the tape argument under the read brushes is algebraically lower than the negative computed argument, potential will be present on line TAH (Figs. 9 and 11) and be transmitted via b of TA— and b of SA to the line B of the read brush comparison section (return to Fig. 13k). The potential on line B will be transmitted to the selected intermediate comparison section to test the comparative relationship of the computed argument to the intermediate tape argument. According to Rule 2 the intermediate argument should be either equal to or algebraically higher than the negative computed argument. Suppose that the intermediate argument is equal to the computed argument. Then potential is on line CET (Fig.

11) and transmitted via c of SA, e of TA— and a of SA to line A which leads to the turning on of the tubes V231 and 232 and the energization of the relays R40 and R41 (Fig. 13k). Suppose instead that the intermediate negative tape argument is algebraically higher than the negative computed argument. In that event potential will be present on line CAH (Fig. 11) and will be transmitted via c of TA— and a of SA to line A of the selected intermediate section (see Fig. 13k). Consequently, the relays R40 and R41 will be energized indicating that the correct argument has been selected.

According to Rule 3 of argument selection, if the tape is descending and the computed argument is positive, then the desired argument is the first tape argument algebraically higher than the computed argument. Assume that the chosen table was a descending table and that the computed argument was positive. If the tape argument under the read brushes is algebraically higher, then the read brush comparison section will transmit the applied potential to the line B (see Fig. 13k). From line B the potential will be fed into the selected intermediate comparison section. If the intermediate argument is equal to or lower than the computed argument, the selected intermediate comparison section will feed the applied potential to the line A. Consequently, relays R40 and R41 will be energized. It is clear then that for checking selection under Rule 3 the comparison must be made between the computed argument and the tape argument under the read brushes and also between the computed argument and the intermediate tape argument.

According to Rule 4 of argument selection, if the table is descending and the computed argument is negative the desired tape argument is either algebraically equal to or next higher than the computed argument. If the table is descending and the computed argument is negative and the tape argument brought by intrastation selection under the brushes RB is equal to the computed argument, then the potential applied to the RB comparison section will be transmitted to its exit line C. Hence relays R40 and R41 will be energized. Still considering Rule 4 of argument selection, assume that the intrastation selection has located an algebraically higher tape argument under the read brushes. In order to determine whether this is the first algebraically higher tape argument than the computed argument, it is necessary also to compare the intermediate argument with the computed argument. If the argument under the read brushes is algebraically next higher than the computed argument, then the intermediate argument should be algebraically lower than the computed argument. Assuming that the argument under the read brushes is algebraically higher than the computed argument, the read brush comparison section will feed the applied potential to its exit line B from which the potential will be directed into the selected intermediate comparison section. If the intermediate argument is algebraically lower than the computed argument, the selected intermediate comparison section will direct the applied potential to its line A so that the relays R40 and R41 will be energized.

Upon energization of relay R40 it closes its points b (Fig. 13k) which along with contacts R13a establish a stick circuit for the grids of the controlling tubes V231 and V232. This stick circuit will be maintained until a new look-up operation is initiated. In the manner previously explained the closure of contacts a of R40 (see Fig. 13d) enables the coil P of relay R11 to be energized to start look-up operation. R11 in turn will pick up relays R346 (Fig. 13e) which will then cause energization of relays R13. Relay points R13a (Fig. 13k) will then open to drop the grid circuits of tubes V231 and V232 so that relays R40 and R41 will be deenergized.

As described above, the relays R40 and R41 are energized at the completion of intrastation selection and after verification of the accuracy of the argument selection. Relay R41 when in the deenergized status which it has during the course of a look-up operation allows the contacts R41b (Fig. 13a) to remain in the position shown so that a circuit is made from ground through these contacts and a signal lamp OSL and a suitable resistor to the +150 v. line. The lamp is lit to indicate that a look-up operation is taking place. At the completion of look-up operation and after verification of its accuracy, relay R41 is energized and reverses contacts R41b thus breaking the circuit through the signal lamp. The lamp goes out, manifesting completion of the look-up operation. With the contacts R41b shifted, a circuit is made from ground through these contacts, a hand switch HS1 and relays R400 to the +50 v. line. Relays R400 control the points R400d (Fig. 13L) which are in the clutch magnet circuits. The clear signal relay R40, when energized, opens contacts R40g (Fig. 13a) to break the circuit of coil H of the relay HI.

The table look-up relays TLD and TLF are deenergized upon completion of the look-up operation as a result of the reopening of contacts R40c (Fig. 13e). At the same time, reopening of contacts R40c breaks the circuits of the coils H of the relays TCA (Fig. 13n) into which the computed argument was entered. When the previously energized relay TLD is deenergized, its contacts f (Fig. 13f) return to normal status, and transfer the hold circuit for the energized SS relay directly to the +150 v. line. The capacitors C120 maintain current flow through the energized relay SS during the restoration of the f contacts of the TLD relay. Thus the previously energized relay SS is maintained energized until the next look-up of the same table. Upon such next look-up, contact R346d will open and the TLDf contacts will shift so that neither stick circuit for the relay SS will be closed, and the relay will be deenergized.

*Reading out*

When the desired argument has been found and relays R40 and R41 energized, then the argument and the related functional values may be read out into computing apparatus (not shown). As explained in the preceding section, the particular relay SS (Fig. 13f) corresponding to the selected tape station, is maintained energized until a new look-up is performed on the same table. Meanwhile this relay SS will remain energized to enable reading out of the values under the read brushes at the selected station and the companion stations if the table is of multiple tape width. The readout is under control also of table out relays 1TO to 6TO (see Fig. 13o). These relays are selectively picked up under control of means outside the look-up unit. However, reading out of the table which is in the process of being looked up cannot be initiated. Assume for instance that table I is being looked up so that the table look-up relay 1TL has been energized (Fig.

13c). The energization of the relay ITL closes the relay contacts ITLd thereby establishing the circuit of coil P of a control relay ITOC. Contacts b of the relay ITOC close and complete the circuit of hold coil h of the relay, this hold circuit extending to line w34 in Fig. 13e and being similar to the hold circuit for the relays TLD and TLF and for the TCA(H) coils (also see Fig. 13n). The energized relay ITOC opens the contacts ITOCa in the pick-up circuit of the table I readout relays ITO (see Fig. 13o). It is clear then that until the look-up of table I has been completed and the clear signal relay R40 energized to open the contacts R40c (Fig. 13e) and thereby break the stick circuit of the relay ITOC, that table I cannot be read out. The other relays TOC function similarly in relationship to the other table look-up and table readout relays.

Referring to Fig. 13o, let it be assumed that table I has just been looked up and is now to be read out. In practice the selection of a table readout relay will be made through program or sequence controlled circuits which are diagrammatically represented here by the relays ITOR to 6TOR and their relay contacts a. For instance, the closure of contacts a of ITOR will allow a circuit to be closed from ground through these contacts and the now reclosed contacts ITOCa, through the group of relays ITO, and to the +50 v. line. Relay contacts ITOb thereupon close and complete a circuit through an arc suppressor relay ITRA. The relay ITRA shifts its points a in circuit with the relays ITO. Subsequently, when the pick-up circuit through the relays ITO is broken, the relays will remain energized momentarily via the shifted contacts a of ITRA and a capacitor C130.

Key switches TOK shunt the contacts a of the relays TOR and provide alternative means for establishing the circuit of a relay TO.

The readout circuits will include not only points of a selected table readout relay TO but also points of station read brush selecting relays ASS or BSS (see Fig. 13n). These relays are connected to plug sockets SRA and SRB (also see Fig. 12) which are plugged, according to the readout requirements, to the table I to table 6 sockets ROA and ROB. Sockets ROA and ROB connect through contact a of the table out relays TO to the normally open contacts e of the station selecting relays SS. If a station is selected, then the points e of the related relay SS are closed, and upon closure of the table out relay contacts a in series therewith, a circuit will be established through a corresponding station selecting relay ASS or BSS. For instance, with station I in table I selected, the contacts e of ISS are closed and a circuit makes from ground via ISSe, ITOa, plug socket ROAI of table I (also see Fig. 12), plug wire to socket SRAI, normally closed safety relay contacts CLRa and through a group of IASS relays to the +50 v. line. For the illustrative table I, only the relays ASS will be needed. For the illustrative table 6, relays ASS and BSS will be needed and those corresponding to the selected stations will be picked up by circuits similar to the one last described. With the plugging as shown in Fig. 12, selection of table 6 station 29, for example, will upon the energization of table 6 readout relay 6TO result in the energization of relays 32ASS. Station 32 may then be read out when such operation is called for by the program or sequence means. Thereafter, the relay 2TO will be energized and result in the energization of relays 29ASS and 3IBSS (not shown). Accordingly, the reading out of stations 29 and 31 may be affected concurrently or successively at and when called for by the sequence or program means (not shown). The readout circuits are not shown complete in Fig. 13j since the ultimate destination of the values which are read out is not relevant to the present disclosure. Such portion of a readout circuit as is shown in Fig. 13j will be traced. Assume, for instance, that station I of table I has been selected for readout and therefore that relays IASS and ITO are now energized. Assume that there is a perforation in index position 78 of the designation line under the brushes RB of station I. A readout circuit will then start from the +150 v. line and extend to the station I common, then to brush RB78 of station I, the now closed contacts a of IASS, a common wire w78 (to which the points ASSa for positions 78 of all the stations are connected), then to a plug socket RO plugged suitably, in a manner not shown, to the computing section (not shown).

*Repetitive look-ups and the remembering means*

The first look-up operation after power was placed on the voltage lines of the look-up unit was described in the preceding sections of the description. For succeeding look-ups in the same table, the computed arguments often change by consecutive small steps. Hence, as will be made clear, if the same station is selected upon a repeat look-up operation, it is an advantage to test the position of the tape at the selected station with respect to the new computed argument, before initiating intrastation operation. For this purpose, remembering means comes into play after the first look-up operation to determine whether selection of the same station should be followed by the normal intrastation operation or by no intrastation operation at all or by a modified argument selecting operation. This modified argument selecting operation specifically is a one-step tape feed operation. In short, if upon a repeat selection of the same station in two successive look-ups, it is found that the desired argument is in the intermediate position, which is one step behind the read brush position, then the station is advanced one feed step. This brings the desired tape argument under the read brushes. It is evident that a single step feed under the circumstances will save considerable time since in normal intrastation operation the tape would have to make a complete tape circuit plus a feed step in order to locate the desired argument under the read brushes. If the test of the position of the record tape finds the desired tape argument already under the brushes RB, then there will be no intrastation operation at all and the tape will remain in position, thus saving the time of a complete circuit of the tape which would otherwise be required in normal intrastation selection.

The remembering means remembers for each table installed in the look-up unit, the station which has last been looked up and includes the relays SQ and SK (Fig. 13m) and also the intermediate storage relays IS—TA. The grouping of the remembering means into sections according to the stations within a table is effected by the plugging such as shown in Figs. 12 and 13m among the sockets SRH, SRE, and SRI.

Intermediate storage was described in a previous section of the description. It was there explained that there are six sets of intermediate storage relays, capable of storing the intermediate arguments at six selected stations of six different tables. As described in the early portion of the section of the description dealing with intrastation selection, a relay SQ corresponding to the selected station is momentarily energized to initiate intrastation selection. At the same time the coil P of a station relay SK is energized and its companion coil H then energized through a circuit which includes the serially connected, normally closed points $b$ of station relays SQ relating to the same table. When the station relay SK is energized, it closes its contacts $d$ which are in parallel with the contacts $c$ of the station relay SS. It is clear from Fig. 13$m$ that as long as a station relay SS remains energized, the corresponding station relay SK will remain energized. When a new look-up operation of the same table is called for, the contacts $f$ of the table relay TLD (Fig. 13$f$) are shifted and the holding circuit through any energized one of the relays SS within that table is broken. To simplify the explanation, assume that station 1 of illustrative table 1, has been previously selected so that relay 1SS is in energized status. Assume that on the next look-up operation table 1 again is selected. Accordingly, the relay 1SS will be deenergized and its contacts $c$ (Fig. 13$m$) will open. However, the contacts $d$ of the energized remembering relay 1SK still will be closed and will keep the condenser 1CQ charged so that the relay 1SQ will remain deenergized. Assume that the computed argument entered for the new look-up operation causes re-selection of station 1 in table 1, so that 1SS again is energized. The contacts $c$ and $d$ of 1SS reclose and reenergize the coil P of relay 1SK. As capacitor 1CQ remains charged up, the relay 1SQ is not energized. Nor are the other SQ relays, 2SQ and 3SQ, relating to the same table 1 energized. Hence, the circuit of coil H of relay 1SK remains closed since none of contacts $b$ of the table 1 relays SQ have opened. Inasmuch as none of the relays SQ has been energized, their $c$ contacts (Fig. 13$k$) all are normal, so that no connection is made between the +150 v. line and wire $w$101 which leads to the grid circuits of tubes T228 and T233. Hence, these tubes remain off and relay 1S1 remains inactive, along with subsidiary relays 1S2, 1S3, and 1SD (Fig. 13$a$). Therefore, the normal intrastation operation will not take place as yet. With all the contacts $c$ of relays SQ in their normal positions, a check will be made of the position of the tape at the selected station. Since contacts 1S2$d$ (Fig. 13$k$) stay normal, the SB comparison section is connected into the checking circuits and will participate with the RB comparison section and the active IS comparison section in checking operations.

The check to determine whether the argument under the brushes RB is the desired argument is no different here than the check previously described under the heading Checking the Intrastation Selection. If the checking circuits find that the desired argument is under the read brushes, then no intrastation operation will take place. Instead the relays R40 and R41 will be energized and the readout operation then may be effected. If the desired argument is in the intermediate position, then a one-step tape movement will be called for.

Reference must be made to the four rules of argument selection to determine whether the desired argument is in the read brush position or is in intermediate position. Rule 1 requires that for an ascending table and a positive computed argument, selection must be made of a tape argument equal to or next algebraically lower than the computed argument. Cases under this rule are given below:

*Case 1.*—The argument under brushes RB is equal to the computed argument. The checking circuit extends from the +150 v. line (Fig. 13$k$), then through the serially connected contacts $c$ of relay 36SQ to 1SQ, then via $e$ of relay PT, $h$ of 1S1, $h$ of 1S3, and $h$ of R41 to input line 80 of the RB comparison section. Referring now to Figs. 9 and 11, the applied potential is routed by the RB section to the exit line C. Referring again to Fig. 13$k$, potential on C of the RB section is applied by way of contacts R13$a$ to the grids of tubes V231 and 232. The tubes become conductive and the clear signal relays R40 and R41 become energized. It is seen that for this case intrastation selection is completely eliminated. Instead, the clear signal relays are energized, and the reading out operation may then take place.

*Case 2.*—The argument under the brushes RB is algebraically smaller than the computed argument and the argument at the intermediate position is algebraically greater than the computed argument. As the argument under brushes RB is algebraically lower, the potential applied to the RB comparison section is routed thereby to its exit line B. From line B of the RB comparison section, the potential is directed via the now closed contacts $k$ of the active table relay TLF to the input 80 of the related IS comparison section. As the argument in the intermediate position is algebraically higher than the computed argument, the intermediate comparison section directs the applied potential to its exit line A. As may be seen in Fig. 13$k$, the exit lines A of the IS comparison sections connect to the exit line C of the RB comparison section. Hence in Case 2, the relays R40 and R41 again will be energized and intrastation selection will be avoided.

In the above two cases, the argument under the read brushes was the desired argument according to Rule 1 of argument selection. In both cases, therefore, the intrastation selection was eliminated under control of the remembering means. Cases under Rule 1 in which the desired argument is not under the read brushes will now be discussed.

*Case 3.*—The argument under brushes RB is algebraically lower, while the argument in the intermediate position is equal to the computed argument. As in Case 2, potential applied to the RB comparison section is routed to its exit line B and from there is directed to the active IS comparison section. As the argument in intermediate position is equal to the computed argument, the IS comparison section directs the applied potential to its exit line C. From line C of the IS comparison section, the potential is transmitted to the resistance-coupled grids of tubes T225 and T230 rendering the tubes conductive. Accordingly, the coil P of a relay SP is energized by a circuit extending from the +150 v. line through the coil P of SP, the normally closed side of contacts $d$ of 1S1, and through the tubes T225 and T230 to ground. In a manner explained in the next section of the specification, energization of SP brings about a one-step advance of the selected station. It is seen from Case 3 that if the desired argument is in intermediate position, a one-step feed of the tape will be initiated so as to bring the desired argument from the intermediate position to the read brush position.

*Case 4.*—The argument under the brushes RB is algebraically lower, the argument in intermediate position is also algebraically lower and the argument under the brushes SB is algebraically higher. Potential applied to the RB comparison section is directed to its exit line B and thence through the active IS comparison section to the exit line B of the latter. The potential on line B of the IS comparison section is fed via the now normal contacts d of IS2 to the input line 80 of the SB comparison section. As the argument under the brushes SB is algebraically higher than the computed argument, the potential applied to the SB comparison section exits through its line A. Line A of the SB comparison section is at this time connected through the normally closed contacts k of relay IS1 into the grid circuits of tubes T225 and T230. Accordingly, the relay SP will be energized as in the preceding case. The energization of the relay SP will cause a one-step feed of the tape to bring the intermediate argument under the brushes RB. Under the conditions assumed for Case 4, such one-step movement will bring under the brushes RB a tape argument which is algebraically lower than the computed argument and bring into intermediate position a tape argument algebraically higher than the computed argument. In short the desired argument according to Rule 1 has been selected by this one-step feed of the tape.

Case 5.—The argument under brushes RB is lower, the argument in intermediate position is lower and the argument under the brushes SB is equal to the computed argument. As in Case 4, the checking potential will be directed by the RB comparison section and the active IS comparison section to the input of the SB comparison section. Differing from Case 4, the argument under the brushes SB is equal to the computed argument. Accordingly, the SB comparison section routes the applied potential to its exit line C which is connected at this time via c of HI and the normally closed side of b of IS2 to the grids of T228 and T233. Accordingly, the intrastation selection relay IS1 will be energized. It is seen that for Case 5 the intrastation selection will be initiated because the remembering check has found that the desired argument is neither under the brushes RB nor in the intermediate position.

Case 6.—The argument under brushes RB is lower, the intermediate argument is lower and the argument under brushes SB also is lower than the computed argument. This case will not differ, in effect, from the previous case since the SB comparison section treats a tape argument which is lower than the computed argument the same as a tape argument equal to the computed argument. Again intrastation selection will be initiated.

Case 7.—The argument under the brushes RB is greater than the computed argument. This is sufficient indication that the desired argument is neither at the RB position nor in the intermediate position. The potential applied to the RB comparison section will be routed thereby to its exit line A which is tied to the exit line C of the SB comparison section. Accordingly as in Cases 5 and 6, an intrastation selection will be initiated.

From the above it will be understood that the comparison potential is directed to line B of the RB comparison section or to line A of the active IS comparison section so as to eliminate intrastation operation if the desired argument is in the read brush position. The potential is directed to line C of the active IS comparison section or to line A of the SB comparison section to bring about a one-step tape feed if the checking operation determines that the desired argument is in the intermediate position. The potential is directed to line C of the SB comparison section or to line A of the RB comparison section to bring about intrastation operation if the desired argument is neither under the read brushes nor in the intermediate position. The manner in which the checking operation places the applied checking potential selectively upon these comparison result lines under conditions falling within the other rules of argument selection is believed clear from the explanation given with regard to Rule 1 plus the explanations previously given of the comparison circuits for the different rules.

*One-step tape feed*

In the previous section of the description it was pointed out that the relay coil P of SP (Fig. 13k) is energized to control a one-step feed of the selected record tape. Coil P of SP closes its contacts d (Fig. 13a) establishing the circuit of coil H of SP, from the +50 v. line through coil H, d of SP, and a of SPD, to ground. The relay SP also shifts its contacts a to close a circuit to a relay PT, from the +50 v. line through PT, shifted a of SP and a capacitor CPT to ground. Relay PT shifts its contacts a, allowing a capacitor CSPD to discharge. The relay PT is energized momentarily since its circuit is made through the capacitor CPT. When this capacitor is charged up, the relay PT again is deenergized and its points a return to normal. Thereupon current flows from ground through the capacitor CSPD and restored contacts a of PT through the relay SPD. Relay SPD is energized momentarily since its circuit is made through capacitor CSPD. During its momentary energization SPD opens its contacts a thereby breaking the main circuit through coil H of SP.

While PT is energized, it closes its contacts b (Fig. 13b). These contacts and the timer commutator I transmit potential from the +150 v. line to the grid of tube T234. Accordingly, the relay PRO1 is energized. This is followed by the energization of relay PRO2, as previously explained in connection with intrastation selection. Referring now to Fig. 13L, upon closure of contacts b of PRO2, a circuit is established from ground through the now-shifted contacts c of relay PT, then via b of PRO2, d of HI and then as in the circuits traced for intrastation selection through the clutch magnet of the selected station and the table relay ISTR. A circuit makes at the same time from ground through contacts c of PT, b of PRO2, d of PT and through coil P of HID1 to the +50 v. line. Contacts a of relay HID1 close and complete a circuit from the +50 v. line through coil H of the relay, its contacts a, contacts c of PT and to ground. Referring to Fig. 13a, relay HID1 being energized closes its contacts b to establish a circuit through a relay HID2. Relay HID2 closes its contacts a so as to establish a circuit through the coil H of relay HI. Relay HI opens its contacts d and c (see Fig. 13L) to break the clutch magnet circuit and the circuit of the table relay ISTR. The time required for successive energization of relays HID1, HID2, and HI provides requisite delay between the making and breaking of the circuit of the clutch magnet to enable the clutch to effect only a one-step tape feed. In other words, the clutch magnet is given a one-step feed pulse.

Since the tape has been advanced one step, the argument in the intermediate position now is different. Accordingly, the amount in the intermediate storage for the selected station and table must change. This requires that the coils H of the intermediate storage relays (see Fig. 13m) be deenergized, and then reenergized according to the new intermediate argument. As explained above, the table relay ISTR is energized at the same time as the clutch magnet. Thereupon the contacts c of the relay shift, opening one path to the coils H of the IS storage relays. Momentarily a parallel path remains closed, this path being through the normally closed side of the companion relay ISTD. The relay ISTR when energized causes energization of the companion relay ISTD, as explained before. By the time that the contacts a of the relay ISTD have been shifted, the contacts c of ISTR are already in the shifted position. Meanwhile the relay PT is still in energized condition and its contacts e (Fig. 13m) are open. With c of ISTR, a of ISTD, and e of PT all operated, there is no circuit path at present for the coils H of the IS—TA relays so that intermediate storage is cleared of its previous setting. Meanwhile a new argument is being sensed by the brushes SB. In accordance with this new argument, the coils P of the chosen set of relays IS—TA are energized. Relay PT then is deenergized and its contacts e reclose. Accordingly a circuit for the coils H of the energized IS—TA relay is established from ground via e of PT, ISDb or IS2b, and now shifted contacts c of ISTR and a of ISTD and the actuated contacts a of IS—TA, through the coils H of the latter.

When the relay HI is energized to terminate the one-step tape feed, the relay ISTR also is deenergized. This is followed by deenergization of the companion relay ISTD. The circuit for the energized relays H of intermediate storage is maintained through the shifted contacts a of ISTD while the contacts c of ISTR are being restored. Thereafter, the contacts a of ISTD restore. The energized coils H of relays IS—TA are then held by circuits extending from ground through the parallel, normally closed sides of the restored contacts of relays ISTR and ISTD.

The relay PT is deenergized by the time that the one-step feed has been completed. Hence its points e (Fig. 13k) have reclosed, so that after the one-step tape movement has been completed, a check is made to verify the presence of the desired argument at the read brush position, exactly as after normal intrastation operation.

A repetitive look-up with respect to the same station has been described. It was explained that the station relay SK (Fig. 13m) remained energized and the companion relay SQ was not energized when the same station was selected a plurality of times in succession. Since a relay SQ was not energized, circuits (Fig. 13k) were effective to check the location of the tape in order to determine whether there should be no intrastation operation, a one-step tape feed or a normal intrastation operation. If the same station is not selected twice in succession, then the station relay SK is deenergized and the newly selected station relays SQ and SK are energized. For instance, assume that station I in table I had been previously selected so that its relay ISK is in energized status. Suppose further that the next selection is of station 2 in table I. Accordingly, station 2 relay 2SQ will be energized in a manner now understood; its contacts b (Fig. 13m) will open and thus break the stick circuit of coil H of relay ISK. Accordingly, a normal intrastation selecting operation will take place under control of 2SQ to search tape station 2 for the desired argument. Incidentally, the capacitor ICQ will dissipate its charge and be in condition to allow ISQ to be energized the next time station I is selected.

The look-up of descending tables is essentially the same as the lock-up of ascending tables. The comparison circuits take into account whether the table is ascending or descending, as already described. For this purpose, the relays SA and SD (Fig. 13g) are provided to be selectively energized according to plugging and upon a table being called for a look-up. In general, it may be stated that the look-up of an ascending table involves first a search of the successive stations in the table from low to high to select a station and thereafter a search of the selected station from low to high until the desired argument has been located. On the other hand, the look-up of a descending table involves the searching of successive stations of the table from high to low until the desired station has been selected, and then a search of this station from high to low to locate the desired argument.

It is pointed out that the plugging for a table of multiple tape width is such that when an argument tape station is selected the companion functional tape stations are clutched in along with the argument tape station. Thus, if table 6 (Fig. 15) were being looked up and station 29 were selected, then the clutch circuits for the functional tape stations 31 and 32 would be established simultaneously with the clutch circuit for argument tape station 29. The clutch circuits would extend from ground (Fig. 13L) via d of IS3 or c of PT; then through PRO2b, d of HI, wire w102, the now closed contacts 6TLFd, plug wire to SCPU29, 29CSSb and via contacts R400d through clutch magnet 29SCM to the +50 v. line; also from the socket CLC29 by plug wire to socket CLC31 (also see Fig. 12), then through the connected R400d contacts through the station 31 clutch magnet 31SCM; and also from CLC31 by plug wire to CLC32 and via contacts R400d to 32SCM. Thus the clutch magnets for stations 31 and 32 would be energized concurrently with the clutch magnet for argument station 29.

Attention is called to the fact that the values selected for being read out and particularly the functional values may be read out through circuits similar to those disclosed in the aforementioned application, Serial Number 576,892 of Lake et al., filed February 8, 1945, in the interpolation section thereof. Such reading out operation involves the conversion of the codal designations of the values into equivalent differentially timed impulses which are applied to a conventional accumulator. It is to be understood also that instead of using the binary decimal code for the tape values, any other suitable code may be used such as the one, for instance, disclosed in the above mentioned application. Further the functional values instead of being in code form may be replaced by uncoded conventional numbers exposed at an indexing position replacing the read brush position. Such selected numbers may be copied down and utilized in making a desired computation. It is also to be understood that although the invention has been described as applied to the selection of arguments and accompanying functional values, the same principles may be applied to the selection of other kinds of data. Still further, the principles of the invention may be applied to selection of elements of some storage means other than record tapes as, for instance, storage means in the form of type drums bearing lines of data types which may be selected for printing upon a suitable medium.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Table look-up apparatus for a computing machine or the like, including different tables each comprising tape data storage stations, table selecting means, devices manifesting a variable, tape station selecting means controlled by and restricted by the table selecting means to selection of stations of a desired table group and operating under control of said manifesting devices according to the variable for selecting a tape station out of the desired table group, and intra-station selecting means also under control of the manifesting devices according to the variable for singling out data from the selected station.

2. Table look-up apparatus for a computing machine or the like, including different tables each comprising data bearing tapes, table selecting means, devices manifesting a variable, tape selecting means made effective under control of the table selecting means to select tapes only from a selected table group and functioning under control of said manifesting devices according to the variable for selecting a tape from the desired table group, and data selecting means also under control of the manifesting devices according to the variable for singling out data from the selected record.

3. Table look-up apparatus for a computing machine or the like, including a group of record stations, each containing a record bearing successive data designations, sensing means for the data designations of a record at a chosen station, devices manifesting a variable, comparison means controlled by the sensing means and the manifesting devices for comparing the variable with the successive data designations of the record at the chosen station, and means controlled by the comparison means according to the comparison results for concurrently singling out data from the record or records at the other station or stations of the group.

4. Table look-up apparatus for a computing machine or the like, including a group of feeding stations for records bearing successive data designations, one of said records being an argument data-bearing record and the other record or records of the group being functional data-bearing records, sensing means for the argument data designations, devices for manifesting a control argument, comparison means controlled by the manifesting devices and the sensing means for comparing the control argument with each of successive arguments designated on the argument data-bearing record, and means controlled by the comparison means for controlling the feeding stations of the entire group so as to concurrently locate, in readout positions, functional data designated upon a plurality of said records.

5. Table look-up apparatus for a computing machine or the like, including a table group of successively related value storage stations respectively containing consecutive sections of a value table, comparison sections, one for each station, to compare a station limit value with a variable, and means for serially testing the comparison sections of the successively related stations to select a station containing a table section embracing the variable.

6. Look-up apparatus for a computing machine or the like, including means for selectively feeding records each bearing a range of values, devices to manifest a variable, means under control of said devices for rendering the feeding means effective to feed a record bearing a range of values embracing the variable, circuits to read out values successively from the latter record, and a comparing circuit network under control of said circuits and also under control of said devices for controlling the record feeding means to present to a control position an item, of the latter record, having desired mathematical relation to the variable.

7. Look-up apparatus for a computing machine or the like, including feed means for a record bearing successive values, entry receiving means for a variable, means for sensing the values, one after another, during feed of the record, comparing means controlled by the sensing means and the entry receiving means for comparing the variable with each of successively sensed represented values for high, low and equal comparative relations, and means controlled by the comparing means selectively according to these various relations for governing the feed means.

8. Look-up apparatus for a computing machine or the like, including a storage unit for a series of values, entry receiving means for a variable, means for sensing the stored values one after another, comparing means controlled by the sensing means and the entry receiving means said comparing means including means for comparing the variable with each of a succession of the sensed, stored values and means selectively operable in accordance with different sequences of comparative relations and controlled by the comparing means upon detecting different comparative relations, in predetermined sequence, for selecting a desired stored value to be read out.

9. Table look-up apparatus for a computing machine, including record storage means for successive values of a table, relay storage means for a variable, circuits to enter a variable in the relay storage means, means to reset said relay storage means just prior to entry therein of a variable, and circuits brought into operation under control of the reset means once for each resetting of said relay storage means for looking up the record storage means under control of said relay storage means for table values related to the variable.

10. Look-up apparatus or the like, including means representing a positive value, means representing a negative value, devices for manifesting a positive or negative variable, and comparing means controlled by the value representing means and the manifesting devices, according to the numerical magnitudes and the positive or negative nature of the represented value and the variable, for ascertaining the algebraic relation of the stored value to the variable and means for representing the ascertained relationship.

11. Look-up apparatus for value tables of ascending and descending kinds, means for manifesting the ascending nature of a table, means manifesting the descending nature of a table and means for selectively operating said manifesting means in accordance with the kind of table, elements to represent a table value, devices to represent a variable and comparing means jointly controlled by said elements, said devices and by said manifesting means for producing comparison results depending on the relationship between the variable and the table value and also on the kind of table, whether ascending or descending.

12. Look-up apparatus for a table of values, including a record tape on which successive table values are represented, devices to manifest a variable, means to sense the record values one at a time, comparing means jointly controlled by the sensing means and said devices for comparing the variable with each of successive record values, and means controlled by the comparing means for singling out a record value upon detecting another record value algebraically adjacent the variable.

13. Look-up apparatus for a computing machine or the like, including means for feeding a record tape bearing successively designated values, sequentially across spaced positions, means at one of said positions for sensing designated values one after another, devices for manifesting a variable, comparing means controlled by the sensing means and the manifesting devices for comparing the variable with each of successively sensed values, and means controlled by the comparing means according to the comparison result for selecting a desired value to be read out at the other position.

14. Look-up apparatus for a computing machine or the like, including means for feeding record material bearing successive value designation lines sequentially across spaced positions, means at one of the positions for sensing value designations on successive lines one after another, devices for manifesting a variable, comparing means controlled by the sensing means and the manifesting devices for comparing the variable with each of successively sensed values, and means controlled by the comparing means according to the comparison result for interrupting the feed of the record material so as to present a desired designation line at another position.

15. Look-up apparatus for a computing machine or the like, including means to feed a value-bearing record so as to advance each of successive values sequentially across spaced positions, electrical sensing means at one of the positions for sensing the values, one after another, while the record is in motion, value manifesting circuits including electronic tubes operated under control of the sensing means in accordance with each successively sensed value, devices to manifest a variable, comparing means controlled by the devices which manifest the variable and by the value manifesting circuits for ascertaining the comparative relation between the variable and a sensed value, and means controlled by the comparing means upon detecting a given comparative relation for interruping the record feed after the record has advanced further to locate a desired value in another position.

16. Look-up apparatus such as defined in claim 15, said electronic tubes including control grids normally biased to cut-off potential, and said sensing means being connected into grid circuits, including said control grids, to apply sensing potential to the grids selectively, according to the value sensed, for overcoming the cut-off bias whereby the tubes are selectively rendered conductive, said grid circuits having delay constants such as to delay the return to cut-off bias of the control grids after removal of sensing potential, whereby the related value manifesting circuits remain effective after the sensed value has passed the selector position.

17. Look-up apparatus for a computing machine or the like, including elements for electrically sensing representations of values and their signs upon a record, devices for manifesting a variable and its sign, sensed value manifesting circuits including electronic tubes having grids normally biased to cut-off, connections between the sensing elements and said tubes for applying potential to the grid circuits to overcome the cut-off bias and render the tubes selectively conductive so as to operate said manifesting circuits according to the sensed value and sign representations and comparing means including portions controlled by the sensed value manifesting circuits and the variable value manifesting devices and including other portions controlled by the sensed sign manifesting circuits and the sign manifesting devices for ascertaining the algebraic relationship between the variable and the sensed value.

18. Look-up apparatus such as defined in claim 17, in which means are provided to feed successive designation lines of the record across the sensing elements, each of the designation lines bearing representations of a value and sign, the grid circuits of the tubes in the sensed sign manifesting circuits having delay means to delay these tubes from becoming conductive under control of the sensing elements until the other tubes controlled by the sensing of a value representation have had time to become conductive, whereby the portion of the comparing means controlled by the sensed sign manifesting circuits serves to time the comparison operation.

19. Table look-up apparatus for a computing machine or the like, including means for sensing a value and its sign represented on a record, value and sign manifesting circuits selectively effective under control of the sensing means, and switching means in said circuits for reversing the effect of the sensed sign representation, so as to cause the positive sign to be manifested as a negative sign and a negative sign to be manifested as a positive sign.

20. Look-up apparatus for a computing machine or the like, including means for feeding a record tape so as to advance represented values sequentially across a pair of spaced positions, selector sensing elements at one of said positions, read sensing elements at the other position, comparing means under control of the selector sensing elements for comparing a variable with each of successive record values sensed by the latter elements, means controlled by the comparing means according to the comparison results for selecting a record value, and means for checking the accuracy of selection, said checking means including other comparing means under control of the read sensing elements for comparing the variable with the record value in read sensing position.

21. Table look-up apparatus for computing machine or the like, including means for feeding a record tape having successive designation lines on which values are designated, selector sensing means and read sensing means in positions spaced apart a distance equivalent to twice the space between successive designation lines and past which positions the feeding means sequentially feeds the designation lines whereby alternate designation lines concurrently traverse the selector and read sensing means while a designation line intermediate the alternate designation lines is located in intermediate position between the selector and read positions, means controlled by the selector sensing means for selecting a desired designation line to be located in the read sensing position, means controlled by the read sensing means for manifesting the value designation located in read sensing position, means to manifest the value designation in intermediate position, and checking means controlled jointly by the two said manifesting means for determining whether the desired designation line is in the read position.

22. Table look-up apparatus for a computing machine or the like, including a group of record feeding stations, the record at one of said stations bearing successive designations of arguments and the records at the other station or stations of the group bearing related functional value designations, means for effecting concurrent feed of the records at the group of stations, means for sensing the argument designations successively during feed of the record bearing the argument designations, devices for manifesting a control argument, comparison means controlled by the sensing means and the manifesting devices for comparing the control argument with each of successively sensed designated arguments, and means controlled by the comparing means according to the comparison result for concurrently positioning functional value designations of the group of record tapes, in readout positions.

23. A table look-up apparatus dealing with a plurality of tables of values, a plurality of table groups of data storage station, means for selecting a table group of stations to be looked up, means for selecting data from the selected table group to be read out, means for signaling the completion of look-up operation with respect to the selected table, and means under control of said signaling means for preventing initiation of a new look-up operation while the previously called for look-up operation is taking place.

24. In a table look-up apparatus such as defined in claim 23, means for selecting one or more of the tables to be read out, and means for preventing operation of the latter selecting means to select any table to be read out while said table is being looked up.

25. Table look-up means for a computing machine or the like, including mechanism to feed record material bearing successive designations of arguments and companion functional values, means for sensing the arguments successively while the record material is in motion, means to manifest a variable, comparing means controlled by the sensing means and the manifesting means to compare each sensed argument with the variable, and means controlled by the comparing means upon detecting a desired relation between the variable and a sensed argument for stopping the feed mechanism to thereby select the functional values related to a mathematically adjacent argument.

26. Value look-up means for a computing machine or the like, including mechanism to feed record material bearing successive designations of arguments and accompanying functional values, means to sense the arguments successively, means to manifest a control argument, comparing circuits controlled by the sensing means and the manifesting means to compare the control argument with each sensed argument and including means selectively operable in accordance with different sequences of comparative relations to actuate selectively a plurality of outputs, and means controlled by the selective activation of these outputs for selecting functional values to be read out.

27. Table look-up means or the like, including mechanism to feed a record bearing successive designations of items, means to sense the items one after another as the record is fed, means controlled by the sensing means for temporarily receiving each successive item as sensed, and means operable upon interrupting record feed for enabling said receiving means to retain the last-entered item.

28. Table look-up means for a computing machine or the like, including mechanism to feed record material bearing successive designations of arguments and accompanying functional values, means to sense the arguments successively, means to manifest a control argument, comparing means controlled by the sensing means and the manifesting means for comparing the control argument with each successively sensed argument, and means controlled by the comparing means upon detecting a designated argument algebraically higher than the control argument, following the detection of a designated argument algebraically equal to or lower than the control argument, for selecting the functional values, accompanying the designated equal or first algebraically lower argument, to be read out.

29. Table look-up means for a computing machine or the like, including mechanism to feed record material bearing successive designations of arguments and accompanying functional values, means to sense the arguments successively, means to manifest a control argument, comparing means controlled by the sensing means and the manifesting means for comparing the control argument with each successively sensed argument, and means controlled by the comparing means upon detecting a designated argument algebraically equal to or higher than the control argument, following the detection of a designated argument algebraically lower than the control argument, for selecting the functional values, accompanying the designated algebraically lower argument, to be read out.

30. Table look-up means for a computing machine or the like, including mechanism to feed record material bearing successive designations of arguments and accompanying functional values, means to sense the arguments successively, means to manifest a control argument, comparing means controlled by the sensing means and the manifesting means for comparing the control argument with each successively sensed argument, and means controlled by the comparing means upon detecting a designated argument algebraically equal to or lower than the control argument, following the detection of a designated argument algebraically higher than the control argument, for selecting the functional values, accompanying the designated algebraically higher argument, to be read out.

31. Table look-up means for a computing machine or the like, including mechanism to feed record material bearing successive designations of arguments and accompanying functional values, means to sense the arguments successively, means to manifest a control argument, comparing means controlled by the sensing means and the manifesting means for comparing the control argument with each successively sensed argument, and means controlled by the comparing means upon detecting a designated argument algebraically lower than the control argument, following the detection of a designated argument algebraically equal to or higher than the control argument, for selecting the functional values, accompanying the designated equal or first algebraically higher argument, to be read out.

32. Table look-up apparatus for a computing machine or the like, including a group of record stations, means to select a station, means controlled by the station selecting means for effecting intrastation selection to select a portion of the record at the selected station, means to store an identification of the selected station, and means under control of the storing means effective upon repeat selection of the same station for checking the position of the record at the selected station to determine whether intrastation selection is necessary.

33. Table look-up apparatus including a plurality of record feeding stations each selectively operable for feeding a record bearing successive value designations, means functioning upon a look-up operation for selecting a record feeding station and rendering it effective to feed its record, devices to sense the value designations of the latter record successively, means to manifest a variable, comparing means controlled by the sensing devices and the variable-manifesting means for comparing the variable with each of the successively sensed designated values of the selected station record, means controlled by the comparing means in accordance with the comparison results for arresting the feed of the record so as to present a desired value designation in a read position, and means for storing an identification of a selected station effective upon repeat selection of the same station during a succeeding look-up operation for checking the value designation in the read position against the variable manifested for said succeeding look-up operation, so as to determine their relationship before feed of the record at the selected station is initiated.

34. Table look-up apparatus such as defined in claim 33, said storing means including elements at the read position for sensing the value designation thereat, and means controlled by the latter sensing elements and the variable-manifesting means for determining whether the designation in the read position is the designation desired upon said succeeding look-up operation and for suppressing the feeding operation if said designation is the desired one.

35. Table look-up apparatus such as defined in claim 33, means to manifest the designated value preceding the one at the read position, said storing means including means to compare the latter designated value with the variable manifested for the succeeding look-up operation to determine whether said designation is the desired one, and means controlled thereby to cause the record at the selected station to be fed a single step to position the latter designation in read position if it is found to be the desired designation.

36. Table look-up apparatus such as defined in claim 33, said sensing devices being located at a selector position spaced from the read position twice the spacing between successive designation lines, sensing elements provided at the read position to sense the designation thereat, means for manifesting the designation intermediate the selector position and the read position, a comparison section controlled by the sensing elements at the read position and by the variable-manifesting means for comparing the designation in read position with the variable, another comparing section controlled by the variable-manifesting means and the means for manifesting the intermediate designation for comparing the latter with the variable, and means controlled by the storing means for causing the latter two comparing sections to function, upon the repeat selection of the same station, for determining whether the desired designation is at the read position or in the intermediate position and to control record feed accordingly.

37. Table look-up apparatus such as defined in claim 33, said sensing devices being located at a selector position spaced from the read position twice the spacing between successive designation lines, sensing elements provided at the read position to sense the designation thereat, means for manifesting the designation intermediate the selector position and the read position, a comparison section controlled by the sensing elements at the read position and by the variable-manifesting means for comparing designation in read position with the variable, another comparing section controlled by the variable-manifesting means and the means for manifesting the intermediate designation for comparing the latter with the variable, and means controlled by the storing means for causing the latter two comparing sections and the before-mentioned comparing means to operate upon the repeat selection of the same station for determining whether the desired designation is or is not in the intermediate position and to control record feed accordingly.

38. Table look-up apparatus for a computing machine or the like, including mechanism to feed a record tape so as to move successive data designation lines of said tape across a selector position and thereafter across a read position spaced from the selector position twice the spacing between adjacent designation lines, whereby alternate designation lines concurrently are located at the selector and read positions while an intermediate designation line lies between these two positions, means at the selector position for sensing the designation lines successively, means under control of said sensing means for selecting a designation line to be arrested at the read position, and a storage section also controlled by the aforesaid sensing means for storing the data designated in the intermediate designation line, preceding the selected line.

39. Table look-up apparatus such as defined in claim 38, in which a plurality of feed mechanisms are provided to feed record tapes pertaining to different tables, means to select the table to be looked up, a plurality of intermediate data storage sections, one for each table, and means controlled by the table selecting means upon selecting a table to be looked up for selecting one of said plurality of intermediate data storage sections to be effective.

40. Table look-up apparatus for a computing machine or the like, including a table group of record feeding stations for operating on records respectively containing consecutive sections of a value table, with the end value of one record being repeated as the initial value of the succeeding record of the table, means to sense the values on each record, means to manifest a variable, comparing means controlled by the sensing means and the variable-manifesting means for comparing the value on a record with a variable, means controlled by the comparing means upon detecting a given comparative relation between the variable and a record value for selecting a preceding value designated on the record, whereby the end value on a record may serve only as a comparison value to select a preceding value but is unable to be itself selected, whereas its equal value which is the initial one designated on the succeeding record of the table, may be selected when called for by the variable.

41. Value look-up apparatus including a plurality of item storage stations, each storing a range of items, range-designating means for the stations, devices to manifest a control item, a comparison circuit controlled by the range-designating means and said devices for comparing the control item with station range designations to select a station storing a range of items embracing the control item, and means also under control of said manifesting devices for singling out of the selected station an item of desired relationship to the control item.

42. Table look-up apparatus including a plurality of value storage stations for interchangeably carrying consecutive sections of a value table, electrical comparison devices, one to each station and having applied thereto a value range indicating item for the table section at the related station to be compared with a variable, means to apply the variable to each electrical comparison device to be compared with the range indicating items, means for selectively serially connecting the comparison devices of those stations carrying the consecutive sections of the value table, station selecting electrical means, and a circuit including the serially connected comparison devices for selectively operating the means according to the comparison of the variable with the range indicating items applied to the serially connected devices.

43. Value look-up apparatus including a plurality of item storage stations, each storing a range of items, devices to manifest a control item, means under control of the manifesting devices for selecting a station storing a range of items embracing the control item, circuits for reading out items successively from the selected station, a comparison circuit network controlled by said circuits and by said devices for comparing items at the selected station successively with the control item, and means controlled by the comparison network for singling out from the selected station an item bearing a desired relationship to the control item.

44. A value look-up apparatus including a plurality of individually clutchable record feed mechanisms for respectively feeding records, each bearing a desired range of values, electrical means to manifest a variable, a plurality of selectively operable devices, one for each feed mechanism and selectively operable to cause the related feed mechanism to be clutched into operation, a circuit network controlled by said means for bringing into operation one of said devices for causing the related feed mechanism to be clutched into operation so as to feed a record bearing a range of values embracing the variable, and circuits also under control of said means for declutching the selected record feed mechanism so as to present to a control position an item of the latter record having desired mathematical relationship to the variable.

45. Look-up apparatus as defined in claim 8, the means for selecting a desired value including electrical means operated under control of the comparing means upon detecting a certain comparative relation and also including another electrical means conditioned by the first named means upon operation of the latter for responding to operation of the comparing means in detecting another comparative relation.

46. In a value look-up apparatus or the like, a set of electrical means to represent a number and its sign, another set of electrical means to represent another number and its sign, and a comparing circuit including a sign comparing sub-circuit having potential applied thereto and controlled by the means representing the signs of the numbers to produce an output potential upon the signs being alike, said comparing circuit including numerical value comparing sub-circuits for receiving said output potential and controlled by the means representing the digits of the two numbers in corresponding orders for producing potential on either of two output lines according to the greater and less-than relationship of the numbers of like sign, said comparing circuit further including circuit means connected to said output lines and selectively controlled by the sign representing means of one of the numbers for converting the numerical comparison result of the numbers of like sign to an algebraic greater or less-than comparison result of one of said numbers with respect to the other of the numbers.

47. In a value look-up apparatus or the like, means to sense a represented number and its sign, a comparing circuit network including a first set of switches conditioned selectively according to the value of a variable and according to its sign, said network including a second set of switches to be conditioned selectively according to the value of the represented number and according to the represented sign of the number, said first and second set of switches being arranged to coact for establishing, selectively, paths of potential according to the comparative relationship of the variable, with its sign, and the represented number, with its sign, the second set of switches including switching means in all of said paths and to be closed in consequence of the sensing of the represented sign, and circuits controlled by the sensing means according to the represented number and its sign for selectively conditioning the second set of switches and effecting delayed closure of said switching means so as to time the completion of any selected path of potential through the comparing circuit network.

48. Value look-up apparatus for a computing machine or the like, including storage means for successive values of a table, electrical storage for a variable, entry circuits to enter a variable into electrical storage, circuit means for operating under control of electrical storage, according to the variable, to look up said storage means for a value related to the variable, a start circuit, and circuit elements controlled by the start circuit for correlatively timing the entry of the variable into electrical storage by said entry circuits and the operation of said circuit means to look-up a value, so as to prevent operation of said circuit means before the variable has been safely entered in electrical storage.

FRANCIS E. HAMILTON.
    ROBERT R. SEEBER, Jr.
    RALPH W. PRENTICE.

REFERENCES CITED

The following references are of record in the file of this patent:

UNITED STATES PATENTS

| Number | Name | Date |
|---|---|---|
| 1,887,259 | DeSimone | Nov. 8, 1932 |
| 1,889,575 | Sebille | Nov. 29, 1932 |
| 1,978,931 | Bryce | Oct. 30, 1934 |
| 2,110,858 | Gaylon | Mar. 15, 1938 |
| 2,255,147 | Broido | Sept. 9, 1941 |
| 2,288,520 | Geller et al. | June 30, 1942 |
| 2,377,764 | Dickinson | June 5, 1945 |
| 2,385,007 | Leathers et al. | Sept. 18, 1945 |
| 2,434,487 | Dickinson | Jan. 13, 1948 |
| 2,477,722 | Coe et al. | Aug. 2, 1949 |